(12) United States Patent
Kim et al.

(10) Patent No.: US 6,335,776 B1
(45) Date of Patent: *Jan. 1, 2002

(54) MULTI-DOMAIN LIQUID CRYSTAL DISPLAY DEVICE HAVING AN AUXILIARY ELECTRODE FORMED ON THE SAME LAYER AS THE PIXEL ELECTRODE

(75) Inventors: Kyeong Jin Kim, Buncheon-shi; Jang Jin Yoo, Seoul, both of (KR)

(73) Assignee: LG. Philips LCD Co., Ltd., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/250,262

(22) Filed: Feb. 16, 1999

(30) Foreign Application Priority Data

May 30, 1998 (KR) .............................. 98-19997
Jan. 12, 1999 (KR) .............................. 99-00542

(51) Int. Cl.⁷ .......................................... G02F 1/1337
(52) U.S. Cl. ..................................................... 349/129
(58) Field of Search ........................... 349/39, 129, 42, 349/138, 139

(56) References Cited

U.S. PATENT DOCUMENTS

| 3,914,022 A | 10/1975 | Kashnow |
| 4,478,175 A | 10/1984 | Baron |
| 4,581,608 A | 4/1986 | Aftergut et al. ............ 340/704 |
| 4,701,028 A | 10/1987 | Clerc et al. |
| 4,728,175 A | 3/1988 | Baron ....................... 350/336 |
| 4,786,147 A | 11/1988 | Clerc et al. |
| 4,889,412 A | 12/1989 | Clerc et al. |
| 4,937,566 A | 6/1990 | Clerc ........................ 340/784 |
| 4,978,203 A | 12/1990 | Yamazaki et al. ......... 350/339 |
| 5,039,185 A | 8/1991 | Uchida et al. |
| 5,093,741 A | 3/1992 | Shohara et al. |
| 5,182,664 A | 1/1993 | Clerc |

(List continued on next page.)

FOREIGN PATENT DOCUMENTS

| EP | 0 357 147 | 3/1990 |
| EP | 0 372 637 | 6/1990 |
| EP | 0 752 611 | 1/1997 |

(List continued on next page.)

OTHER PUBLICATIONS

Patent Abstracts of Japan, vol. 098, No. 001, JP09–23038, Sep. 5, 1997.
A. Lien, et al., *Wide Viewing Angle TFT–LCD Based on Ridge and Fringe–Field Multi–Domain Homeotropic Structure*, SID 98 Digest, pp. 1123–1126.
A. Lien, R.A. John, Two–Domain TN–LCDs Fabricated by Parallel Fringe Field Method, SID Digest, 1993, pgs. 269–272.

(List continued on next page.)

*Primary Examiner*—William I Sikes
*Assistant Examiner*—Tarifur R. Chowdhury
(74) *Attorney, Agent, or Firm*—Long Aldridge & Norman, LLP

(57) ABSTRACT

A multi-domain liquid crystal display device includes first and second substrates facing each other and a liquid crystal layer between the first and second substrates. A plurality of gate bus lines are arranged in a first direction on the first substrate and a plurality of data bus lines are arranged in a second direction on the first substrate to define a pixel region. A common electrode is formed on the second substrate and a pixel electrode is electrically charged through the data bus line to drive the liquid crystal layer with the common electrode. An auxiliary electrode is formed on a same layer whereon the pixel electrode is formed. A passivation is formed below the pixel and auxiliary electrodes to insulate them from other electrodes and bus lines. An alignment layer is on at least one substrate between the first and second substrates.

56 Claims, 49 Drawing Sheets

U.S. PATENT DOCUMENTS

| | | | |
|---|---|---|---|
| 5,229,873 A | 7/1993 | Hirose et al. | |
| 5,249,070 A | 9/1993 | Takano | 359/54 |
| 5,309,264 A | 5/1994 | Lien et al. | |
| 5,339,181 A | 8/1994 | Kim et al. | |
| 5,477,358 A | 12/1995 | Rosenblatt et al. | |
| 5,517,341 A | 5/1996 | Kim et al. | |
| 5,517,342 A | 5/1996 | Kim et al. | |
| 5,574,582 A | 11/1996 | Takeda et al. | |
| 5,576,863 A | 11/1996 | Aoki et al. | 359/76 |
| 5,580,273 A | * 12/1996 | Terashita et al. | 349/129 |
| 5,602,662 A | 2/1997 | Rosenblatt et al. | |
| 5,608,556 A | 3/1997 | Koma | |
| 5,621,558 A | 4/1997 | Shimada et al | |
| 5,623,354 A | 4/1997 | Lien et al. | 349/124 |
| 5,666,179 A | 9/1997 | Koma | |
| 5,668,650 A | 9/1997 | Mori et al. | |
| 5,673,092 A | 9/1997 | Horie et al. | |
| 5,686,977 A | 11/1997 | Kim et al. | |
| 5,710,610 A | * 1/1998 | Kim | 349/129 |
| 5,737,051 A | 4/1998 | Kondo et al. | |
| 5,748,276 A | 5/1998 | Uno et al. | 349/144 |
| 5,757,455 A | * 5/1998 | Sugiyama et al. | 349/129 |
| 5,767,926 A | 6/1998 | Kim et al. | |
| 5,777,701 A | 7/1998 | Zhang | 349/44 |
| 5,777,711 A | 7/1998 | Sugiyama | |
| 5,838,037 A | 11/1998 | Masutani et al. | |
| 6,081,313 A | * 6/2000 | Kim | 349/129 |

FOREIGN PATENT DOCUMENTS

| | | |
|---|---|---|
| EP | 0 814 142 | 12/1997 |
| EP | 0 854377 | 7/1998 |
| EP | 0 884 626 | 12/1998 |
| GB | 2 296 810 | 7/1996 |
| GB | 2 321 718 | 8/1998 |
| GB | 2 337 843 | 12/1999 |
| JP | 2-294622 | 12/1990 |
| JP | 3-261914 | 11/1991 |
| JP | 4-67127 | 3/1992 |
| JP | 4-261522 | 9/1992 |
| JP | 5-2161 | 1/1993 |
| JP | 05-297412 | 11/1993 |
| JP | 6-194656 | 7/1994 |
| JP | 6-194657 | 7/1994 |
| JP | 6-258649 | 9/1994 |
| JP | 6-273798 | 9/1994 |
| JP | 6-281959 | 10/1994 |
| JP | 6-347824 | 12/1994 |
| JP | 7-13164 | 1/1995 |
| JP | 7-13166 | 1/1995 |
| JP | 7-28063 | 1/1995 |
| JP | 7-36044 | 2/1995 |
| JP | 7-43698 | 2/1995 |
| JP | 7-43719 | 2/1995 |
| JP | 7-64089 | 3/1995 |
| JP | 7-181493 | 7/1995 |
| JP | 7-199190 | 8/1995 |
| JP | 7-311383 | 11/1995 |
| JP | 8-22023 | 1/1996 |
| JP | 8-76125 | 3/1996 |
| JP | 8-101399 | 4/1996 |
| JP | 8-146468 | 6/1996 |
| JP | 8-220511 | 8/1996 |
| JP | 8-220524 | 8/1996 |
| JP | 8-313915 | 11/1996 |
| JP | 9-22025 | 1/1997 |
| JP | 9-152583 | 6/1997 |
| JP | 09-197420 | 7/1997 |
| JP | 9-230360 | 9/1997 |
| JP | 09-230387 | 9/1997 |
| JP | 9-325373 | 12/1997 |
| JP | 10-142633 | 5/1998 |
| WO | 961 0774 | 4/1996 |

OTHER PUBLICATIONS

A. Lien, R.A. John, TFT–Addressed Two–Domain TN VGA Displays Fabricated Using the Parallel Fringe Field Method, SID Digest, 1994, pgs. 594–597.

N. Koma, Y. Baba, K. Matsuoka, No–Rub Multi–Domain TFT–LCD Using Surrounding–Electrode Method, SID Digest, 1995, pgs. 869–872.

H. Murai, M. Suzuki, S. Kaneko, Novel High Contrast Random and Controlled 4–Domain CTN–LCDs with Wide Viewing Angle, Euro Display '96, pgs. 159–161.

Y. Koike, S. Kataoka, T. Sasaki, H. Chida, H. Tsuda, A. Takeda and K. Ohmuro, T. Sasabayashi, K. Okamoto, A Vertically Aligned LCD Providing Super–High Image Quality, IDW '97, pgs. 159–162.

N. Koma, R. Nishikawa, Development of a High–Quality TFT–LCD for Projection Displays, SID Digest, 1997, pgs. 461–464.

K. Ohmuro, S. Kataoka, T. Sasaki, Y. Koike, Development of Super–High Image Quality Vertical Alignment Mode LCD, SID Digest, 1997, pgs. 845–848.

* cited by examiner

US 6,335,776 B1

MULTI-DOMAIN LIQUID CRYSTAL DISPLAY DEVICE HAVING AN AUXILIARY ELECTRODE FORMED ON THE SAME LAYER AS THE PIXEL ELECTRODE

BACKGROUND OF THE INVENTION

1. Field of the Invention

The present invention relates to a liquid crystal display device (LCD), and more particularly, to a multi-domain liquid crystal display device having a side or auxiliary electrode on a layer whereon a pixel electrode is formed.

2. Description of the Related Art

Recently, an LCD has been proposed where the liquid crystal is not aligned and the liquid crystal is driven by side electrodes insulated from pixel electrodes. FIGS. 1A to 1C are sectional views of pixel units of the conventional LCDs.

Regarding conventional LCDs, a plurality of gate bus lines arranged in a first direction on a first substrate and a plurality of data bus lines arranged in a second direction on the first substrate divide the first substrate into a plurality of pixel regions. A thin film transistor (TFT), applies image signal delivered from the data bus line to a pixel electrode 13 on a passivation 4. The TFT is formed on each pixel region and comprises a gate electrode, a gate insulator, a semiconductor layer, a source electrode, and a drain electrode, etc. Side electrode 15 is formed surrounding the pixel electrode 13 on the gate insulator, thereon passivation 4 is formed over the whole first substrate, and a part of pixel electrode 13 overlaps side electrode 15 (refer to FIG. 1A). Alternatively, pixel electrode 13 is formed on the gate insulator, passivation 4 is formed over the whole first substrate. Afterward, side electrode 15 is formed as overlapping a part of pixel electrode 13 (refer to FIG. 1B). Moreover, it is possible to pattern the pixel electrode 13 by etching and dividing the pixel region (refer to FIG. 1C).

On second substrate 33, a common electrode 17 is formed and together with pixel electrode 13 applies electric field to a liquid crystal layer. Side electrode 15 and open area (slit) 19 distort the electric field applied to the liquid crystal layer, and then in an unit pixel liquid crystal molecules are driven variously. This means that when voltage is applied to the LCD, dielectric energy due to the distorted electric field arranges the liquid crystal directors in a needed position.

In the LCDs, however, open area 19 in common electrode 17 or pixel electrode 13 is necessary, and the liquid crystal molecules could be driven stably when the open area is wider. If the electrodes do not have an open area or the width of the open area is narrow, the electric field distortion needed to divide the pixel region becomes weak. Then, when voltage over a threshold voltage, $V_{th}$, is applied, the time needed to stabilize the liquid crystal directors increases. In particular, the response time can be over 100 msec. At this time, disclination occurs from the area where the liquid crystal directors are parallel with a transmittance axis of the polarizer, which results in a decrease in brightness. Further, according to the surface state of LCDs, the liquid crystal texture has an irregular structure.

SUMMARY OF THE INVENTION

Accordingly, the present invention is directed to an LCD that substantially obviates one or more problems due to limitations and disadvantages of the related art.

An object of the present invention is to provide a multi-domain LCD having rapid response characteristics and high brightness by stable arrangement of liquid crystal molecules.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the objects and in accordance with the purpose of the invention, as embodied and broadly described herein, a multi-domain liquid crystal display device comprises first and second substrates facing each other; a liquid crystal layer between said first and second substrates; a plurality of gate bus lines arranged in a first direction on said first substrate and a plurality of data bus lines arranged in a second direction on said first substrate to define a pixel region; a common electrode on said second substrate; a pixel electrode electrically charged through said data bus line to drive said liquid crystal layer with said common electrode; a side electrode on a same layer whereon said pixel electrode is formed; a passivation insulating said pixel and side electrodes from electrodes and bus lines other than the pixel and side electrodes; and an alignment layer on at least one substrate between said first and second substrates.

In another aspect of the present invention, a multi-domain liquid crystal display device comprises first and second substrates facing each other; a liquid crystal layer between said first and second substrates; a plurality of gate bus lines arranged in a first direction on said first substrate and a plurality of data bus lines arranged in a second direction on said first substrate to define a pixel region; a common electrode on said second substrate; a pixel electrode coupled to the data bus line; a side electrode on a same layer as said pixel electrode; and a passivation insulating said pixel and side electrodes.

In another aspect of the present invention, a method of making a multi-domain liquid crystal display device comprises the steps of forming first and second substrates facing each other; forming a liquid crystal layer between said first and second substrates; forming a plurality of gate bus lines arranged in a first direction on said first substrate and a plurality of data bus lines arranged in a second direction on said first substrate to define a pixel region; forming a common electrode on said second substrate; forming a pixel electrode electrically charged through said data bus line to drive said liquid crystal layer with said common electrode; forming a side electrode on a same layer whereon said pixel electrode is formed; forming a passivation insulating said pixel and side electrodes from electrodes and bus lines other than the pixel and side electrodes; and forming an alignment layer on at least one substrate between said first and second substrates.

In a further aspect of the present invention, a method of making a multi-domain liquid crystal display device comprises the steps of forming first and second substrates facing each other; forming a liquid crystal layer between said first and second substrates; forming a plurality of gate bus lines arranged in a first direction on said first substrate and a plurality of data bus lines arranged in a second direction on said first substrate to define a pixel region; forming a common electrode on said second substrate; forming a pixel electrode coupled to the data bus line; forming a side electrode on a same layer as said pixel electrode; and forming a passivation insulating said pixel and side electrodes.

In a further aspect of the present invention, a method of making a liquid crystal display device first and second substrates, the method comprising the steps of: forming a plurality of gate bus lines arranged in a first direction on said first substrate and a plurality of data bus lines arranged in a second direction on said first substrate to define a pixel region; forming a transistor corresponding to the pixel region having gate, source, and drain electrodes; forming a pixel electrode electrically charged through said data bus line to drive said liquid crystal layer with a common electrode; forming an auxiliary electrode on a same layer whereon said pixel electrode is formed, the auxiliary electrode and the pixel electrode being electrically insulated from each other; forming the common electrode on said second substrate; and forming a liquid crystal layer between said first and second substrates, wherein said pixel region is divided into at least two portions and liquid crystal molecules in said liquid crystal layer in each of the at least two portions capable of being electrically driven differently from each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrates embodiments of the invention and together with description serve to explain the principles of the invention.

In the drawings:

FIGS. 18A to 18F are sectional views of showing the manufacturing process of the present invention;

DETAILED DESCRIPTION OF THE PREFERRED EMBODIMENTS

The multi-domain liquid crystal display device of the present invention comprises first and second substrates facing each other, a liquid crystal layer between the first and second substrates, a plurality of gate bus lines arranged in a first direction on the first substrate and a plurality of data bus lines arranged in a second direction on the first substrate to define a pixel region, a common electrode on the second substrate, a pixel electrode electrically charged with the data bus line to drive the liquid crystal layer with the common electrode, a side electrode on a layer whereon the pixel electrode is formed, a passivation below the pixel and side electrodes to insulate them from other electrodes and bus lines, and an alignment layer on at least one substrate between the first and second substrates.

The side electrode is in a region except a region of the pixel electrode. The passivation includes a material selected from the group consisting of BCB (benzocyclobutene), acrylic resin, polyimide compound, silicon nitride, and silicon oxide. The pixel region is divided into at least two portions. In each portion, the liquid crystal molecules in the liquid crystal layer are driven differently from each other. The alignment layer is divided into at least two portions. In each portion, liquid crystal molecules in the liquid crystal layer are aligned differently from each other.

At least one portion among the alignment layer portions is alignment-treated, or all portions of the alignment layer portions are non-alignment-treated. In this respect, at least one portion among the alignment layer portions may be rubbing-treated or photo-alignment-treated.

The liquid crystal layer includes liquid crystal molecules having positive dielectric anisotropy or liquid crystal molecules having negative dielectric anisotropy.

Hereinafter, the multi-domain liquid crystal display device of the present invention is explained in detail by accompanying the drawings.

FIGS. 2A to 2D are plan views of the liquid crystal display devices according to the first embodiment of the present invention. FIGS. 2A to 2D shows a storage-on-common structure but a storage-on-gate structure is also possible. The solid arrow shows the alignment direction of the upper substrate and the dotted arrow shows the alignment direction of the lower substrate.

Figure 1A:
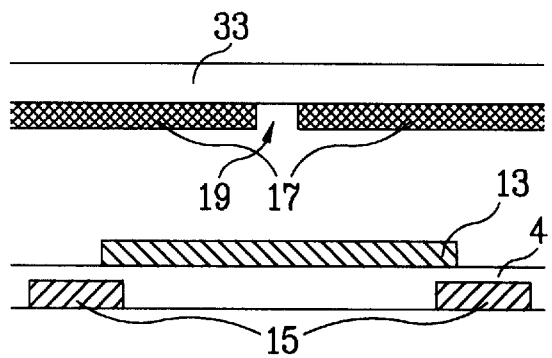
FIGS. 1A to 1C are sectional views of the liquid crystal display devices in the related art.
Figure 1B:
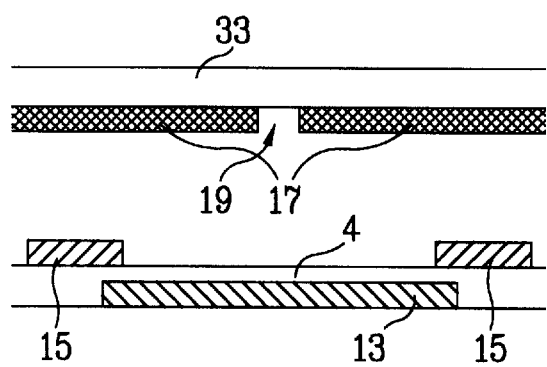
Figure 1C:
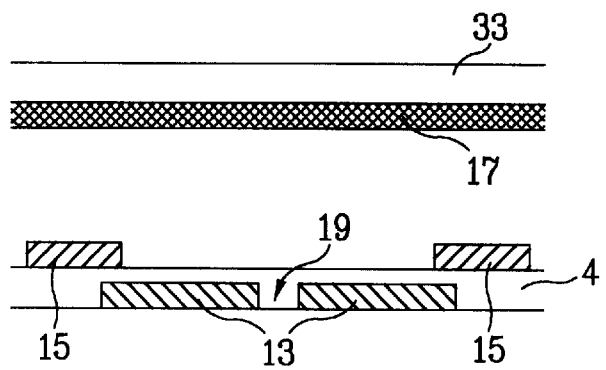
Figure 2A:
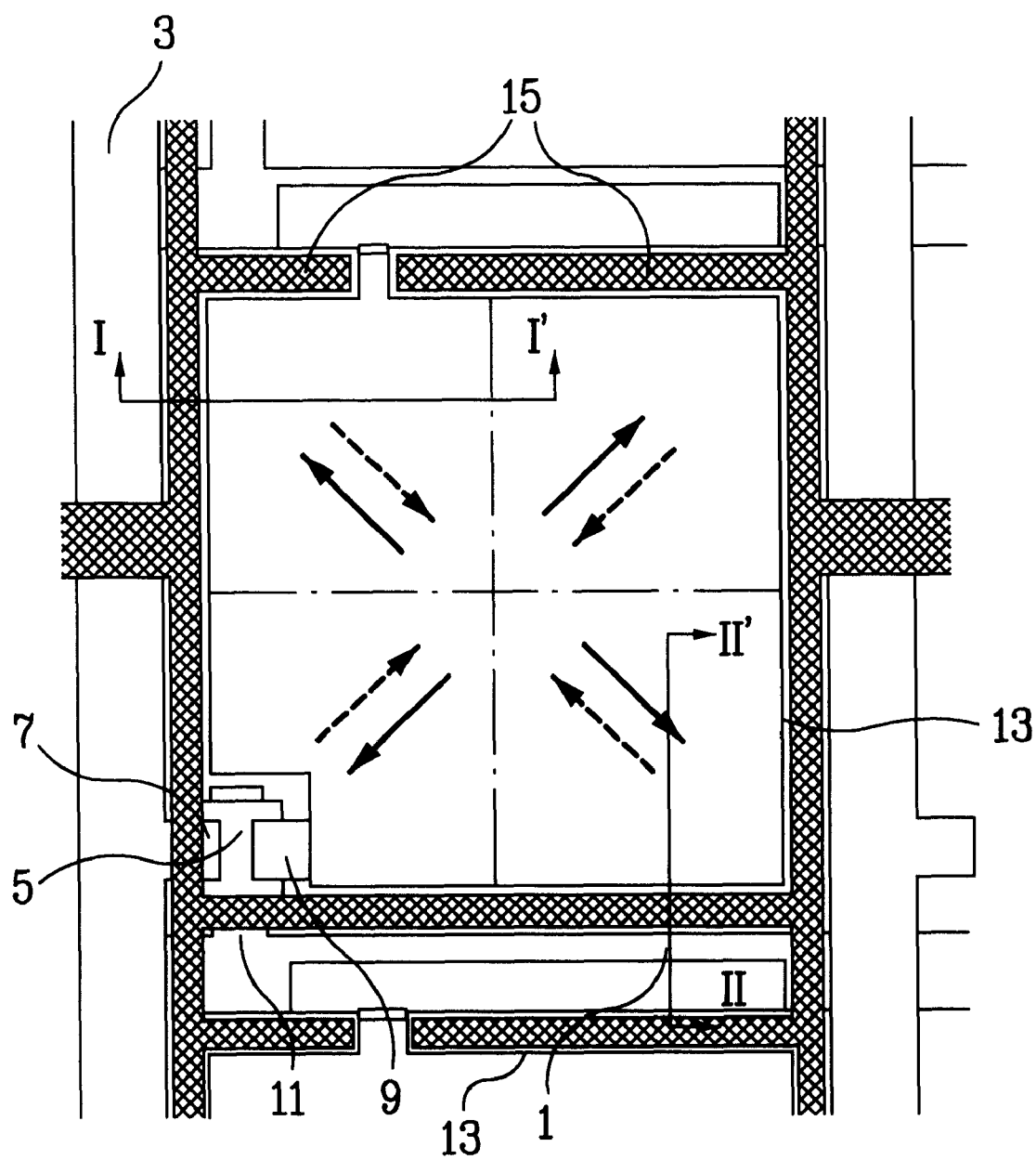
FIGS. 2A to 2D are plan views of the liquid crystal display devices according to the first embodiment of the present invention.
Figure 2B:
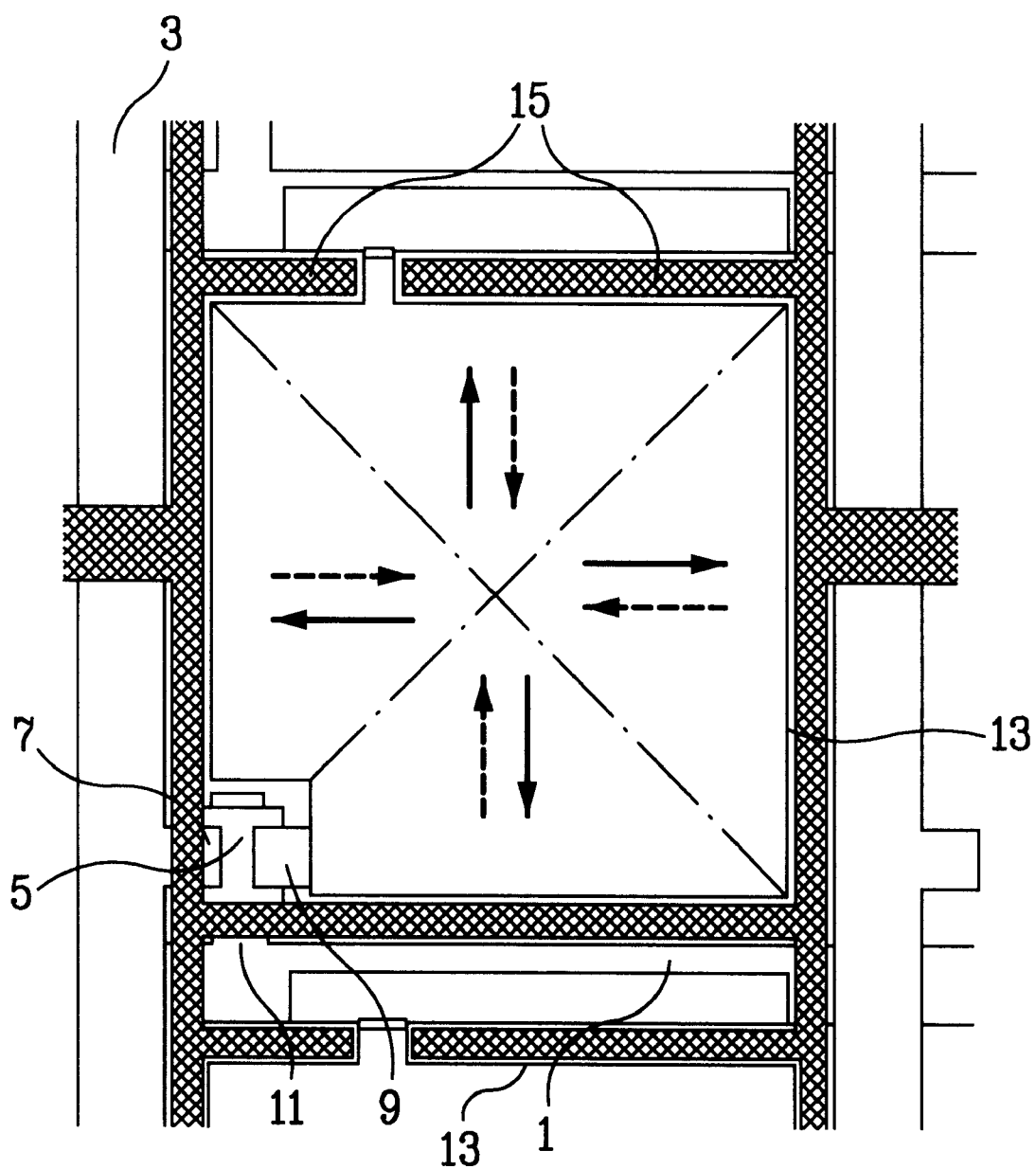
Figure 2C:
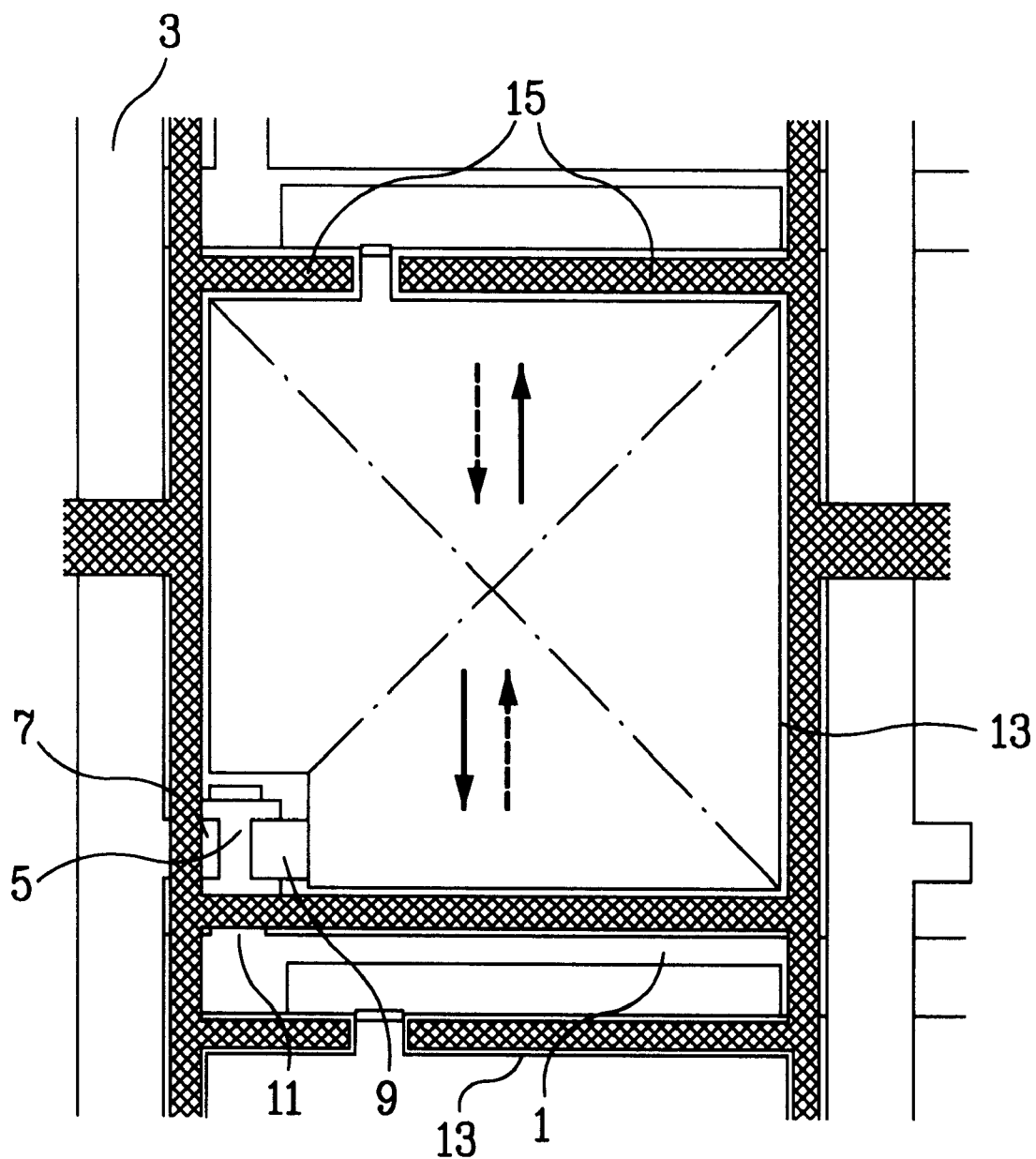
Figure 2D:
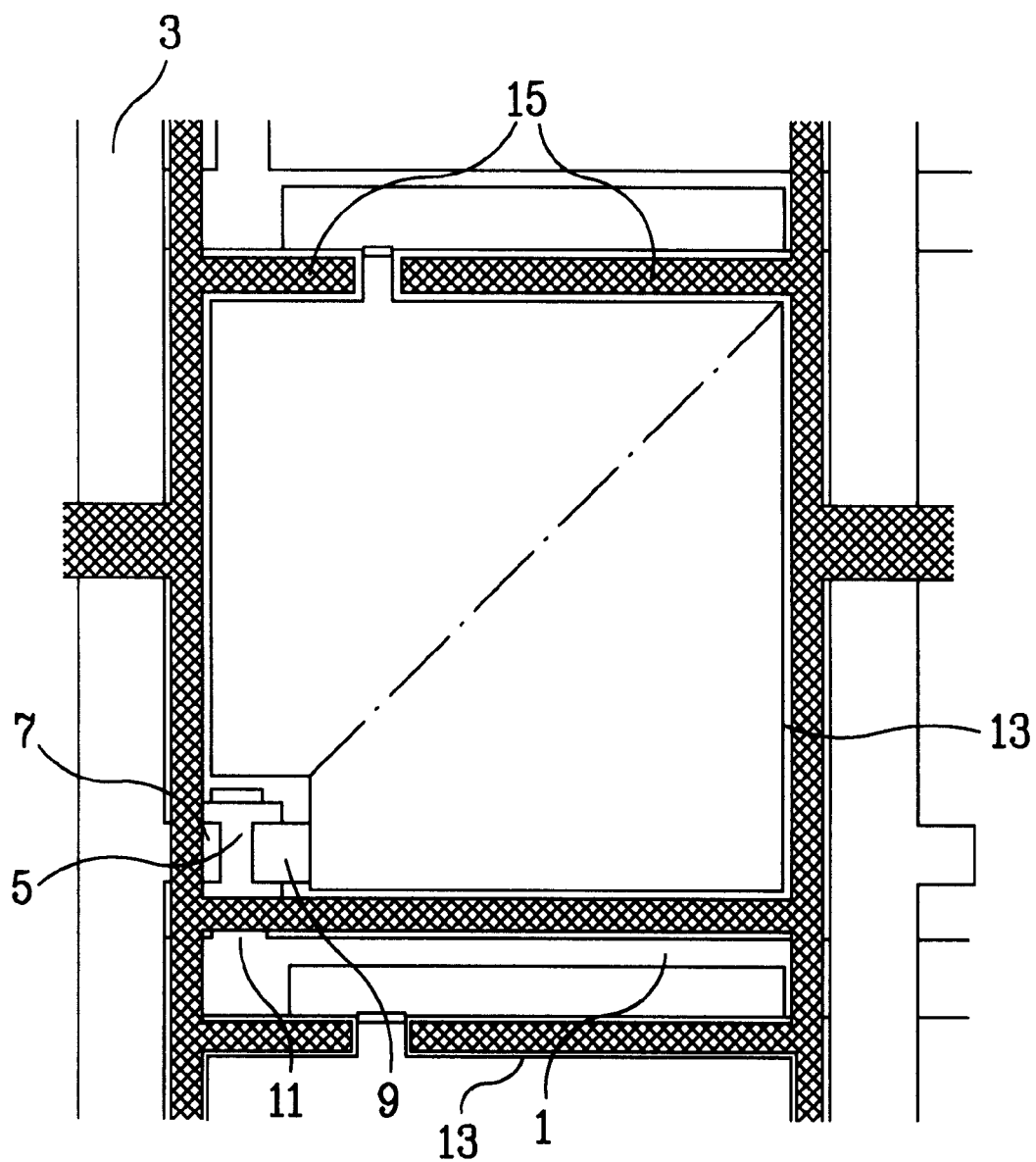

In particular, FIG. 2A shows a four domain "+" shaped configuration where the alignment is in all four domains. FIG. 2B shows a four domain "x" shaped configuration where the alignment is in all four domains. FIG. 2C shows a four-domain configuration where the alignment is in only two of the four domains. FIG. 2D shows a two-domain configuration with no alignment.

Figure 3A:
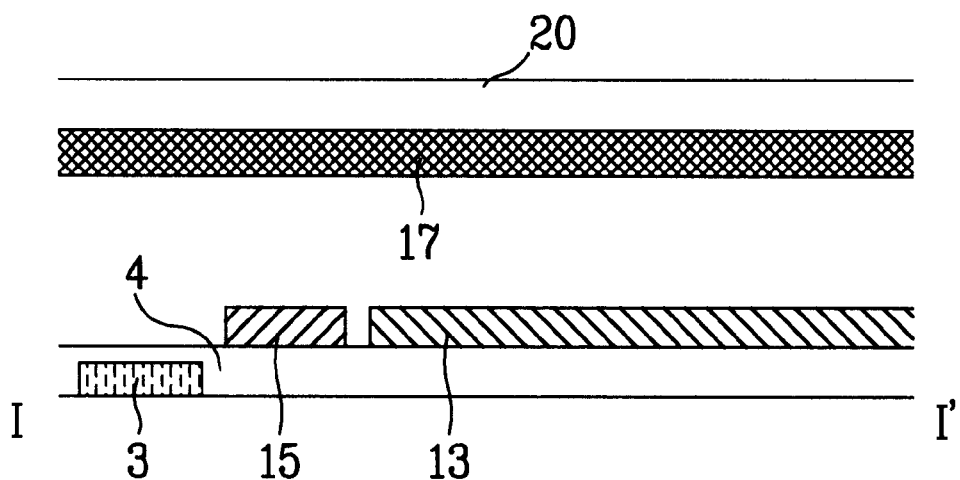
FIGS. 3A to 3B are sectional views taken along the lines I—I and II—II of the liquid crystal display device in FIG. 2A.
Figure 3B:
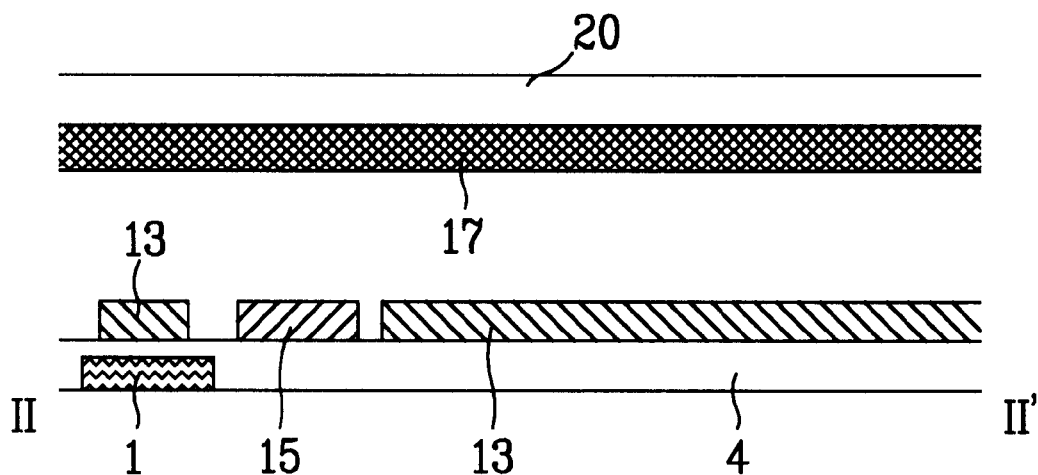

FIGS. 3A to 3B are sectional views taken along the lines A–A' and B–B' in FIG. 2A. Although not shown in FIGS. 3A and 3B, one alignment layer may be on either the first or second substrate, or an alignment layer may be on each of the first and second substrates.

Referring to FIGS. 2A–2D and 3A–3B, the present invention comprises a plurality of gate bus lines 1 arranged in a first direction on a first substrate and a plurality of data bus lines 3 arranged in a second direction on the first substrate, a TFT, a passivation 4, a pixel electrode 13, a side electrode 15, a common electrode 17 on a second substrate 20, and a liquid crystal layer between the first and second substrates.

Data bus lines 3 and gate bus lines 1 divide the first substrate into a plurality of pixel regions. The TFT is formed on the each pixel region and comprises a gate electrode 11, a gate insulator, a semiconductor layer 5, an ohmic contact layer, and source/drain electrodes 7, 9. Passivation 4 is formed on the TFT and data bus lines 3 preferably through the whole first substrate. Pixel electrode 13 is coupled to drain electrode 9 and overlap the TFT and/or data bus lines 3, and gate bus lines 1 on passivation 4. Side electrode 15 is formed in a region except the region in which the pixel electrode is on passivation 4.

Side electrode 15 and pixel electrode 13 is separated by passivation 4, which prevents gate bus line 1 and data bus line 3 from interfering the distorted electric field of side electrode 15. The passivation 4 is formed by depositing a material such as $SiN_x$ or $SiO_x$. Further, if side electrode 15 and pixel electrode 13 are overlapped with the TFT and/or data bus line 3, crosstalk is generated. Thus, side and pixel electrodes 15, 13 are formed to not overlap with the TFT and/or data bus line by the passivation as an interlayer.

To manufacture the LCD, in each pixel region on the first substrate, a TFT is formed comprising gate electrode 11, gate insulator, semiconductor layer 5, ohmic contact layer and source/drain electrodes 7, 9. At this time, a plurality of gate bus lines 1 and a plurality of data bus lines 3 are formed to divide the first substrate into a plurality of pixel regions.

Gate electrode 11, gate/data bus lines 1, 3, and source/drain electrodes 7, 9 are formed by depositing a metal such as Al, Mo, Cr, Ta or Al alloy, etc. using a sputtering and patterning technique. Semiconductor layer 5 and the ohmic contact layer are formed by depositing using Plasma CVD (Plasma Chemical Vapor Deposition) and patterning amorphous silicon (a-Si) and doped amorphous silicon ($n^+$a-Si), respectively. The gate insulator is formed from depositing with Plasma CVD and patterning $SiN_x$ or $SiO_x$. Side and pixel electrodes 15, 13 are formed by depositing a metal such as ITO(indium tin oxide), Al, Mo, Cr, Ta, Ti or Al alloy using a sputtering and patterning technique.

At this time, it is possible to form side and pixel electrodes 15, 13 by patterning the same metal once or by patterning different metals twice.

On second substrate 20, common electrode 17 is formed by depositing ITO through sputtering and patterning. The liquid crystal layer is formed by injecting liquid crystal between the first and second substrates.

The side electrode 15 preferably has the same or substantially the same potential as the common electrode. One way to accomplish this is to electrically connect the side electrode 15 to the common electrode. For example, if the potential difference between the pixel electrode and the common electrode is 5V, then the potential difference between the pixel electrode and the side electrode is also 5V.

Furthermore, in the present LCD, an alignment layer(not shown in the figure) is formed over the whole first and/or second substrates. The alignment layer includes a material such as polyamide or polyimide based materials, PVA (polyvinylalcohol), polyamic acid or $SiO_2$. When rubbing is used to determine an alignment direction, it should be possible to apply any material suitable for the rubbing treatment.

Moreover, it is possible to form the alignment layer with a photosensitive material such as PVCN (polyvinylcinnamate), PSCN (polysiloxanecinnamate), and CelCN (cellulosecinnamate) based materials. Any material suitable for the photo-aligning treatment may be used. Irradiating light once on the alignment layer determines the alignment or pretilt direction and the pretilt angle. The light used in the photo-alignment is preferably a light in a range of ultraviolet light, and any of non-polarized light, linearly-polarized light, and partially-polarized light can be used.

In the rubbing or photo-alignment treatment, it is possible to apply one or both of the first and second substrates, and to apply different aligning-treatment on each substrate.

As shown in FIGS. 4 and 5, from the aligning-treatment, a multi-domain LCD is formed with at least two domains, and LC molecules of the LC layer are aligned differently one another on each domain. That is, as shown in FIGS. 2A to 2D, the multi-domain is obtained by dividing each pixel into four domains such as in a "+" or "x" shape, or dividing each pixel horizontally, vertically, and/or diagonally, and differently alignment-treating or forming alignment directions on each domain and on each substrate.

The solid line arrow and dotted line arrow in the figures represent alignment directions of each domain of the first and second substrates, respectively. It is possible to have at least one domain of the divided domains unaligned. It is also possible to have all domains unaligned.

Figure 4A:
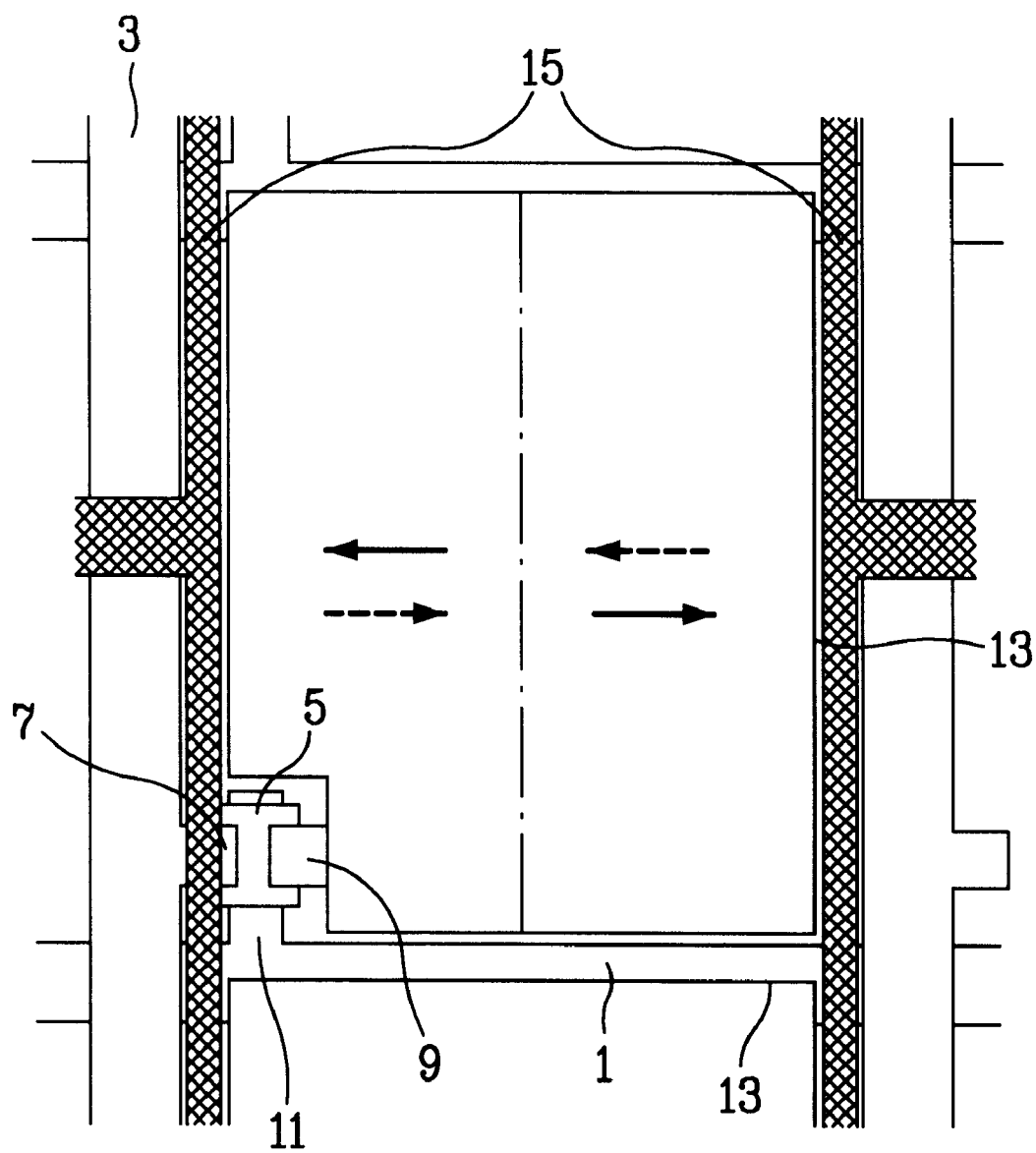
FIGS. 4A to 4C are plan views of the liquid crystal display devices according to the second embodiment of the present invention.
Figure 4B:
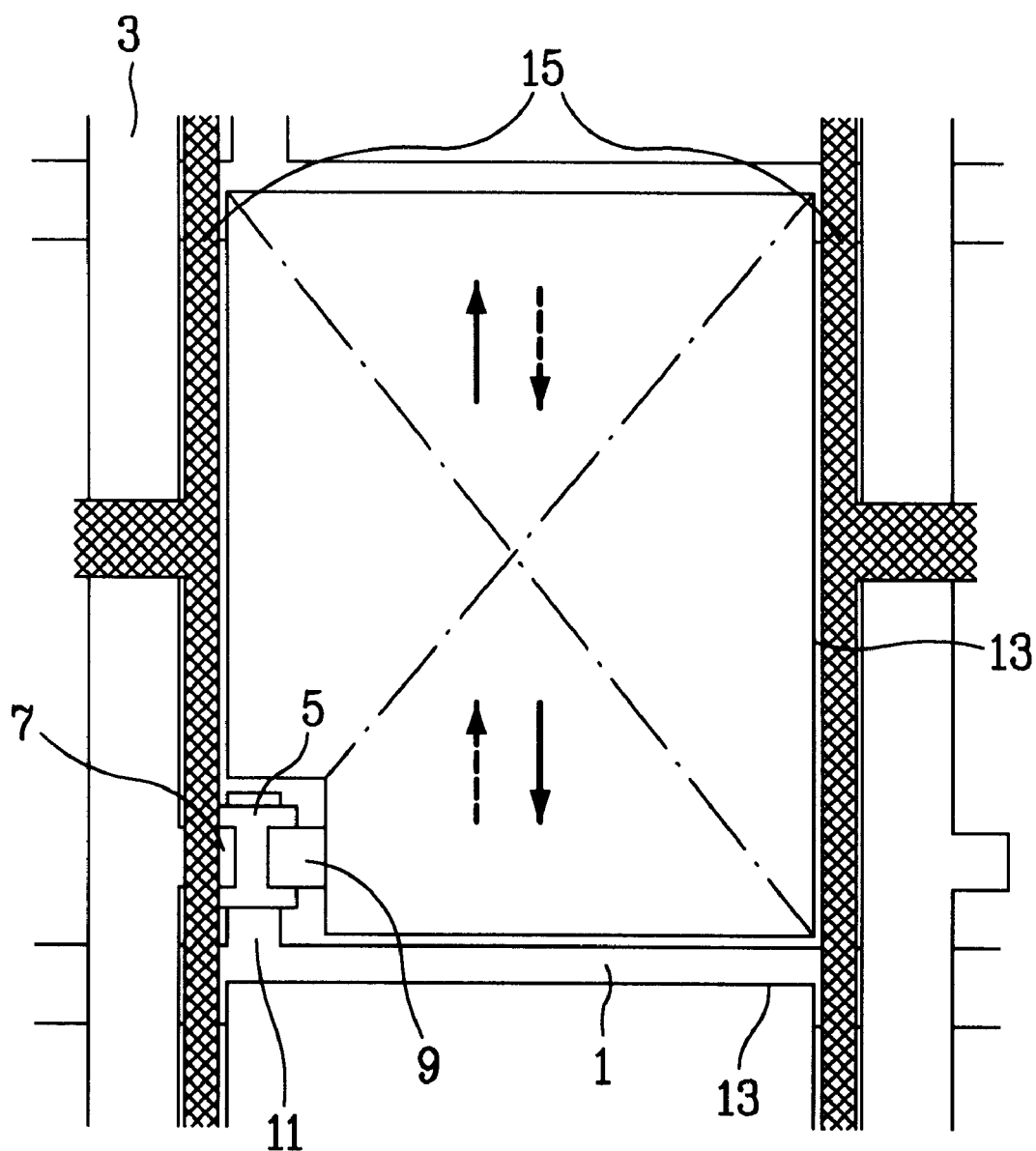
Figure 4C:
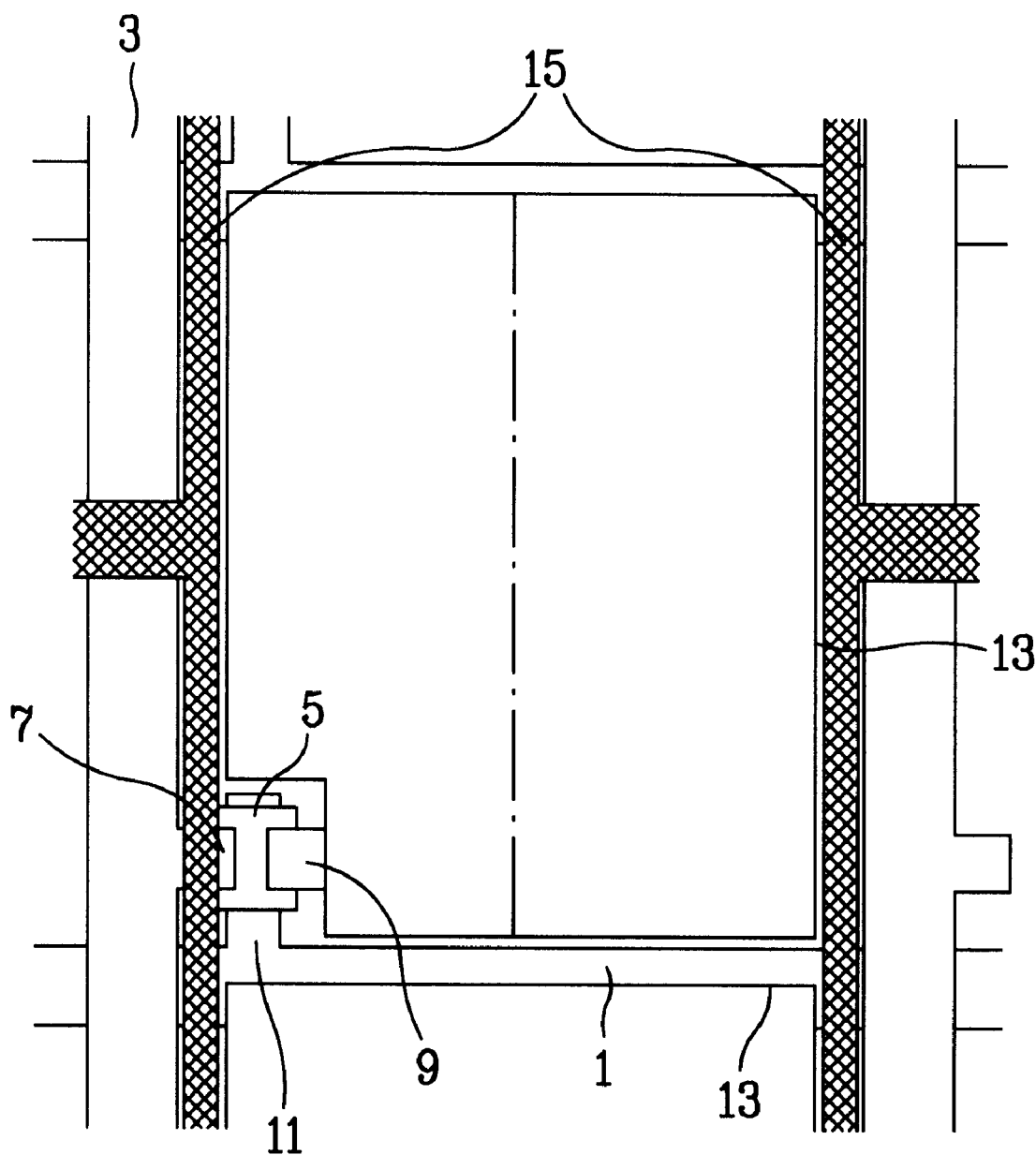

FIGS. 4A to 4C are plan views of the liquid crystal display devices according to the second embodiment. The second embodiment is similar to the first embodiment, except that the side electrode 15 is formed on the side of only the data bus line 3, i.e., there is no horizontal side electrode. Therefore, the pixel region is broader than the first embodiment.

Further, the multi-domain is obtained by dividing each pixel into four domains such as in a "+" or "x" shape, or dividing each pixel horizontally, vertically, and/or diagonally, and differently alignment-treating or forming alignment directions on each domain and on each substrate. It is possible to have at least one domain of the divided domains unaligned. It is also possible to have all domains unaligned.

In particular, FIG. 4A shows a two-domain configuration where the alignment is in both domains. FIG. 4B shows a four-domain configuration where the alignment is in only two of the four domains. FIG. 4C shows a two-domain configuration with no alignment.

Figure 5A:
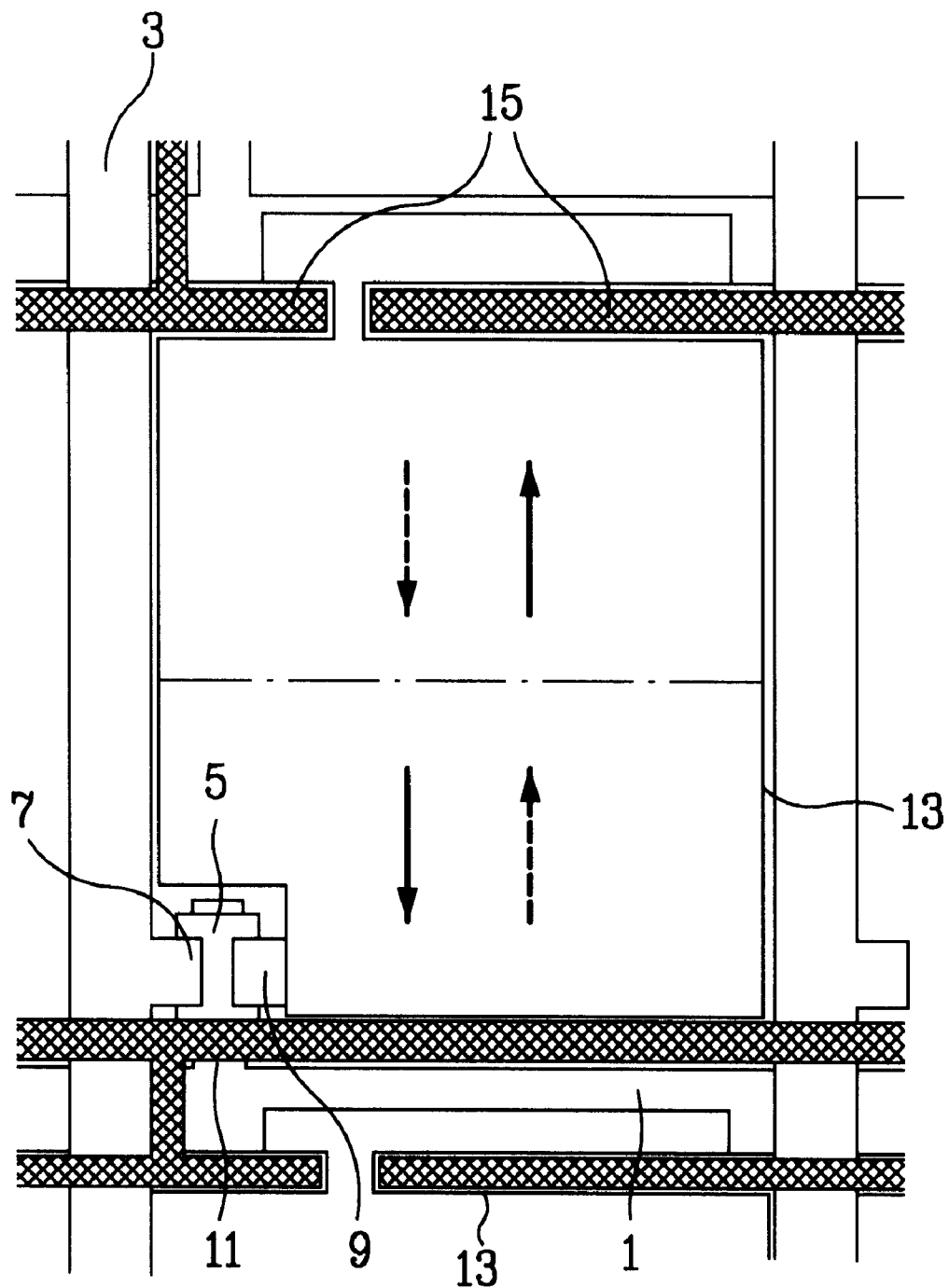
FIGS. 5A to 5C are plan views of the liquid crystal display devices according to the third embodiment of the present invention.
Figure 5B:
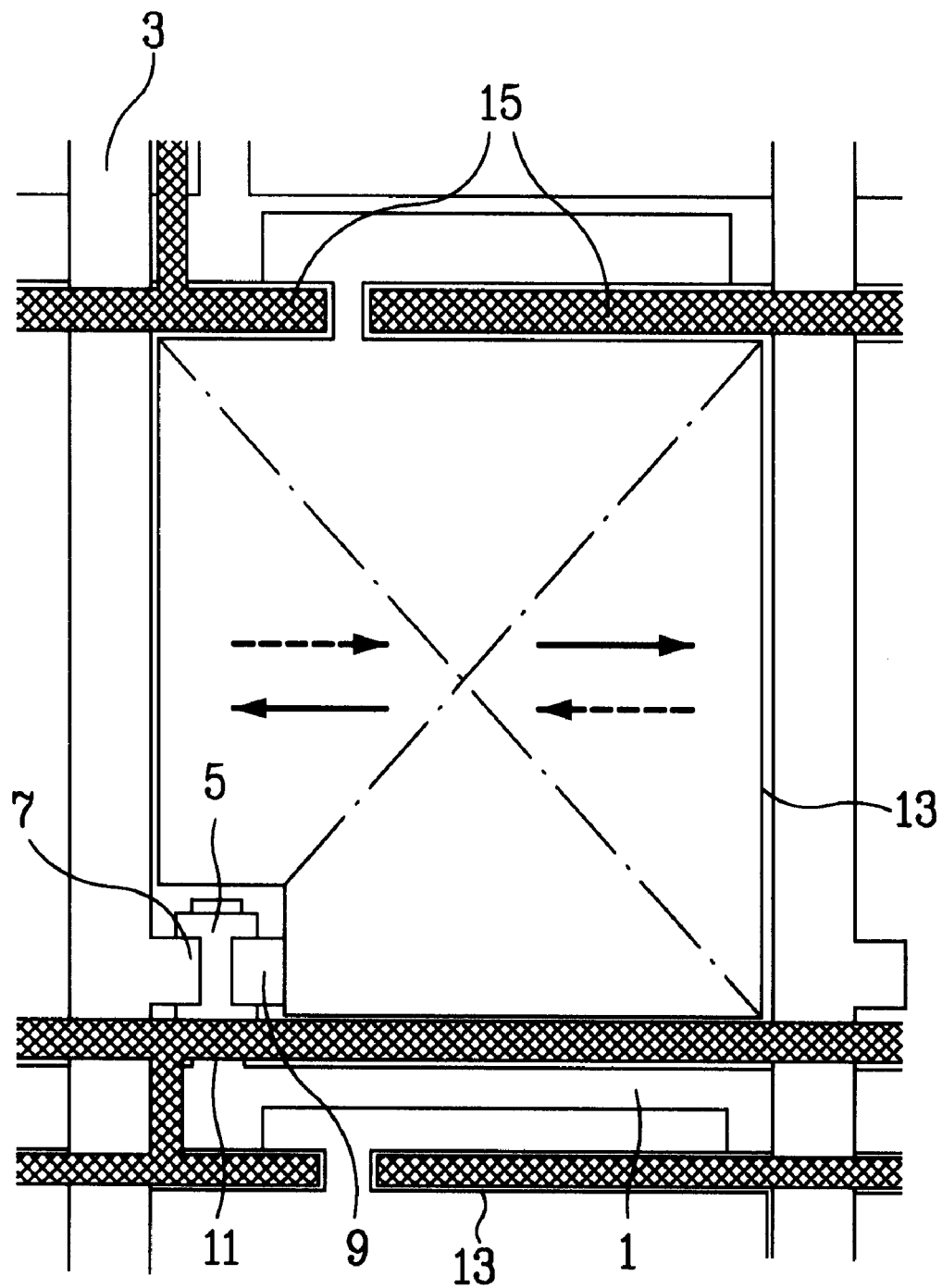
Figure 5C:
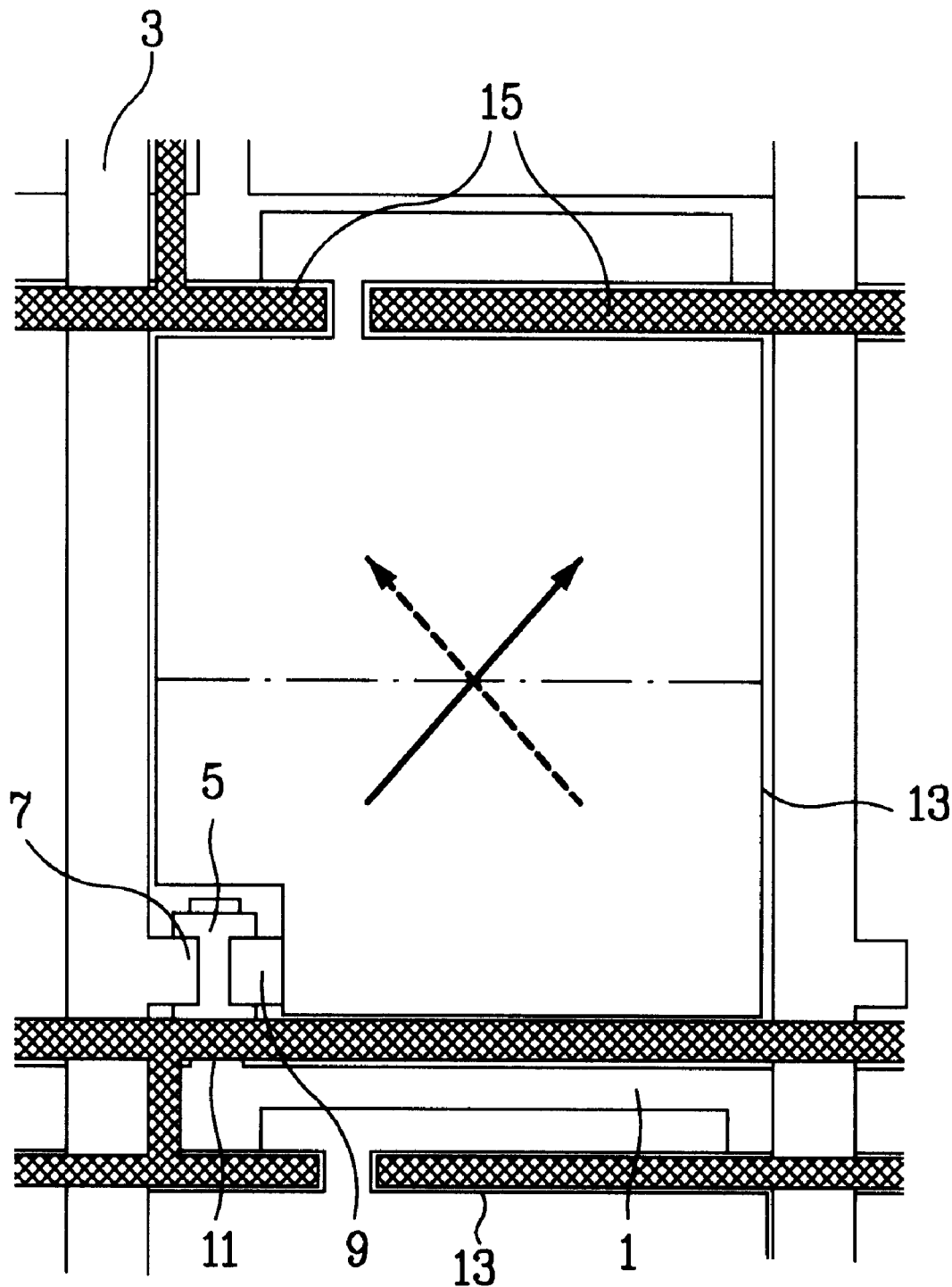

FIGS. 5A to 5C are plan views of the liquid crystal display devices according to the third embodiment. The third embodiment is similar to the first and second embodiments, except that the side electrode 15 is formed on the side of only the gate bus line 1, i.e., there is no vertical side electrode. Therefore, the pixel region may be broader than the first and second embodiments. The embodiments shown in FIGS. 5A–5C have a storage-on-common structure.

Further, the multi-domain is obtained by dividing each pixel into four domains such as in a "+" or "x" shape, or dividing each pixel horizontally, vertically, and/or diagonally, and differently alignment-treating or forming alignment directions on each domain and on each substrate. It is possible to have at least one domain of the divided domains unaligned. It is also possible to have all domains unaligned.

FIGS. 6A to 6D are plan views of the liquid crystal display devices according to the fourth embodiment. FIGS. 6A–6D are similar to FIGS. 2A–2D, respectively, except that the side electrode 15 overlaps the data bus line to increase the aperture ratio by using, for example, a low dielectric material such as BCB as the passivation.

Figure 6A:
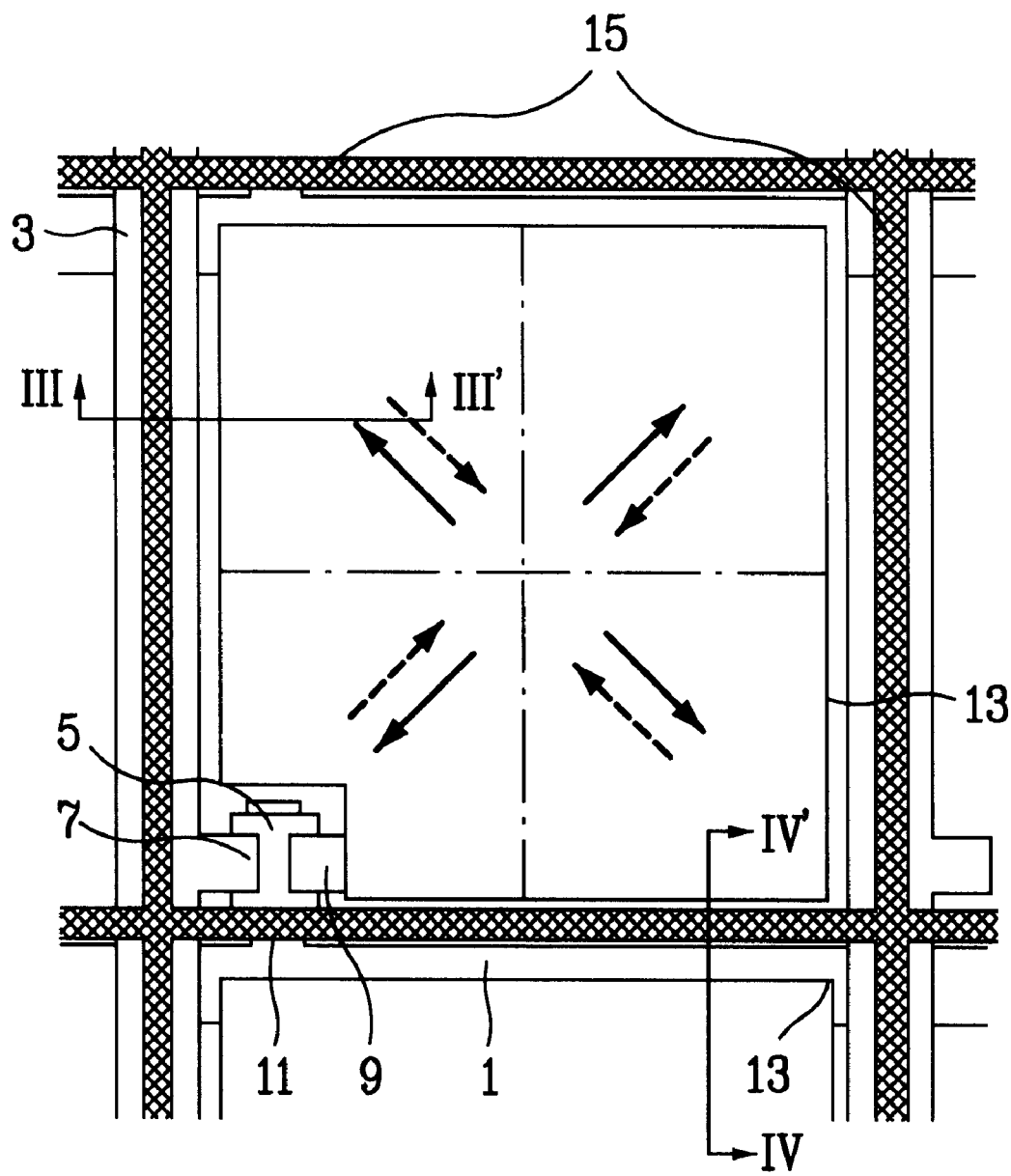
FIGS. 6A to 6D are plan views of the liquid crystal display devices according to the fourth embodiment of the present invention.
Figure 6B:
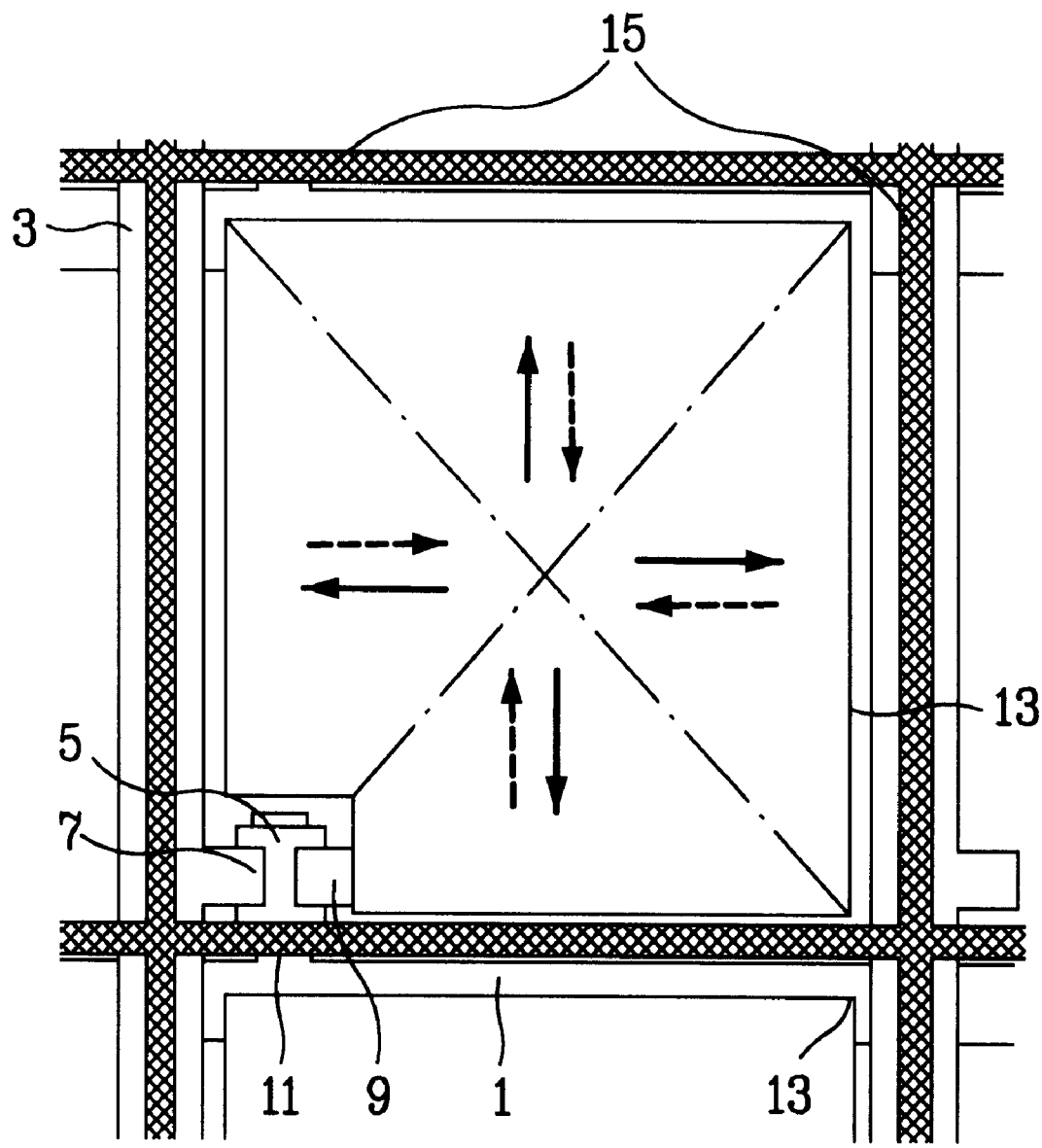
Figure 6C:
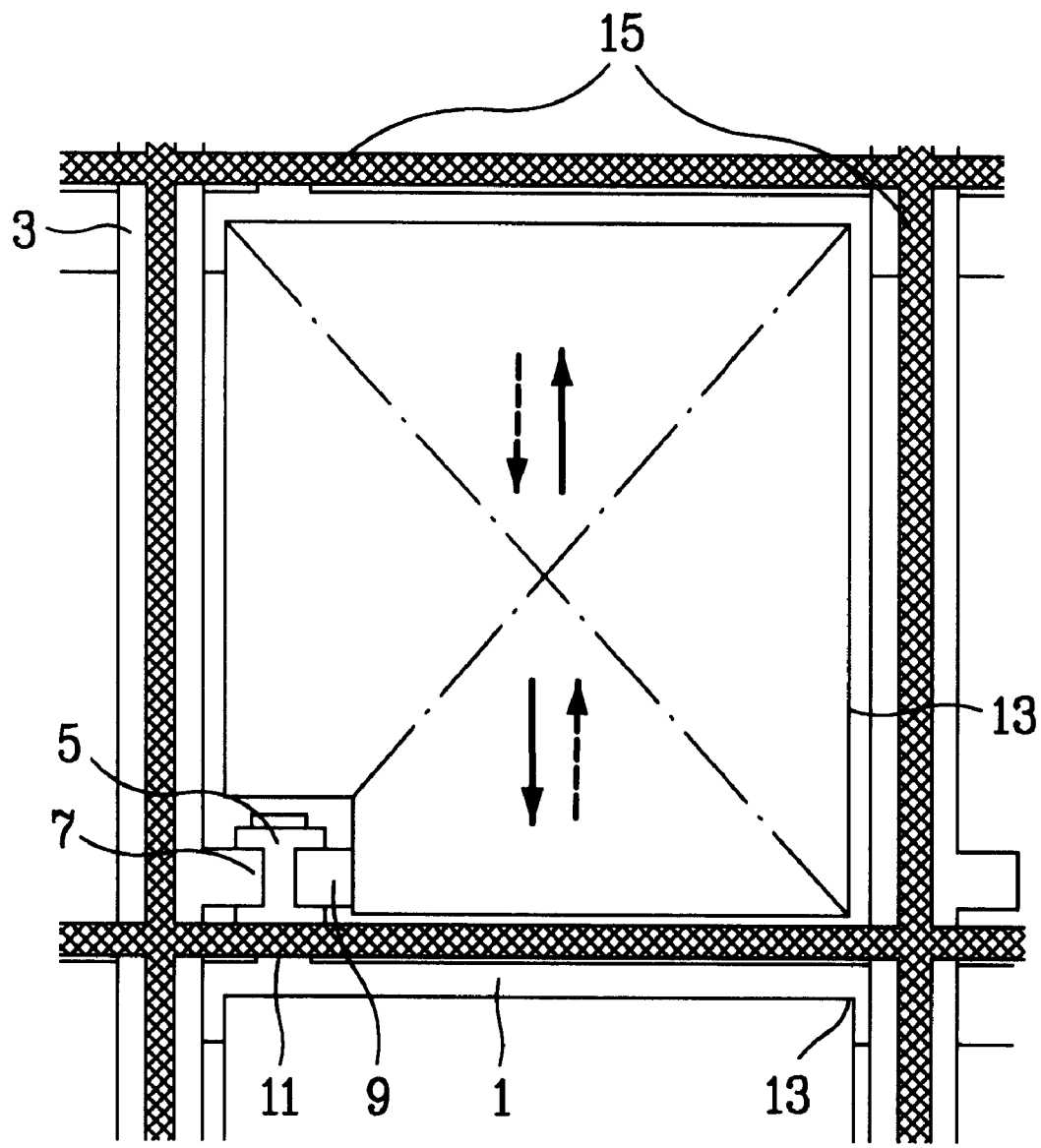
Figure 6D:
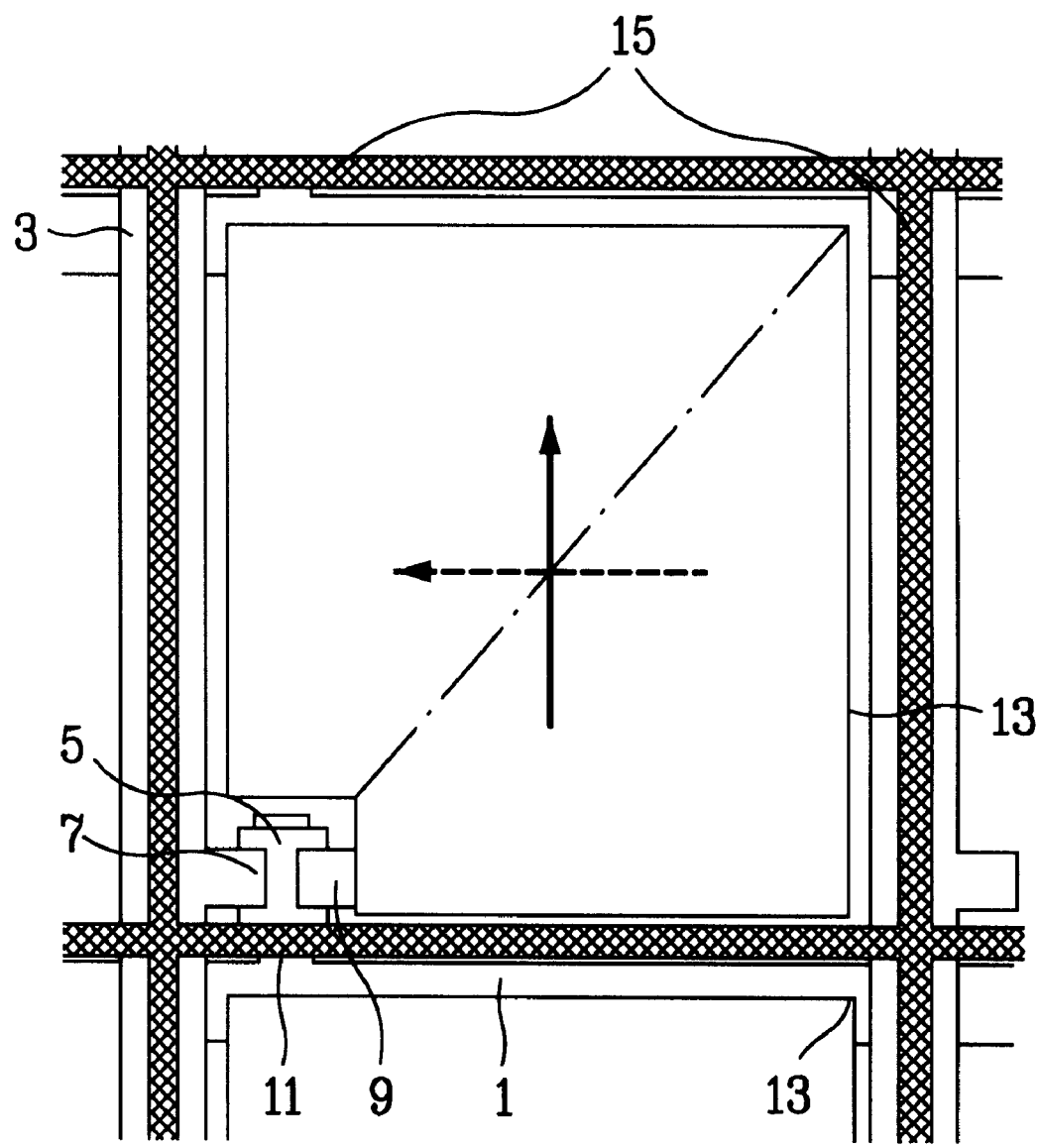
Figure 7A:
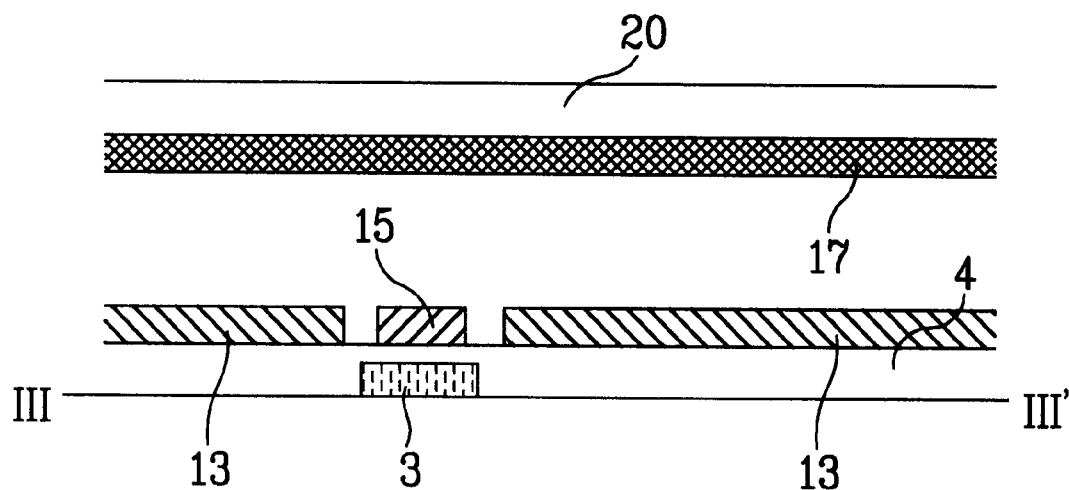
FIGS. 7A to 7B are sectional views taken along the lines III—III and IV—IV of the liquid crystal display device in FIG. 6A.
Figure 7B:
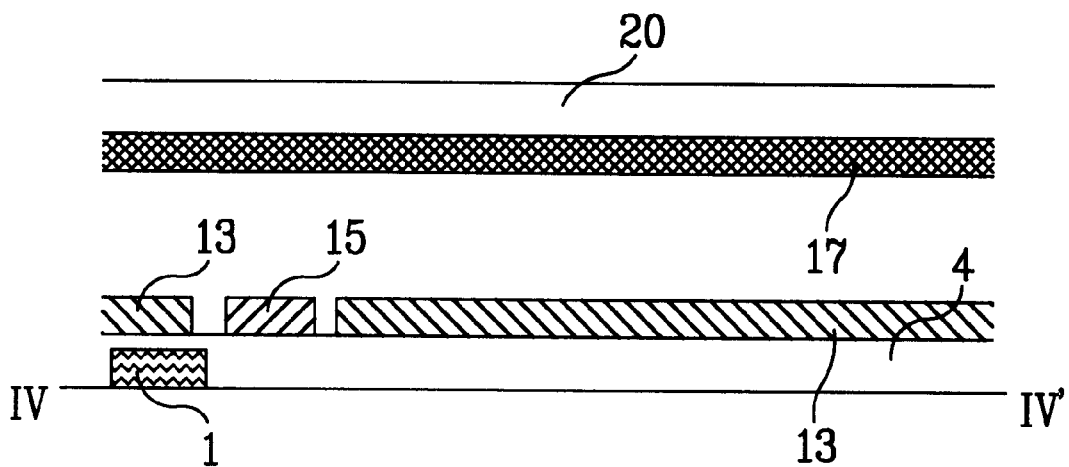

FIGS. 7A to 7B are sectional views taken along the lines A–A' and B–B' of the liquid crystal display device in FIG. 6A. Although not shown in FIGS. 7A and 7B, one alignment layer may be on either the first or second substrate, or an alignment layer may be on each of the first and second substrates.

In the fourth embodiment, the passivation includes BCB (benzocyclobutene), acrylic resin, or polyimide compound, etc. as an organic insulator. Hence, the side electrode on the side of data bus line 3 is formed on any place on the data bus line 3 and the aperture ratio is improved. Moreover, the side electrode can be positioned in any place relative to the first three embodiments, and therefore, the pixel region is broader than the first, second, and third embodiments.

In the fourth embodiment, the multi-domain is obtained by dividing each pixel into four domains such as in a "+" or "x" shape, or dividing each pixel horizontally, vertically, and/or diagonally, and differently alignment-treating or forming alignment directions on each domain and on each substrate. It is possible to have at least one domain of the divided domains unaligned. It is also possible to have all domains unaligned.

Figure 8A:
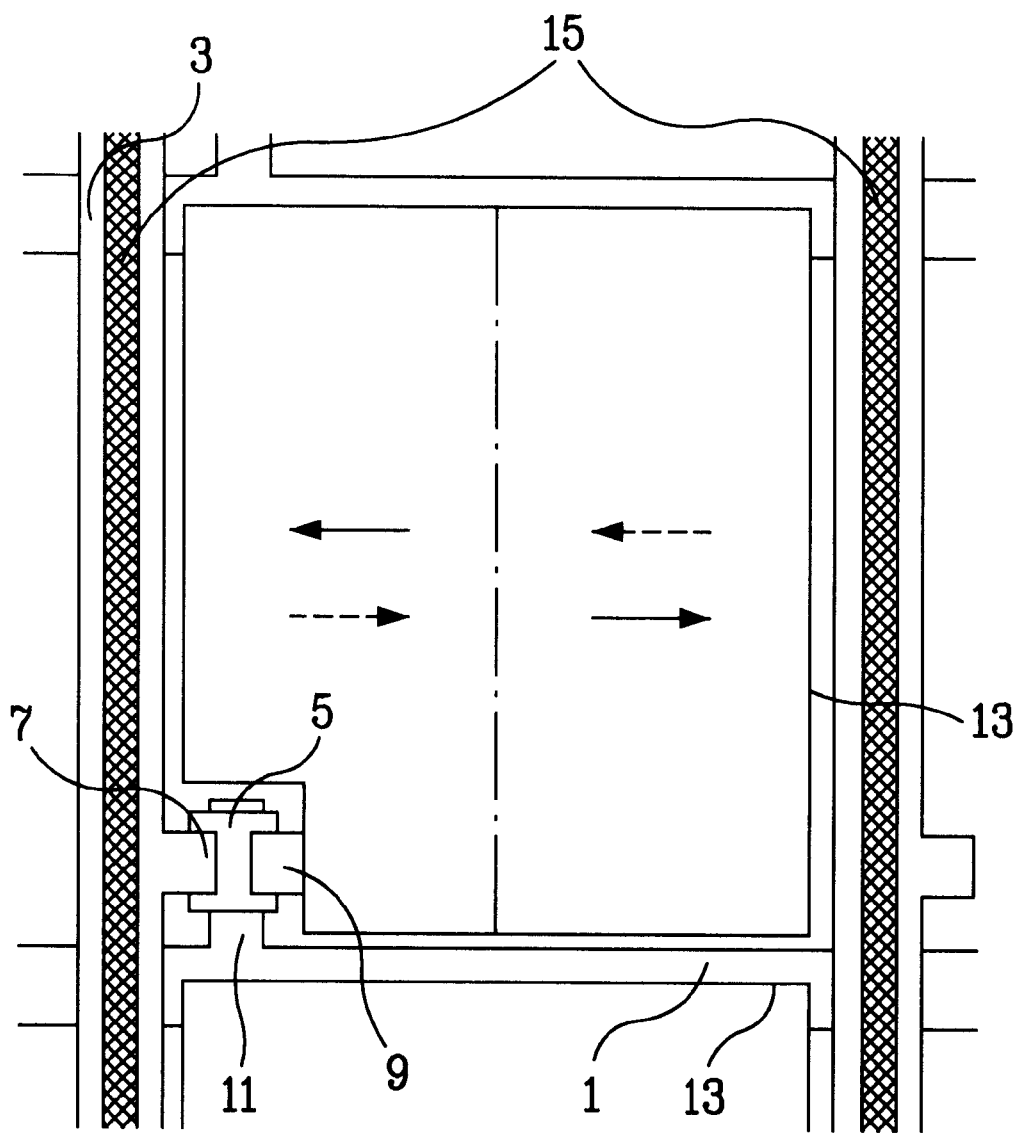
FIGS. 8A to 8C are plan views of the liquid crystal display devices according to the fifth embodiment of the present invention.
Figure 8B:
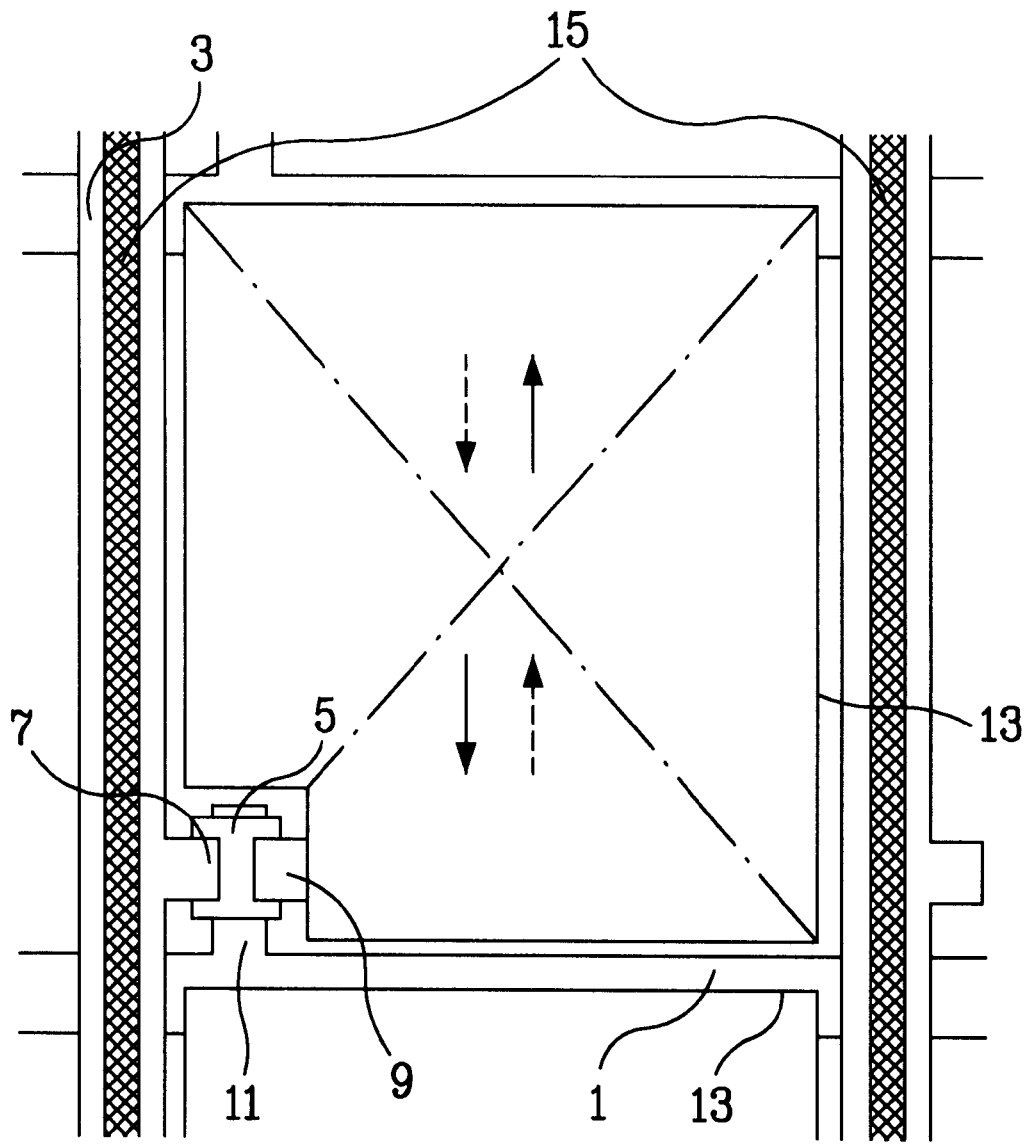
Figure 8C:
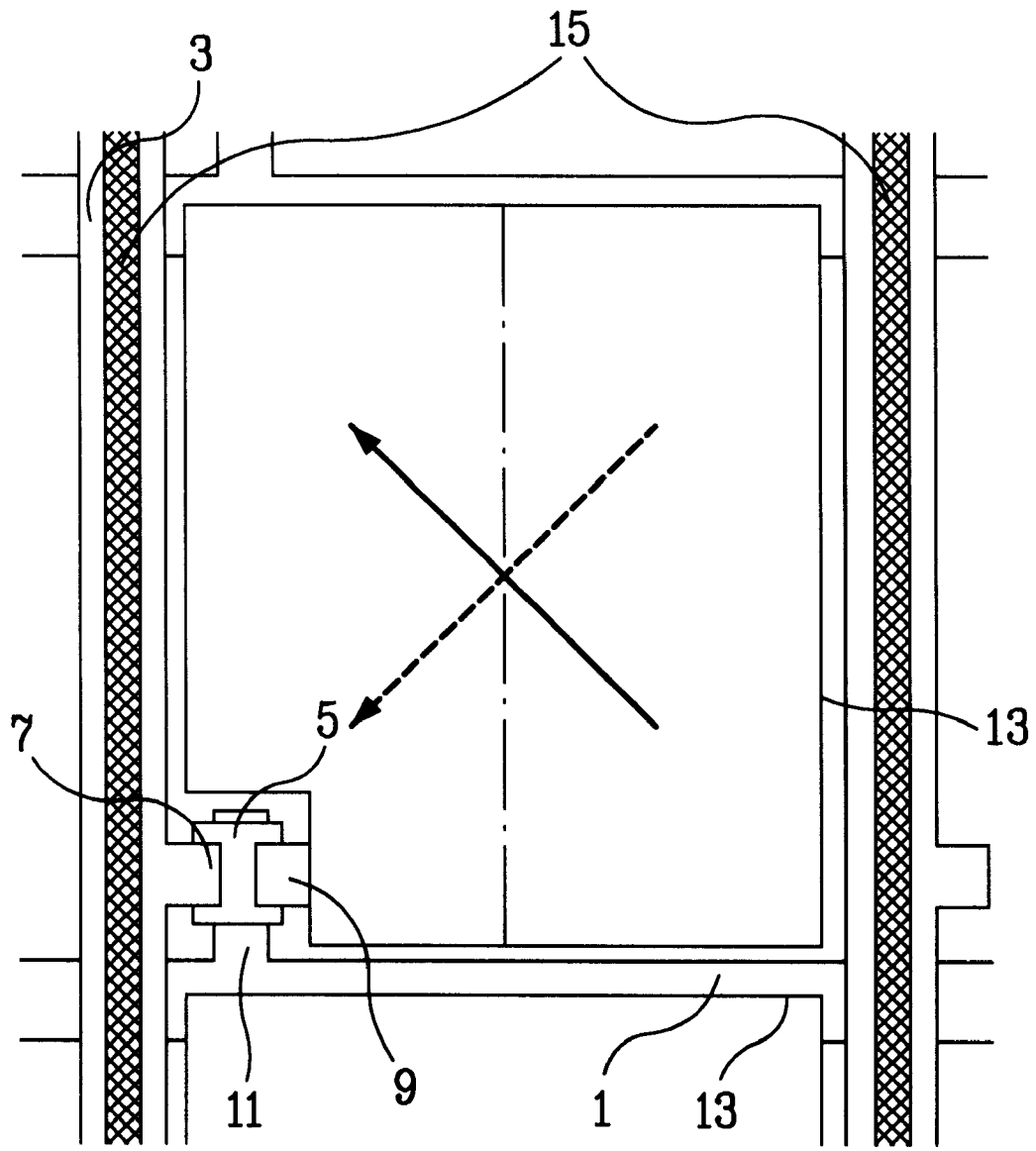

FIGS. 8A to 8C are plan views of the liquid crystal display devices according to the fifth embodiment. The fifth embodiment is similar to the fourth embodiment, except that the side electrode 15 is formed on any place on only the data bus line 3. Therefore, the pixel region is broader than the fourth embodiment.

The multi-domain for the fifth embodiment is obtained by dividing each pixel into four domains such as in a "+" or "x" shape, or dividing each pixel horizontally, vertically, and/or diagonally, and differently alignment-treating or forming alignment directions on each domain and on each substrate. It is possible to have at least one domain of the divided domains unaligned. It is also possible to have all domains unaligned.

Figure 9A:
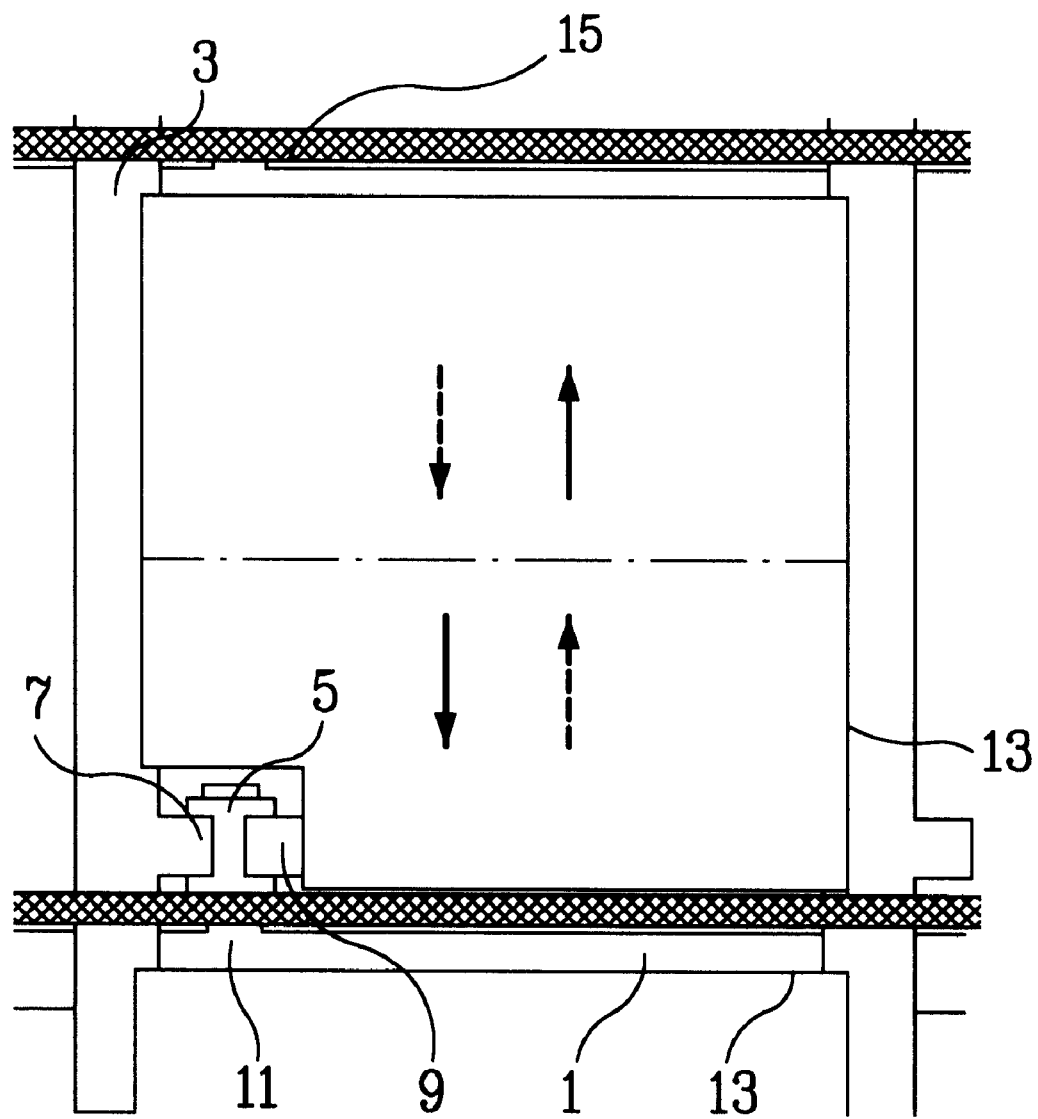
FIGS. 9A to 9C are plan views of the liquid crystal display devices according to the sixth embodiment of the present invention.
Figure 9B:
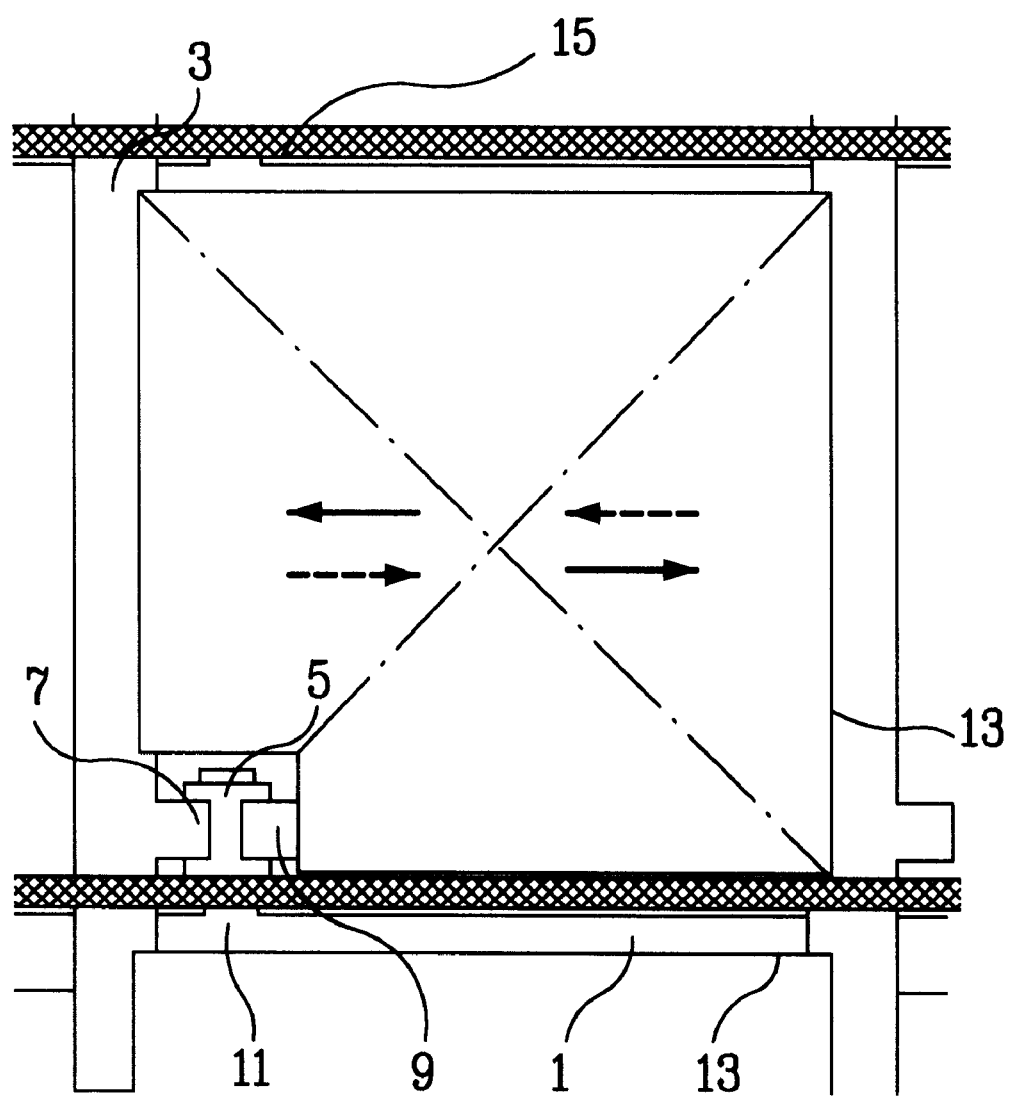
Figure 9C:
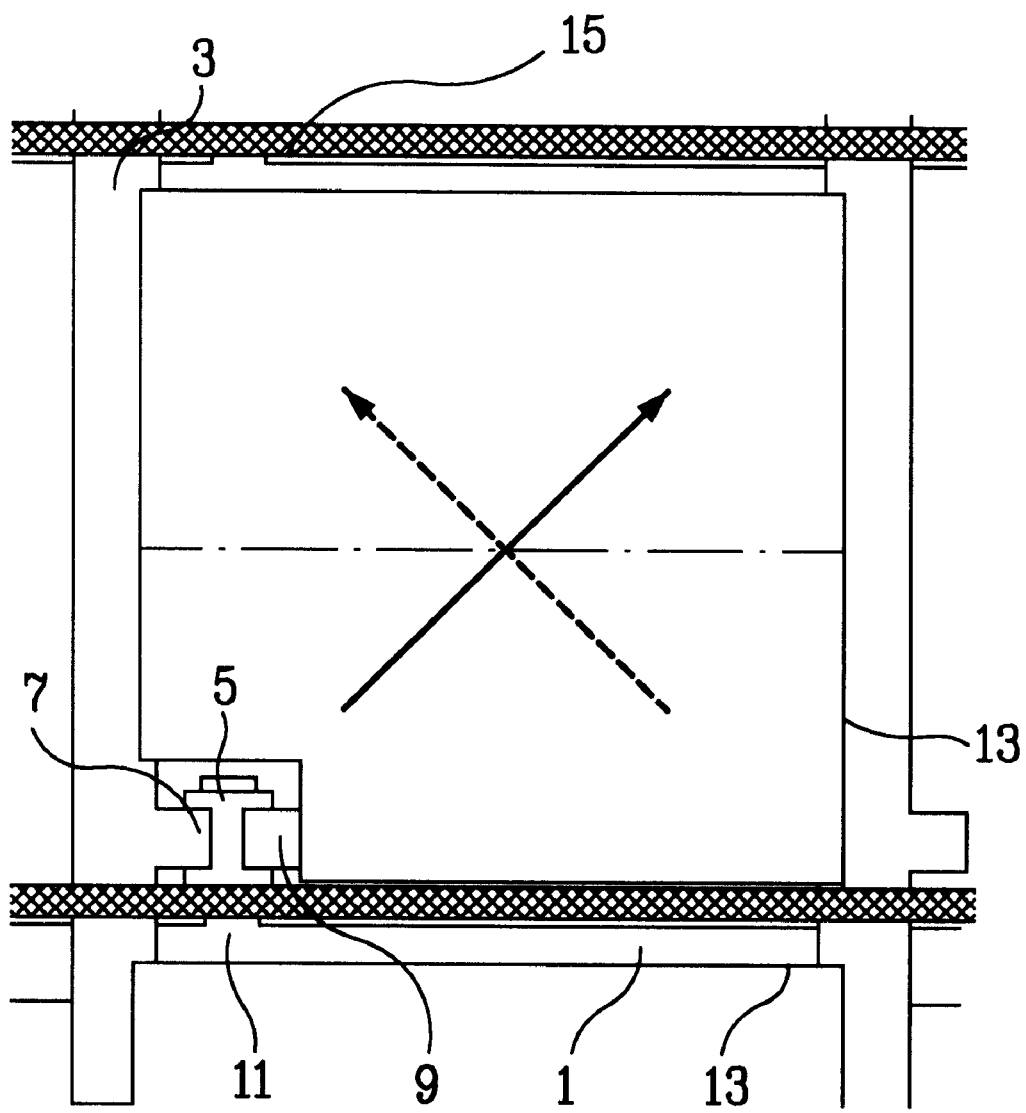
Figure 10A:
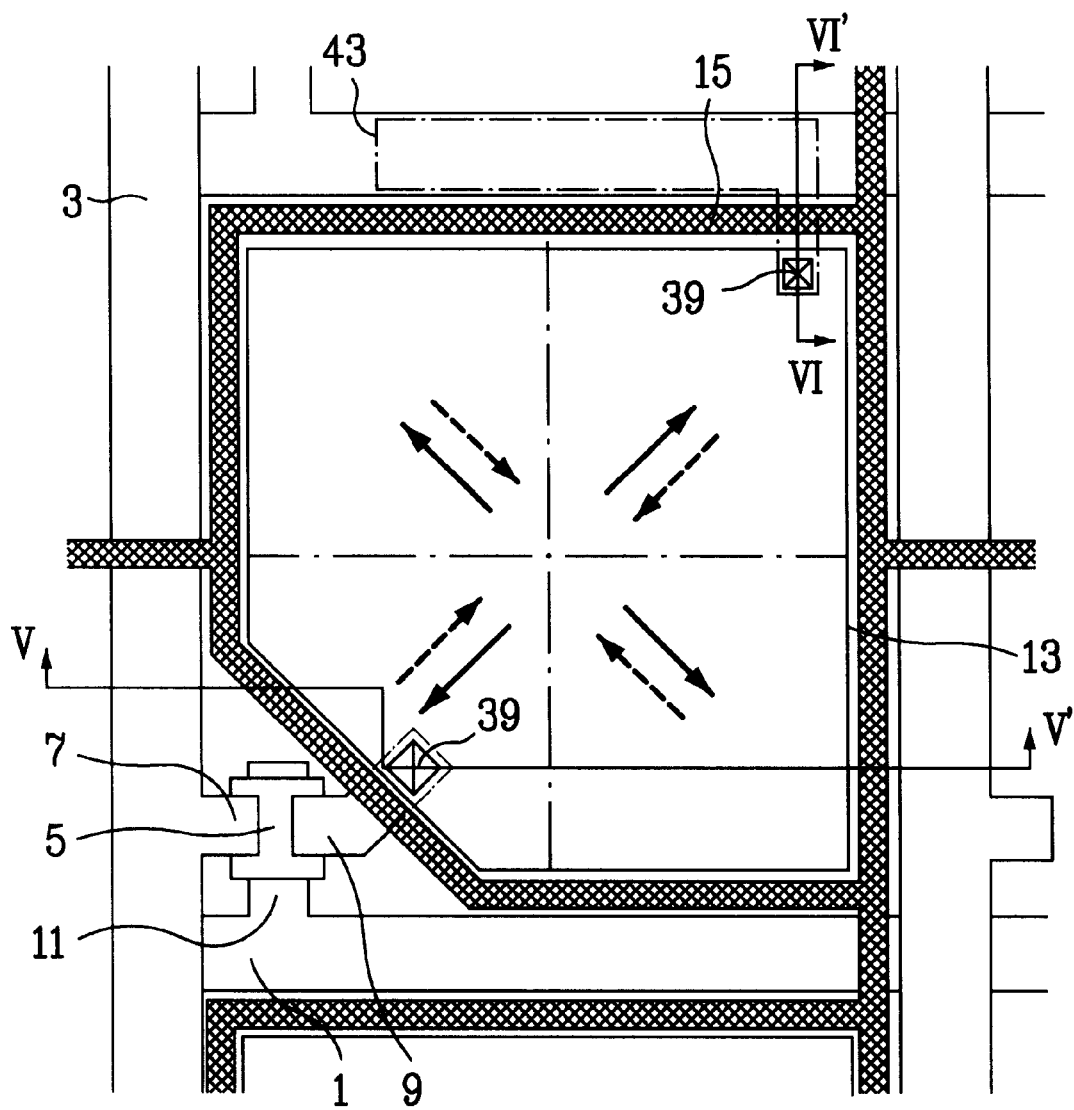
FIGS. 10A to 10D are plan views of the liquid crystal display devices according to the seventh embodiment of the present invention.
Figure 10B:
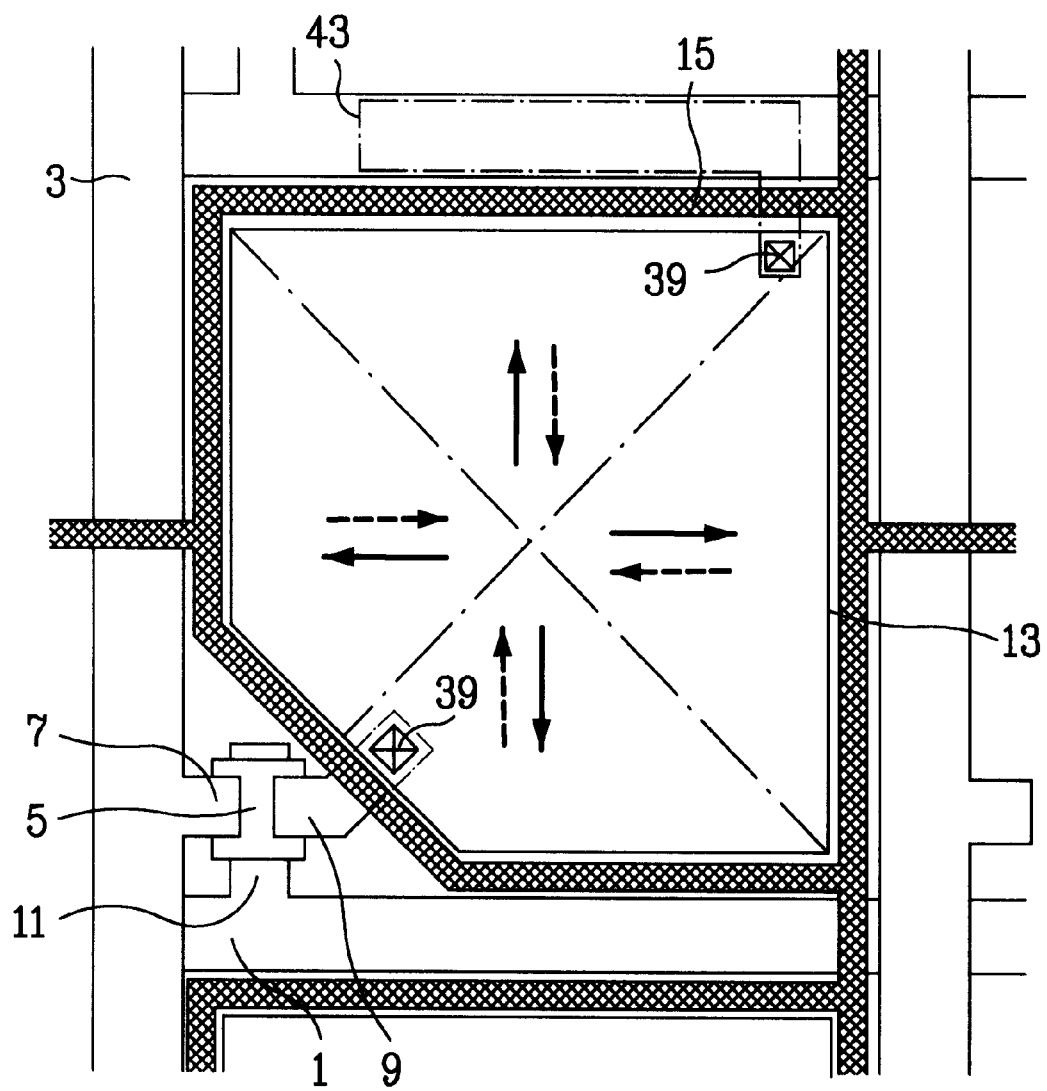
Figure 10C:
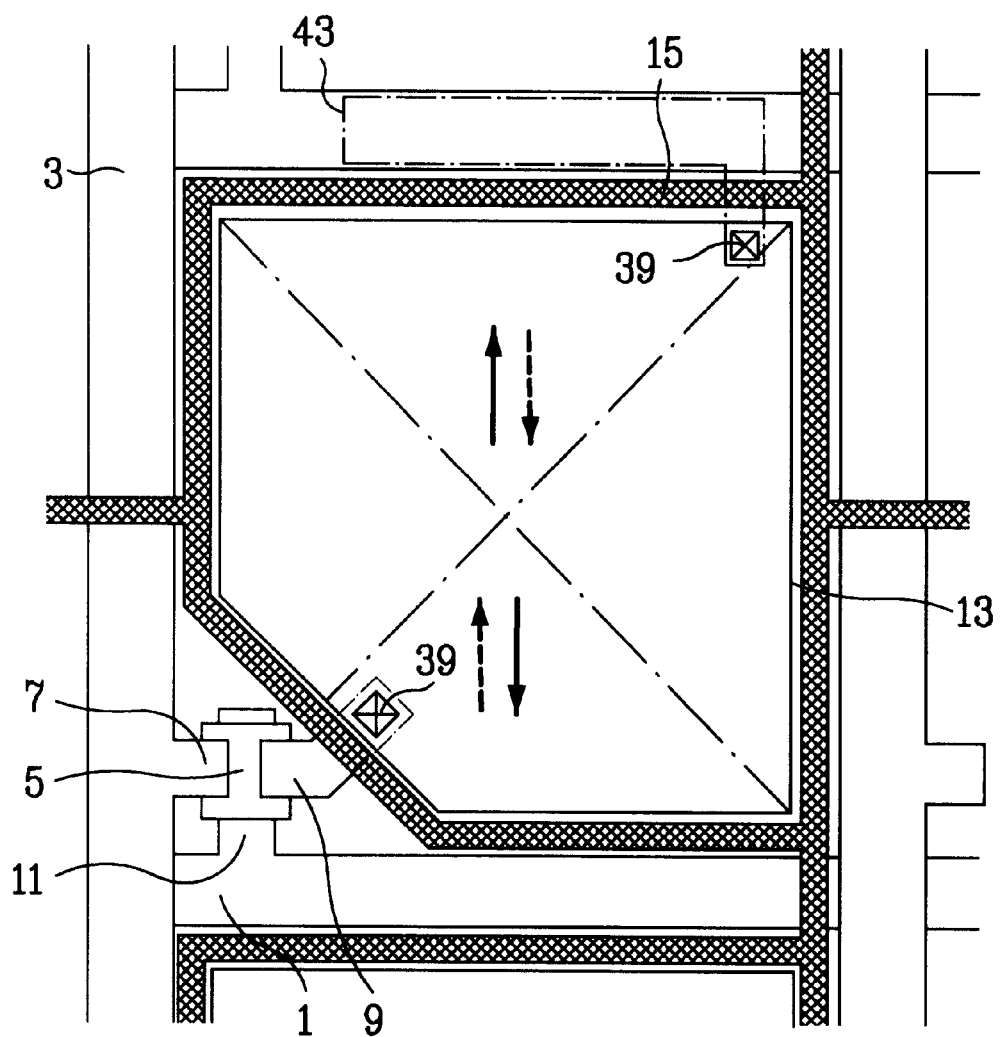
Figure 10D:
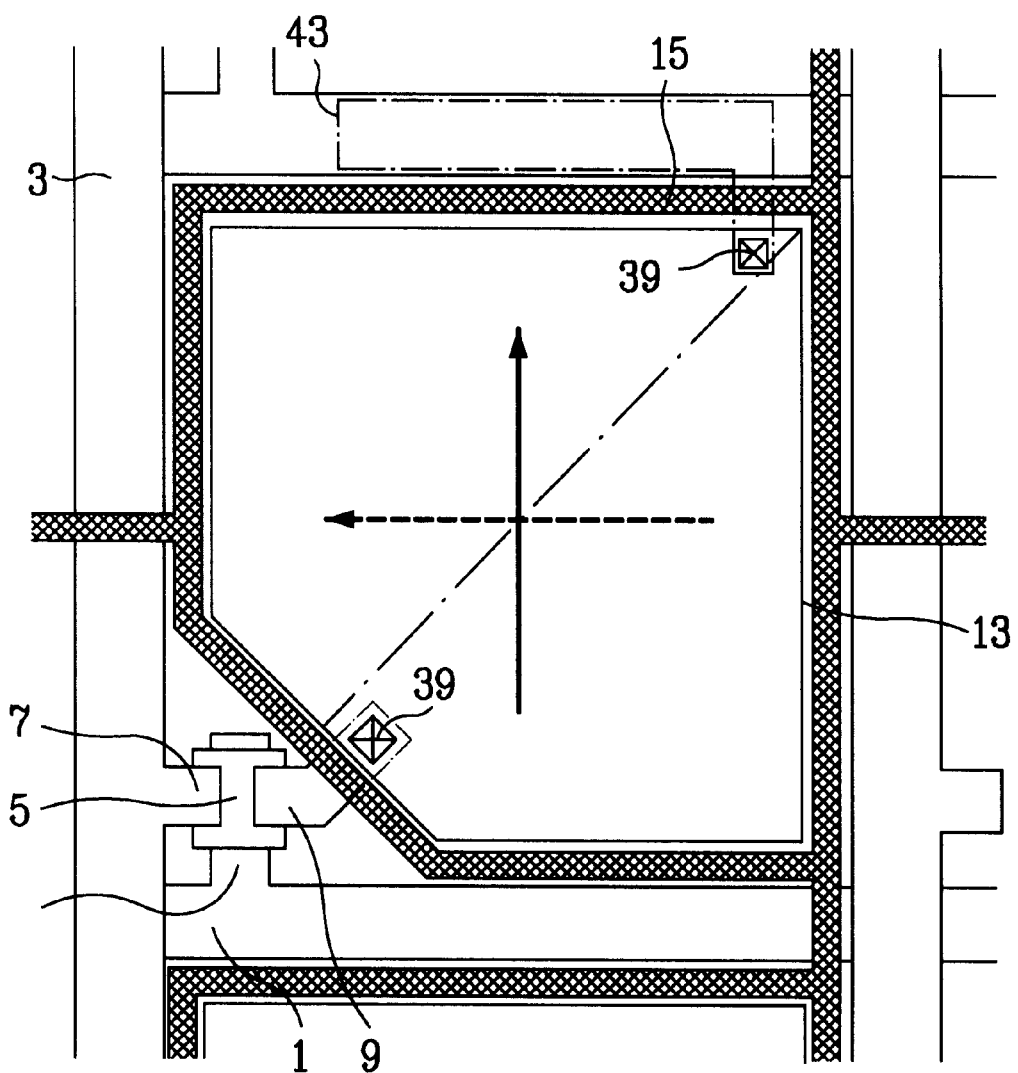

FIGS. 9A to 9C are plan views of the liquid crystal display devices according to the sixth embodiment. The sixth embodiment is also similar to the fourth and fifth embodiments, except that the side electrode 15 is formed any place on only the gate bus line 1 on the side where the TFT is formed on. Therefore, the aperture ratio is improved due to pixel electrode 13 overlapping data bus line 3 as compared to the fourth and fifth embodiments.

The multi-domain for the sixth embodiment is obtained by dividing each pixel into four domains such as in a "+" or "x" shape, or dividing each pixel horizontally, vertically, and/or diagonally, and differently alignment-treating or forming alignment directions on each domain and on each substrate. It is possible to have at least one domain of the divided domains unaligned. It is also possible to have all domains unaligned.

Referring to FIGS. 10A to 10D and 11D and 11B, the present invention comprises a plurality of gate bus lines 1 arranged in a first direction on a first substrate 31 and a plurality of data bus lines 3 arranged in a second direction on the first substrate, a TFT, a passivation 37, a pixel electrode 13, and a side electrode 15.

On a second substrate 33, a light shielding layer 25 is formed to shield the light leaked from gate and data bus lines 1, 3, and the TFT, a color filter layer 23 is formed on the light shielding layer, a common electrode 17 is formed on the color filter layer, and a liquid crystal layer is formed between the first and second substrates 31, 33.

Data bus lines 3 and gate bus lines 1 divide the first substrate into a plurality of pixel regions. The TFT is formed on the each pixel region and comprises a gate electrode 11, a gate insulator 35, a semiconductor layer 5, an ohmic contact layer, and source/drain electrodes 7, 9. Passivation 37 is formed through the whole first substrate. Pixel electrode 13 is coupled to drain electrode 9 and overlap data bus lines 3 or gate bus lines 1 on passivation 37. Side electrode 15 is formed in a region except the region in which pixel electrode 13 and the TFT are on passivation 37.

Side electrode 15 and pixel electrode 13 is separated by passivation 37, which prevents gate bus line 1 and data bus line 3 from interfering with the distorted electric field of side electrode 15. The passivation 37 is formed by depositing a material such as $SiN_x$ or $SiO_x$. Further, if side electrode 15 and pixel electrode 13 are overlapped with the TFT and/or data bus line 3, crosstalk is generated. Therefore, side and pixel electrodes 15, 13 are formed not to overlap with the TFT and/or data bus line by the passivation as an interlayer.

For FIGS. 10A–10D, the diagonal portion of the side electrode 15 may be replaced to form a perpendicular shape similar to FIGS. 2A–2D, as an alternative embodiment.

FIGS. 18A to 18F are sectional views of showing the manufacturing process of the present liquid crystal display device.

To manufacture the LCD in accordance with the present invention, in each pixel region on the first substrate 31, a TFT is formed comprising gate electrode 11, gate insulator 35, semiconductor layer 5, ohmic contact layer and source/drain electrodes 7, 9. At this time, a plurality of gate bus lines 1 and a plurality of data bus lines 3 are formed to divide the first substrate into a plurality of pixel regions.

Figure 18A:
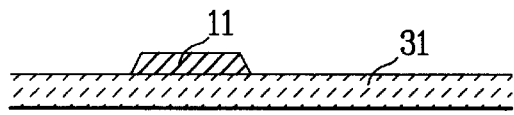
Figure 18B:
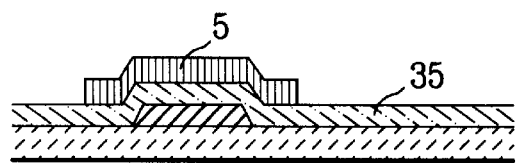
Figure 18C:
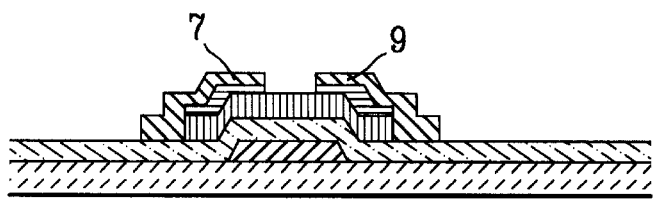

Gate electrode 11 and gate bus line 1 are formed by, for example, sputtering and patterning a metal such as Al, Mo, Cr, Ta or Al alloy, as shown in FIG. 18A. The gate insulator 35 is formed on the gate electrode 11 by depositing $SiN_x$ or $SiO_x$ using, for example, PCVD (Plasma Chemical Vapor Deposition). Semiconductor layer 5 and the ohmic contact layer are formed by depositing (through PCVD) and patterning amorphous silicon (a-Si) and doped amorphous silicon ($n^+$a-Si), respectively, as shown in FIG. 18B. Data bus line 3 and source/drain electrodes 7, 9 are formed by, for example, sputtering and patterning a metal such as Al, Mo, Cr, Ta or Al alloy, as shown in FIG. 18C.

Figure 18D:
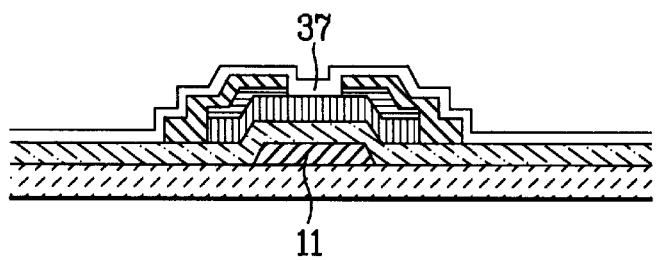
Figure 18E:
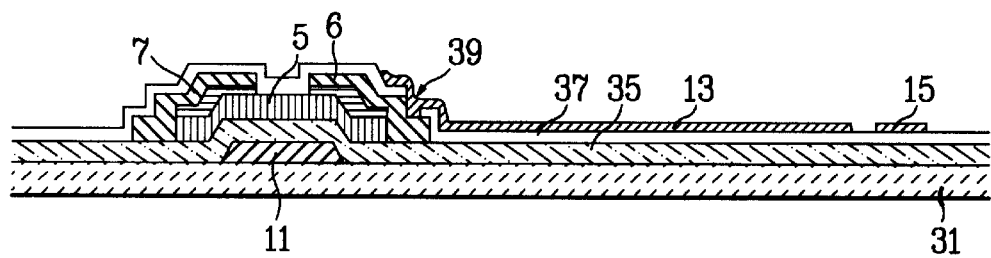
Figure 19A:
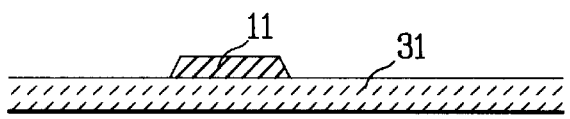
FIGS. 19A–19F are sectional view of showing another manufacturing process of the present invention.
Figure 19B:
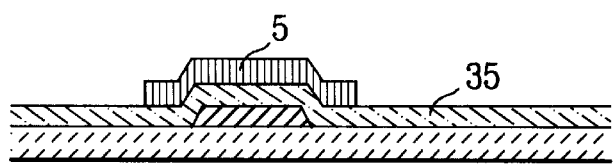
Figure 19C:
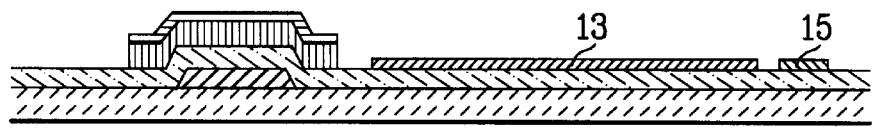
Figure 19D:
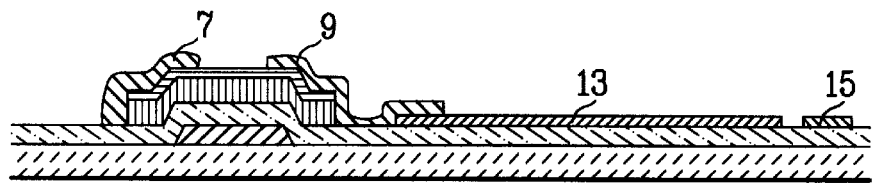
Figure 19E:
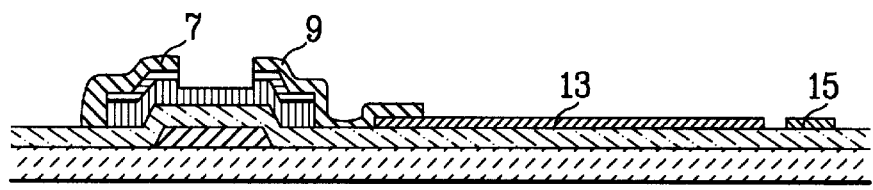
Figure 19F:
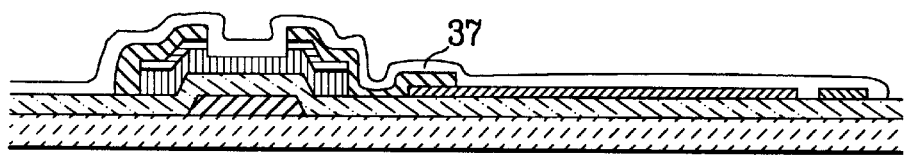

Subsequently, passivation 37 is formed with BCB (BenzoCycloButene), acrylic resin, polyimide-based material, $SiN_x$ or $SiO_x$ over the whole first substrate, as shown in FIG. 18D. A contact hole 39 is formed to connect the pixel electrode to the drain electrode by opening a part of the passivation over the drain electrode 9. Thereafter, side and pixel electrodes 15, 13 are formed by, for example, sputtering and patterning a metal such as ITO (indium tin oxide), Al, Mo, Cr, Ta, Ti or Al alloy, as shown in FIG. 18E.

At this time, it is possible to form side and pixel electrodes 15, 13 by patterning the same metal once or by patterning different metals twice. When side electrode 15 and pixel electrode 13 are formed with the same material, the side and pixel electrodes are simultaneously formed with one mask. Alternatively, it is possible to form the side and pixel electrodes with different materials or as a double layer with additional masks.

To apply a voltage ($V_{com}$) to side electrode 15, a silver (Ag) dot is preferably formed at each corner of the driving area on the first substrate 31. An electric field is applied with the second substrate 33 and the liquid crystal molecules are driven by the potential difference. The voltage ($V_{com}$) is applied to side electrode 15 by connecting the Ag dots to the side electrode, which may be accomplished simultaneously by forming the side electrode with ITO.

The side electrode 15 preferably has the same or substantially the same potential as the common electrode. One way to accomplish this is to electrically connect the side electrode 15 to the common electrode. For example, if the potential difference between the pixel electrode and the common electrode is 5V, then the potential difference between the pixel electrode and the side electrode is also 5V.

Figure 11A:
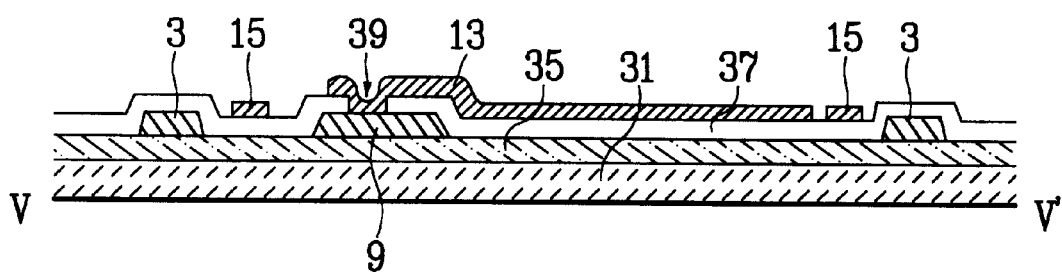
FIGS. 11A to 11B are sectional views taken along the lines V—V and VI—VI of the liquid crystal display device in FIG. 10A.
Figure 11B:
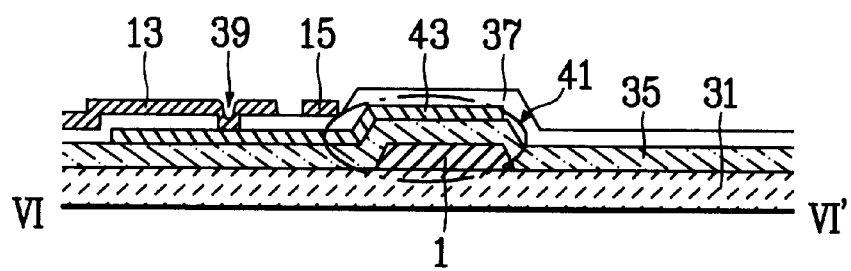

Moreover, when forming source/drain electrodes 7, 9 (see FIG. 18C), a storage electrode 43 is formed by, for example, sputtering and patterning a metal such as Al, Mo, Cr, Ta, Ti or Al alloy which overlaps a part of gate bus line 1 (and/or side electrode 15) and pixel electrode 13 (see FIG. 11B). Storage electrode 43 is connected to pixel electrode 13 with contact hole 39, and forms storage capacitor 41 with gate bus line 1 (and/or side electrode 15).

FIGS. 19A–19F show another method of manufacturing the liquid crystal display device of the present invention. In particular, the structure of the liquid crystal display in FIGS. 19A–19F is not an IOP (ITO On Passivation) structure as shown in FIGS. 18A–18F. Here, the pixel electrode (ITO) is formed prior to the passivation layer. Otherwise, the process steps are similar to FIGS. 18A–18F.

Figure 20A:
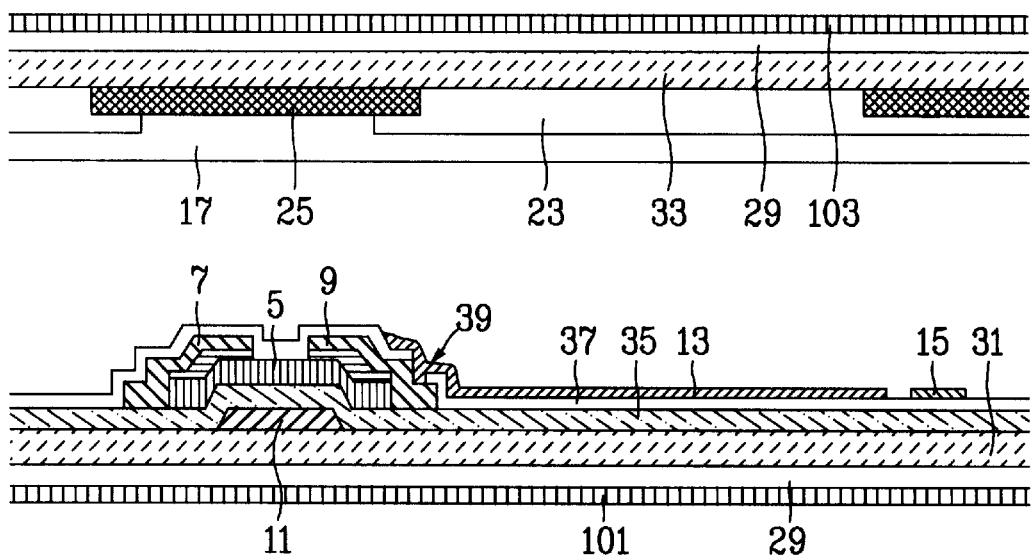
FIGS. 20A and 20B shows the upper and lower substrates of the liquid crystal display of the present invention with different configurations of the compensation film.
Figure 20B:
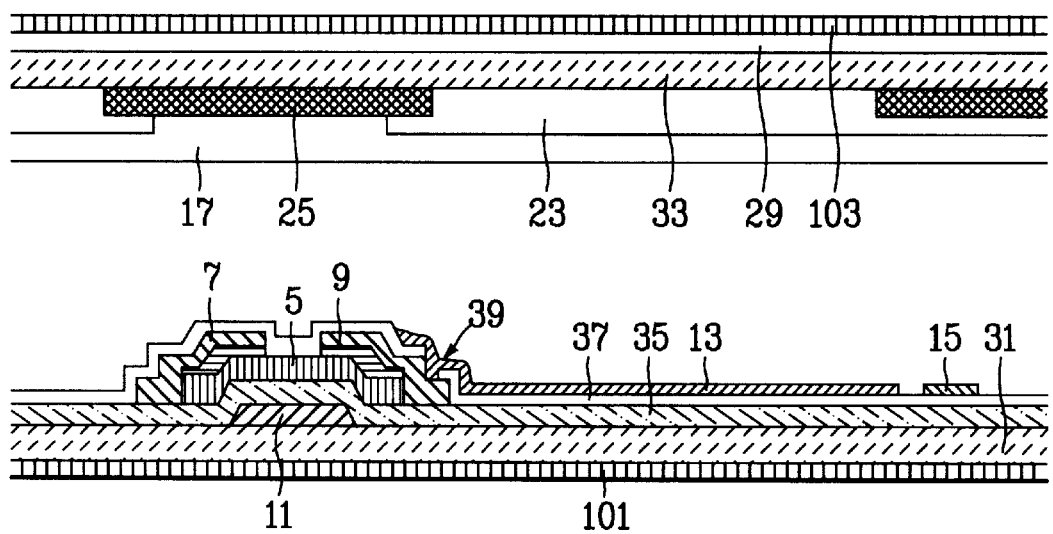
Figure 21A:
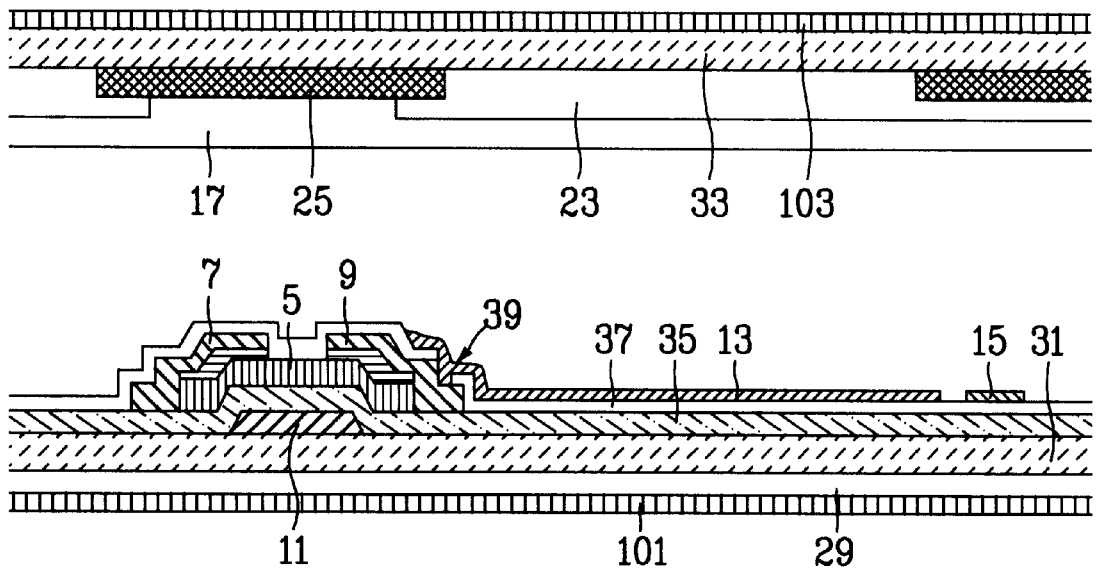
FIGS. 21A and 21B show the upper and lower substrates of another embodiment in accordance with the present invention where FIG. 21A includes black matrix and FIG. 21B excludes black matrix.
Figure 21B:
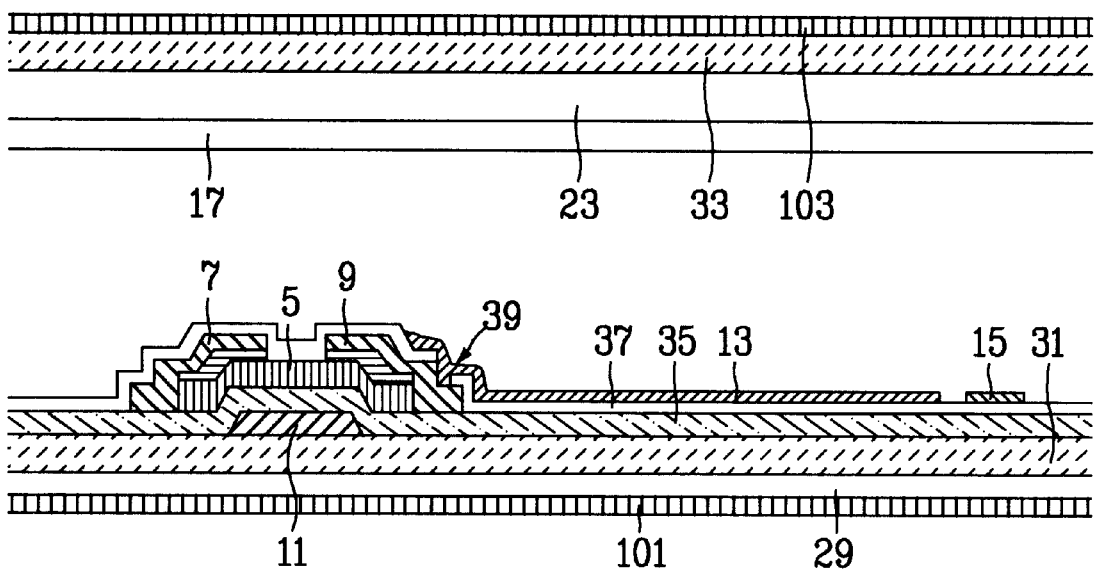

Referring to FIGS. 20A and 20B, on second substrate 33, a light shielding layer 25 is formed to shield light leakage from gate and data bus lines 1, 3, the TFT, and side electrode 14. A color filter layer 23 is formed with R, G, B (red, green, blue) elements on the light-shielding layer. A common electrode 17 is formed with ITO on the color filter layer 23. A liquid crystal layer is formed by injecting liquid crystal between the first and second substrates.

On at least one substrate, a compensation film 29 is formed with polymer. The compensation film may be a negative uniaxial film, which has one optical axis, and compensates the phase difference of the direction according to viewing-angle. Hence, it is possible to compensate effectively the right-left viewing-angle by widening the area without gray inversion, increasing contrast ratio in an inclined direction, and forming a multi-domain pixel.

In the present multi-domain liquid crystal display device, it is also possible to form a negative biaxial film as the compensation film, which has two optical axes and wider viewing-angle characteristics as compared with the negative uniaxial film. The compensation film may be formed on one of the substrates (such as shown in FIG. 20B) or on both substrates (such as shown in FIG. 20A).

After forming the compensation film 29 on at least one substrate, a polarizer is formed. At this time, the compensation film and polarizer are preferably composed as one.

Furthermore, in the present multi-domain LCD, an alignment layer (not shown in the figure) is formed over the whole first and/or second substrates 31, 33. The alignment layer includes a material such as polyamide or polyimide based materials, PVA (polyvinylalcohol), polyamic acid or $SiO_2$. When rubbing is used to determine an alignment direction, it should be possible to apply any material suitable for the rubbing treatment.

Moreover, it is possible to form the alignment layer with a photosensitive material such as PVCN (polyvinylcinnamate), PSCN (polysiloxanecinnamate), and CelCN (cellulosecinnamate) based materials. Any material suitable for the photo-aligning treatment may be used. Irradiating light once on the alignment layer determines the alignment or pretilt direction and the pretilt angle. The light used in the photo-alignment is preferably a light in a range of ultraviolet light. Any one of unpolarized light, linearly polarized light, and partially polarized light can be used.

In the rubbing or photo-alignment treatment, it is possible to apply one or both of the first and second substrates, and to apply different alignment treatment on each substrate.

From the alignment treatment, a multi-domain LCD is formed with at least two domains, and liquid crystal (LC) molecules of the LC layer are preferably aligned differently from one another on each domain. That is, as shown in FIGS. 10A to 10D, multi-domain is obtained by dividing each pixel into four domains such as in a "+" or "x" shape, or dividing each pixel horizontally, vertically, and/or diagonally, and differently alignment-treating or forming alignment directions on each domain and on each substrate.

The solid line arrow and dotted line arrow in the figures represent alignment directions of each domain of the first and second substrates, respectively. It is possible to have at least one domain of the divided domains unaligned. It is also possible to have all domains unaligned.

Figure 12A:
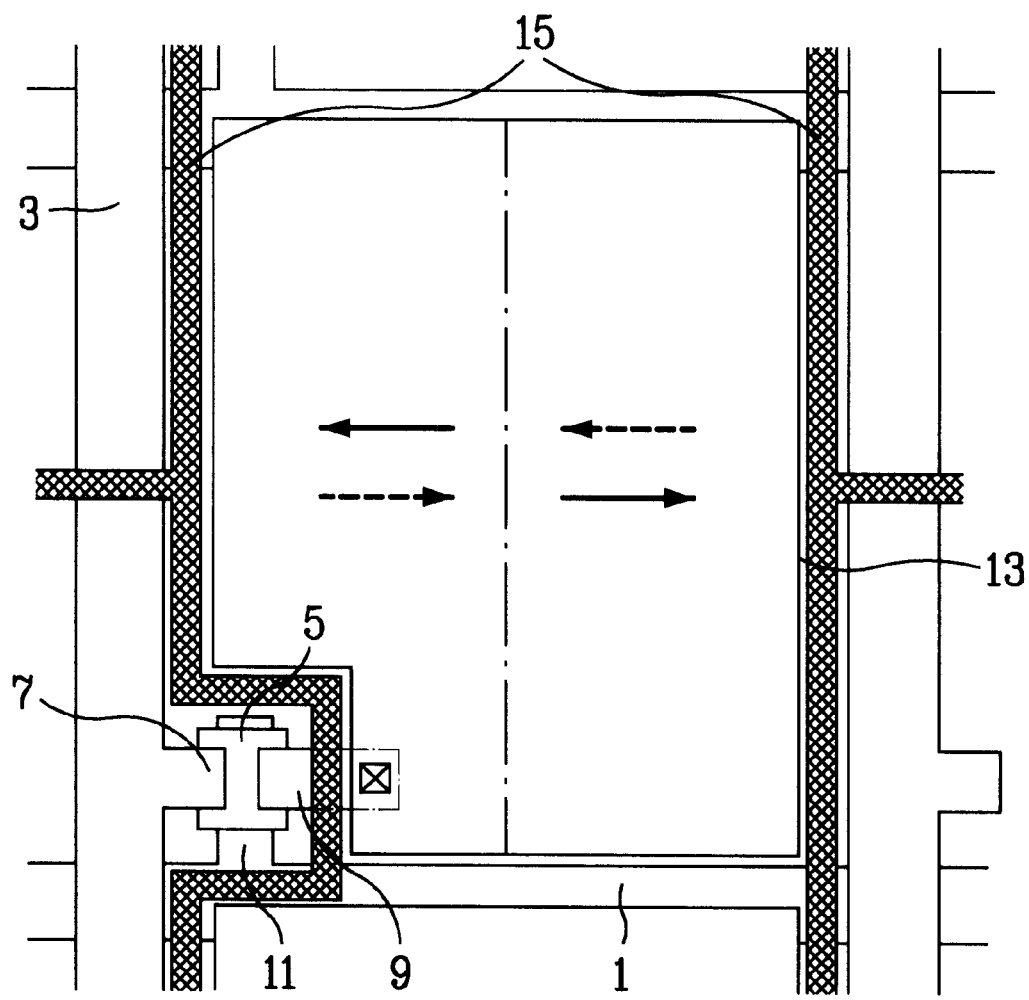
FIGS. 12A to 12C are plan views of the liquid crystal display devices according to the eighth embodiment of the present invention.
Figure 12B:
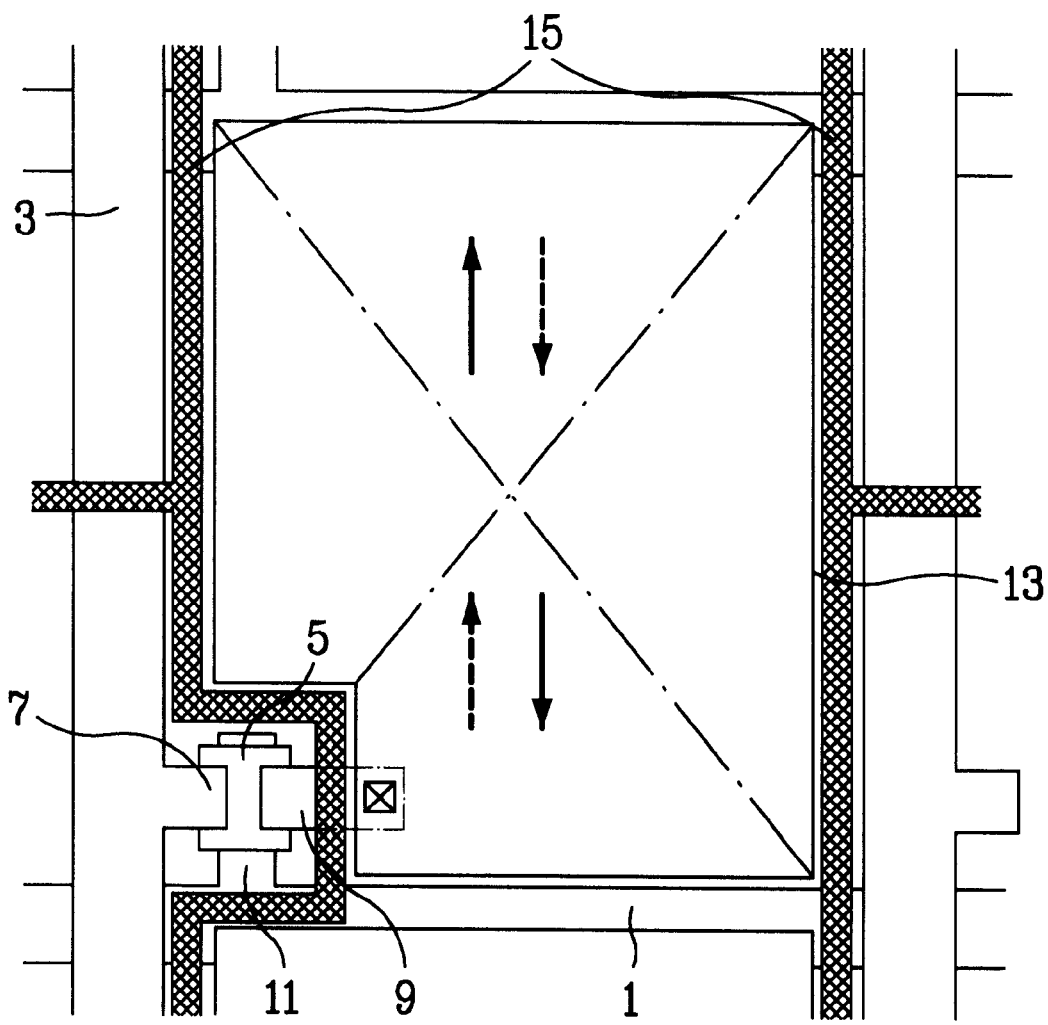
Figure 12C:
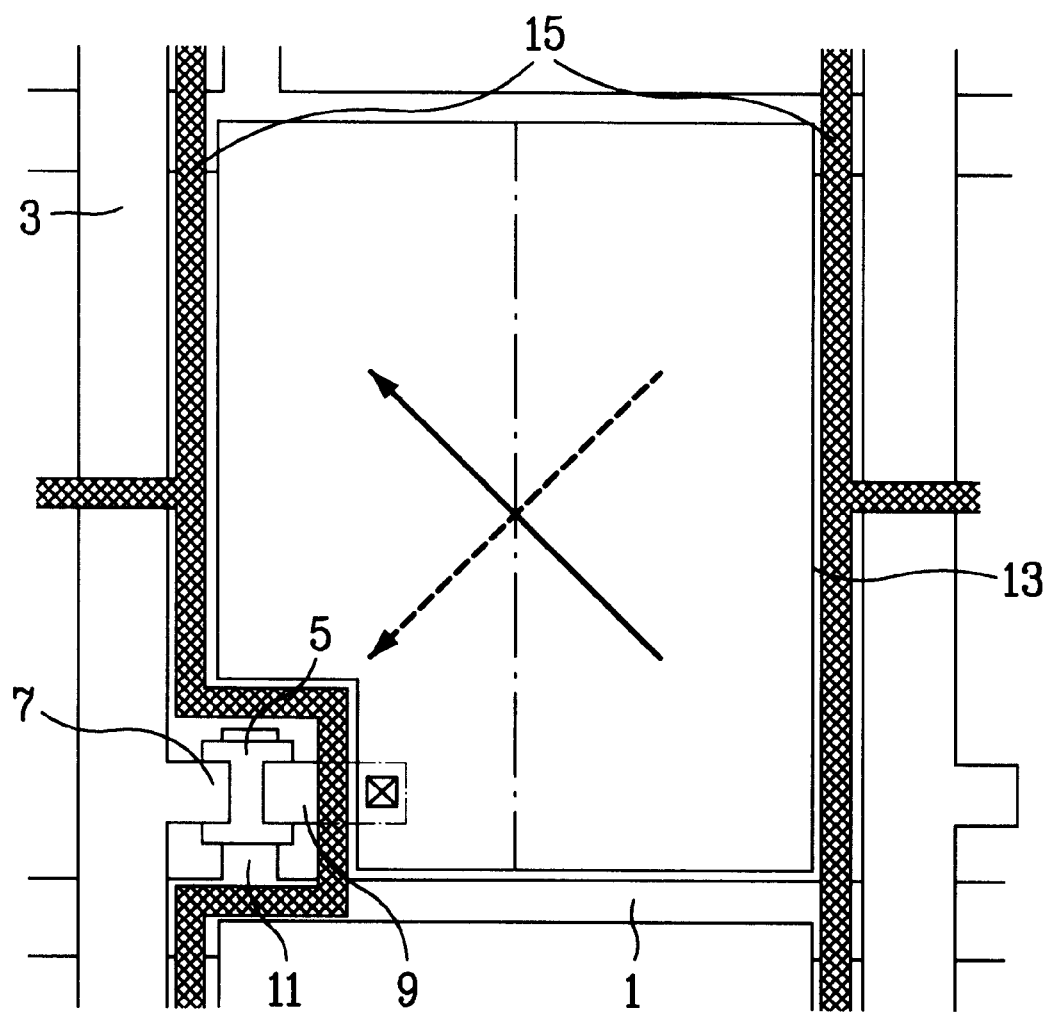

FIGS. 12A to 12C are plan views of the liquid crystal display devices according to the eighth embodiment. The eighth embodiment is similar to the seventh embodiment, except that the side electrode 15 is formed on the side of only the data bus line 3. Therefore, the pixel region is broader than the seventh embodiment.

Further, the multi-domain is obtained by dividing each pixel into four domains such as in a "+" or "x" shape, or dividing each pixel horizontally, vertically, and/or diagonally, and differently alignment-treating or forming alignment directions on each domain and on each substrate. It is possible to have at least one domain of the divided domains unaligned. It is also possible to have all domains unaligned.

Figure 13A:
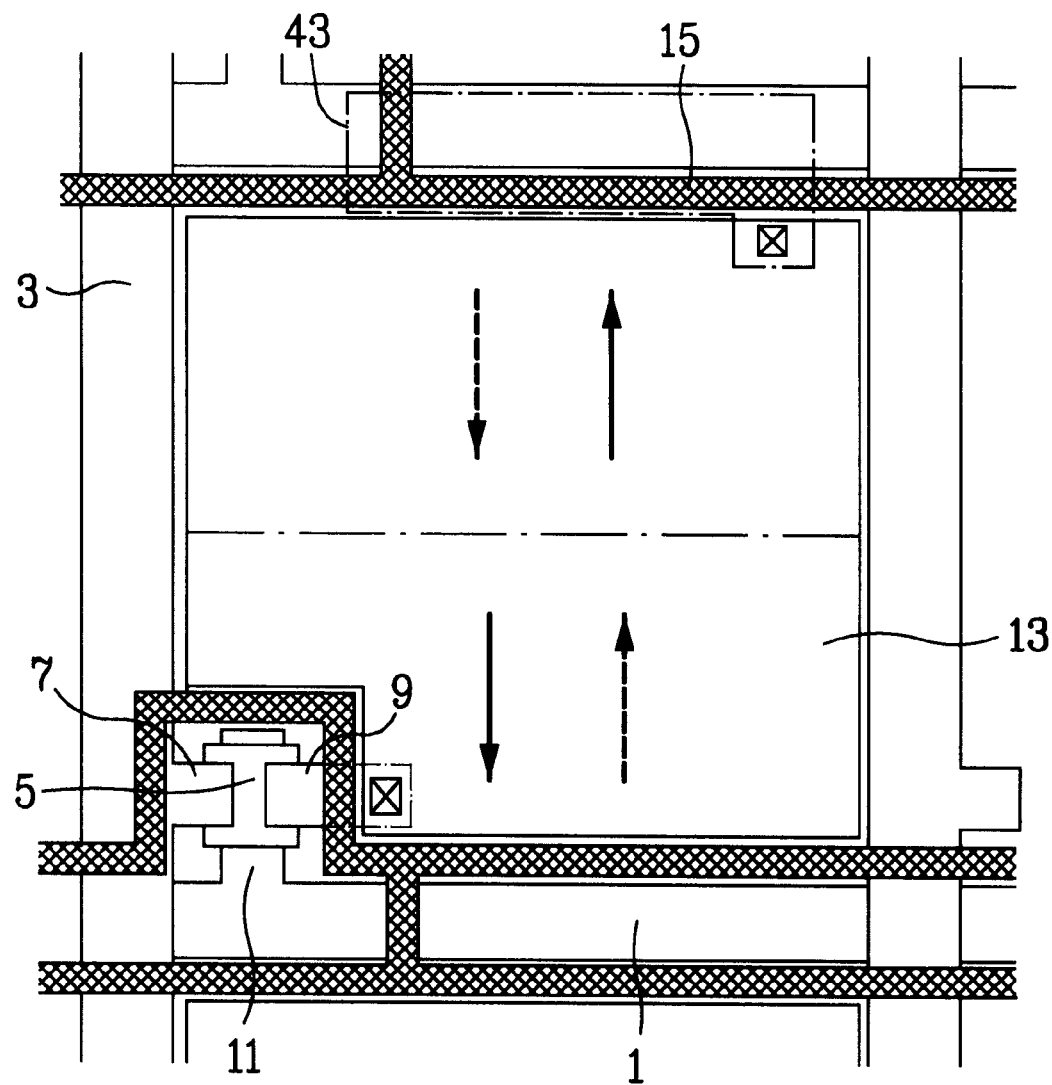
FIGS. 13A to 13C are plan views of the liquid crystal display devices according to the ninth embodiment of the present invention.
Figure 13B:
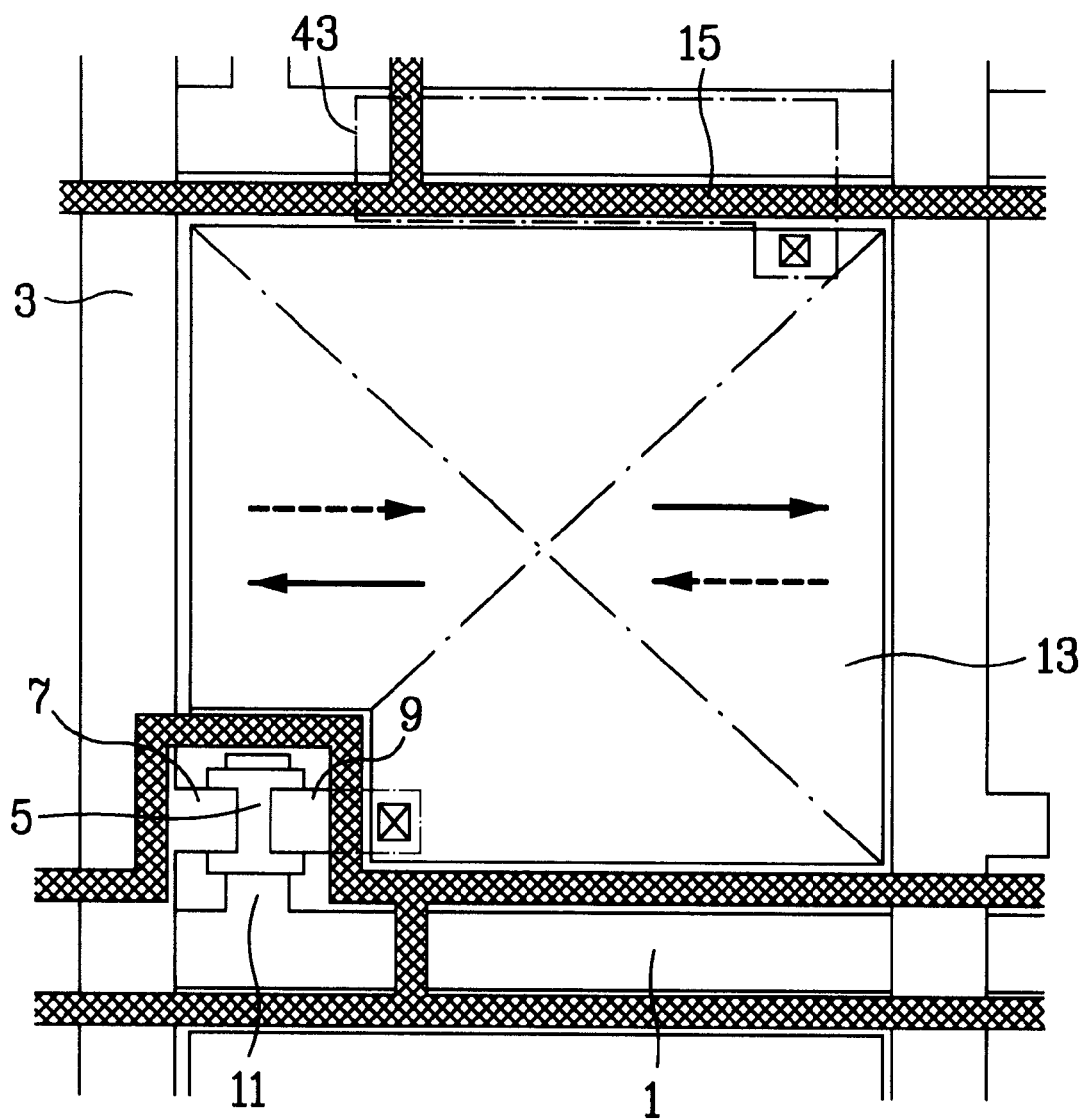
Figure 13C:
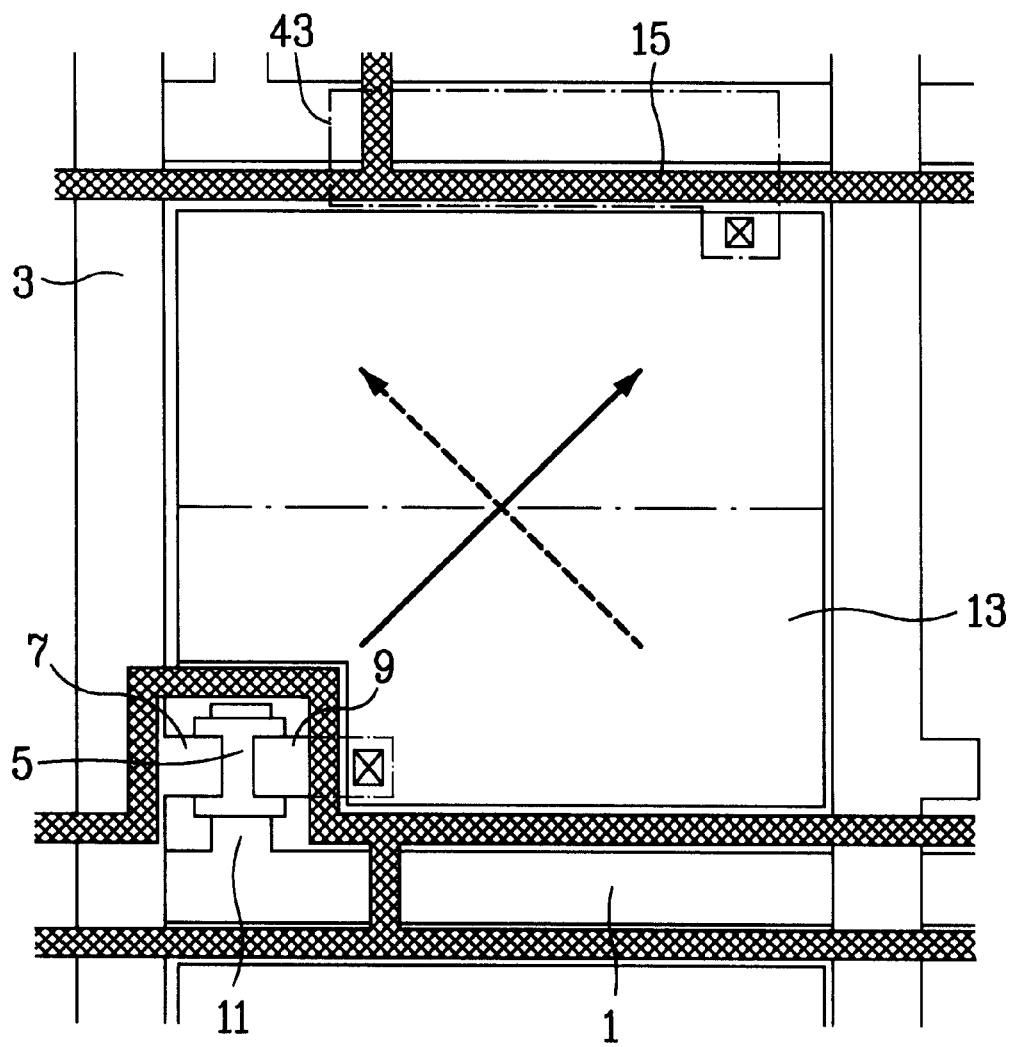

FIGS. 13A to 13C are plan views of the liquid crystal display devices according to the ninth embodiment. The ninth embodiment is similar to the seventh and eighth embodiments, except that the side electrode 15 is formed on the side of only the gate bus line 1. Therefore, the pixel region may be broader than the seventh and eighth embodiments.

Further, the multi-domain is obtained by dividing each pixel into four domains such as in a "+" or "x" shape, or dividing each pixel horizontally, vertically, and/or diagonally, and differently alignment-treating or forming alignment directions on each domain and on each substrate. It is possible to have at least one domain of the divided domains unaligned. It is also possible to have all domains unaligned.

Figure 14A:
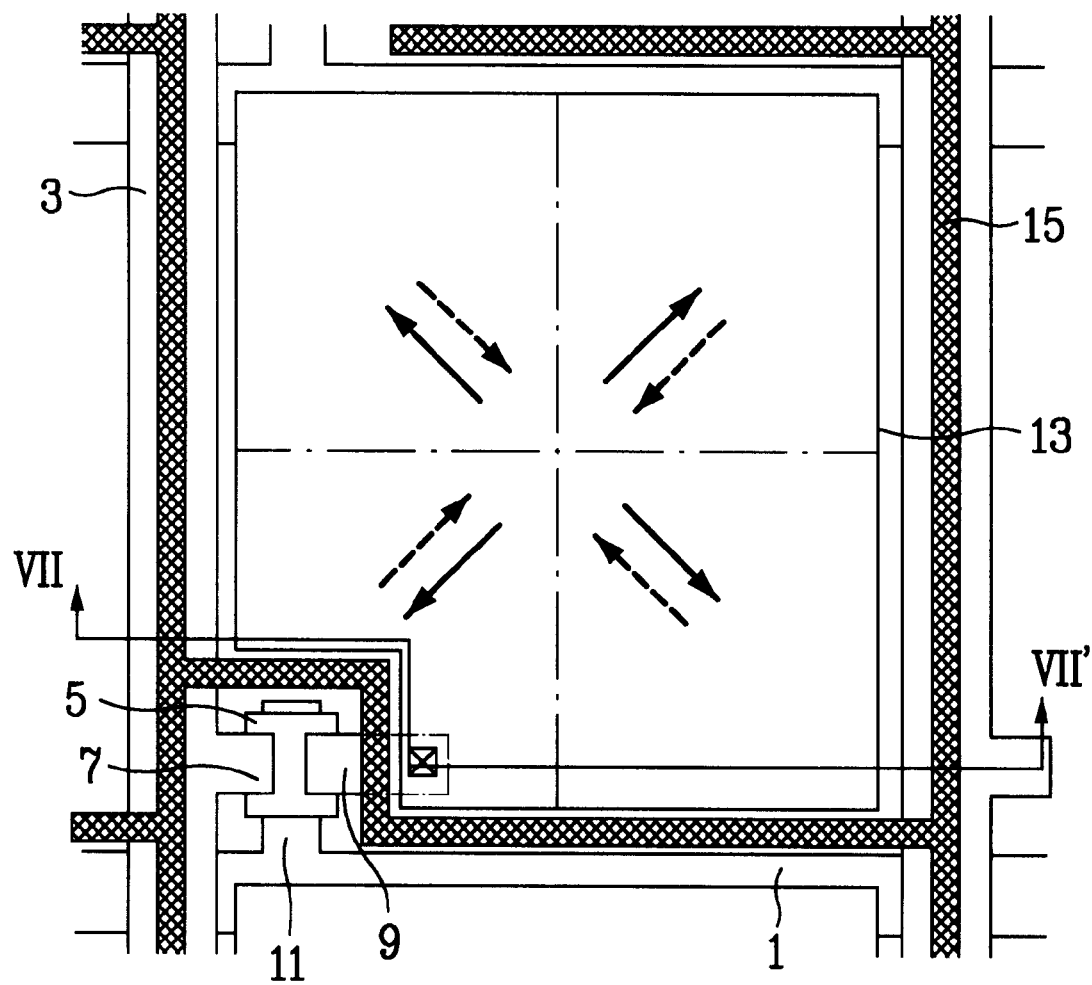
FIGS. 14A to 14D are plan views of the liquid crystal display devices according to the tenth embodiment of the present invention.
Figure 14B:
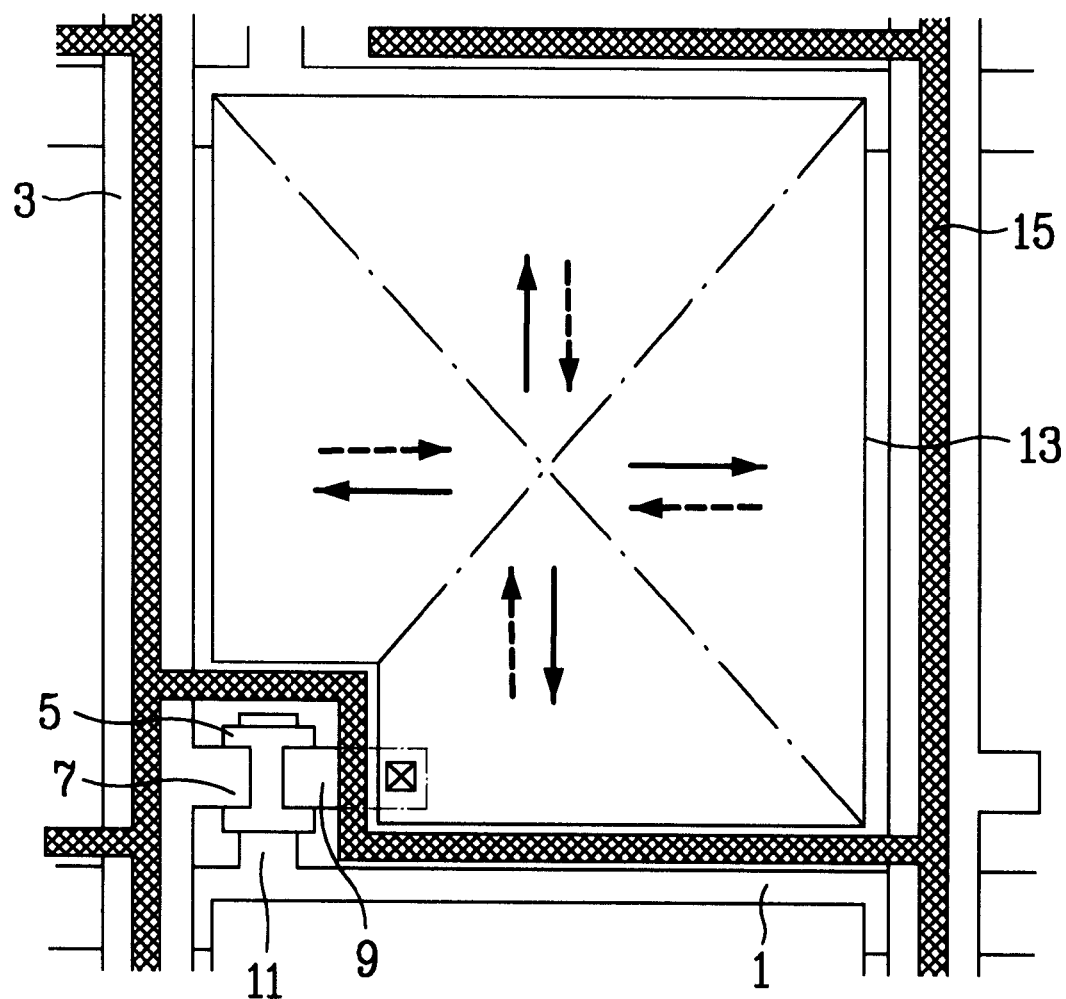
Figure 14C:
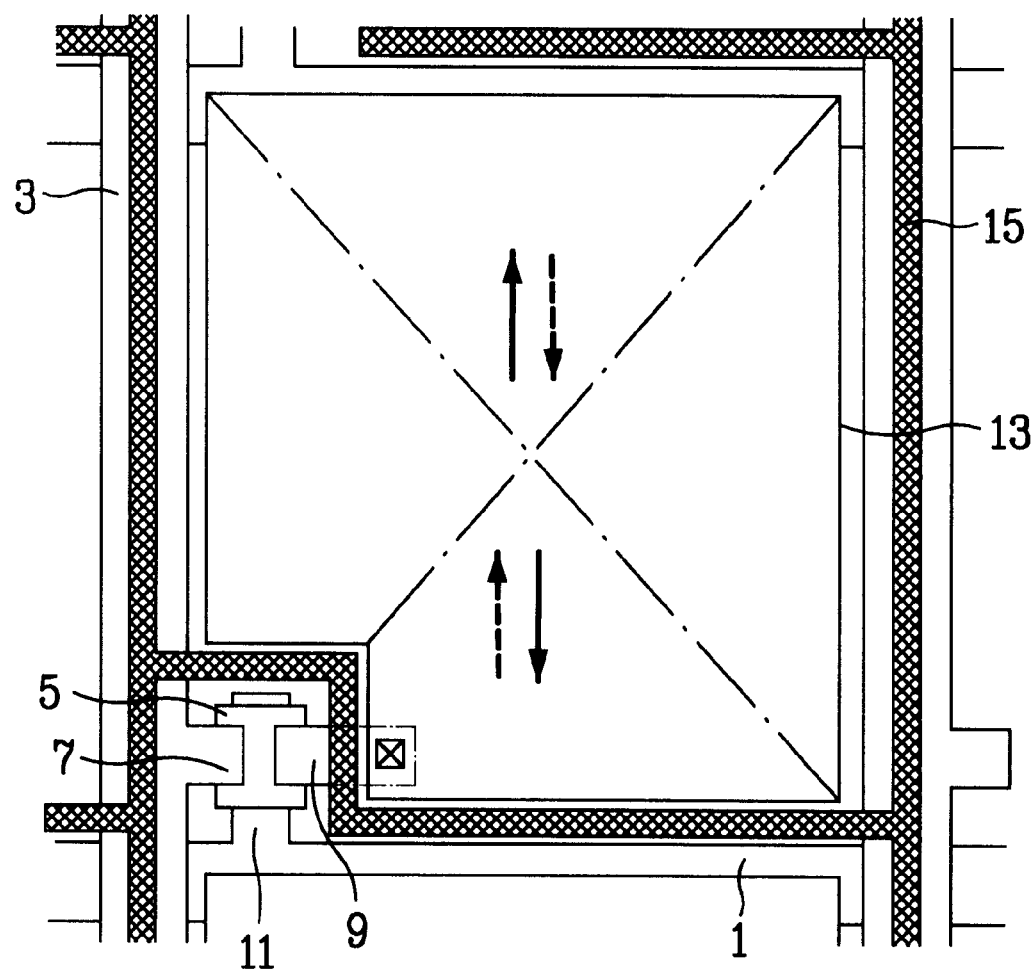
Figure 14D:
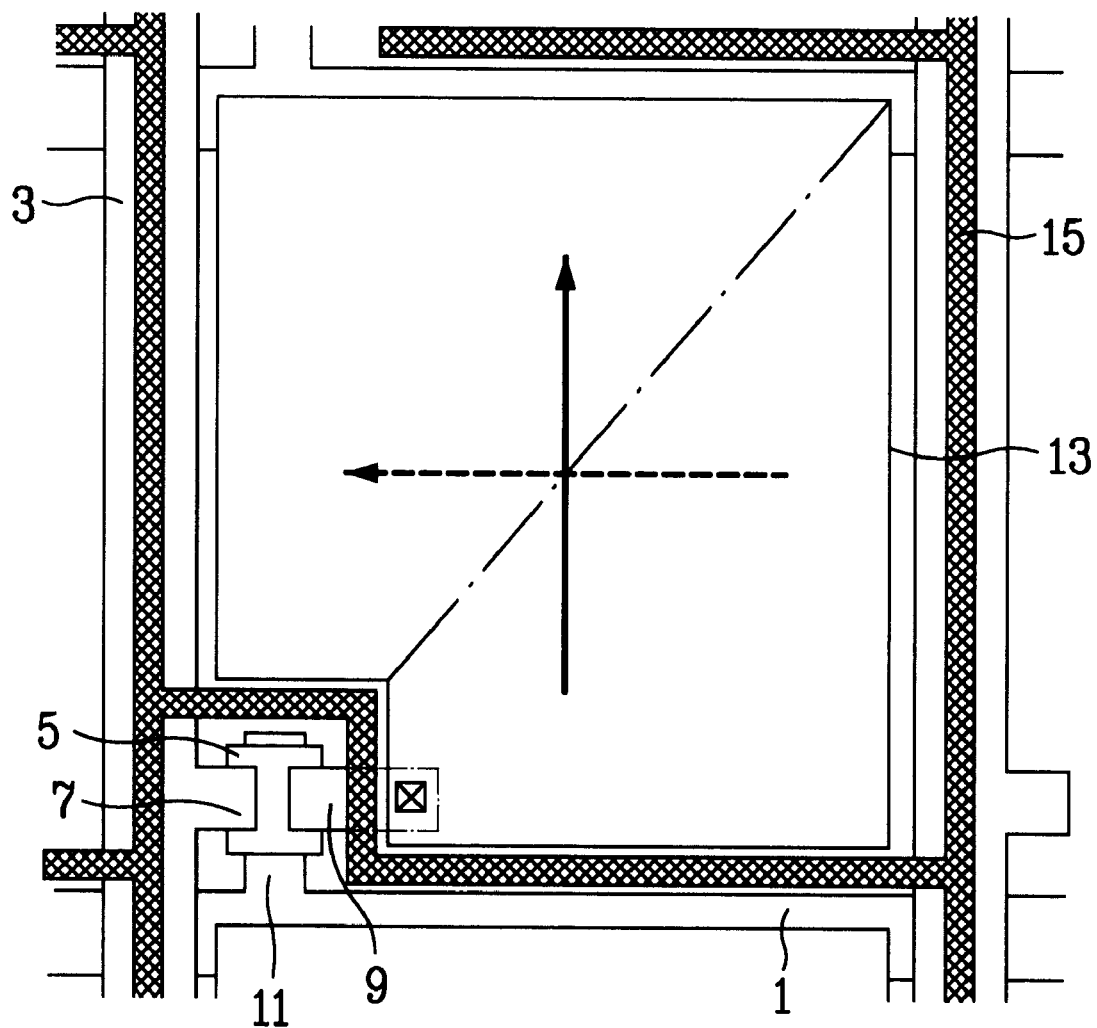
Figure 15:
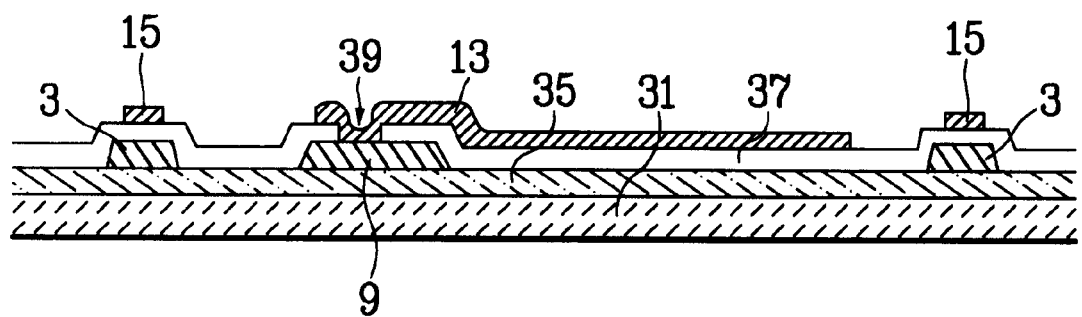
FIG. 15 is a sectional view taken along the line VII—VII of the liquid crystal display device in FIG. 14A.

FIGS. 14A to 14D are plan views of the liquid crystal display devices according to the tenth embodiment, and FIG. 15 is a sectional view taken along the lines VII—VII of the liquid crystal display device in FIG. 14A.

In the tenth embodiment, the passivation 37 includes BCB (BenzoCycloButene), acrylic resin, or polyimide compound, etc. as an organic insulator. The passivation in this instance has a planar surface structure and has a low dielectric constant. Hence, the side electrode on the side of data bus line 3 may be formed on any place on the data bus line 3 and the aperture ratio is improved. Moreover, the side electrode can be positioned in any place relative to the former three embodiments, and therefore, the pixel region is broader than the seventh, eighth, and ninth embodiments.

In the tenth embodiment, the multi-domain is obtained by dividing each pixel into four domains such as in a "+" or "x" shape, or dividing each pixel horizontally, vertically, and/or diagonally, and differently alignment-treating or forming alignment directions on each domain and on each substrate. It is possible to have at least one domain of the divided domains unaligned. It is also possible to have all domains unaligned.

The storage capacitor in FIGS. 14A–14D may be similar to the storage capacitor disclosed with respect to FIGS. 13A–13C.

Figure 16A:
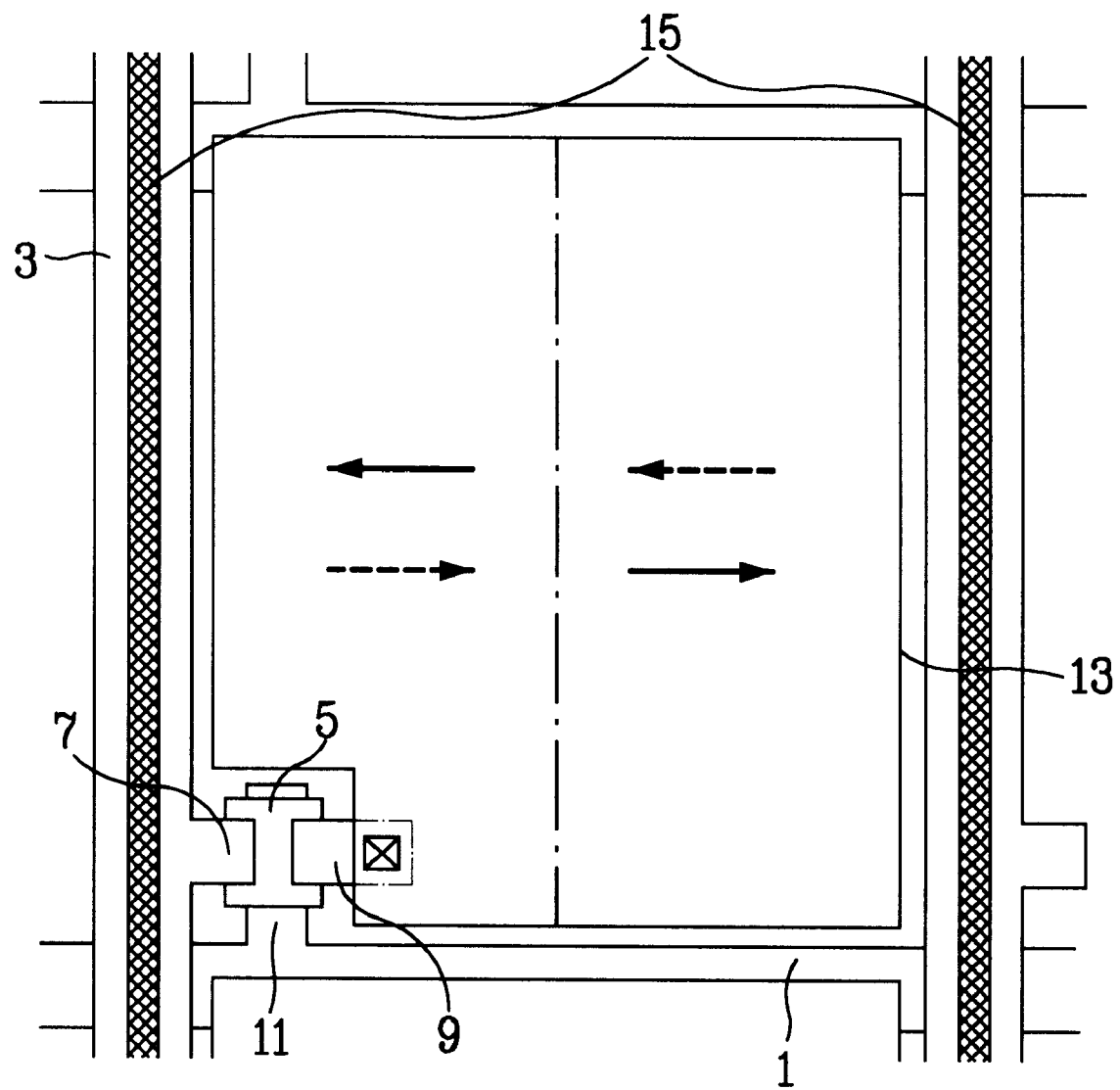
FIGS. 16A to 16C are plan views of the liquid crystal display devices according to the eleventh embodiment of the present invention.
Figure 16B:
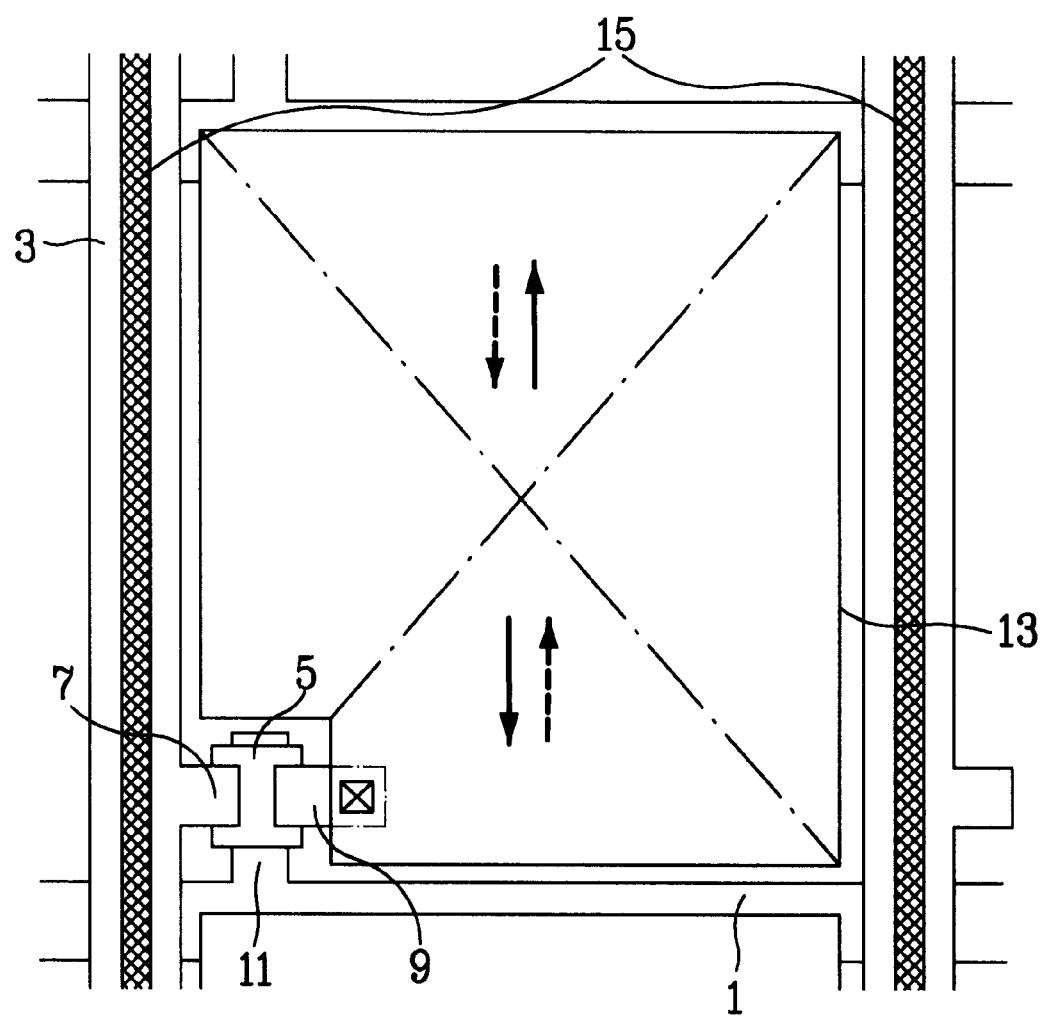
Figure 16C:
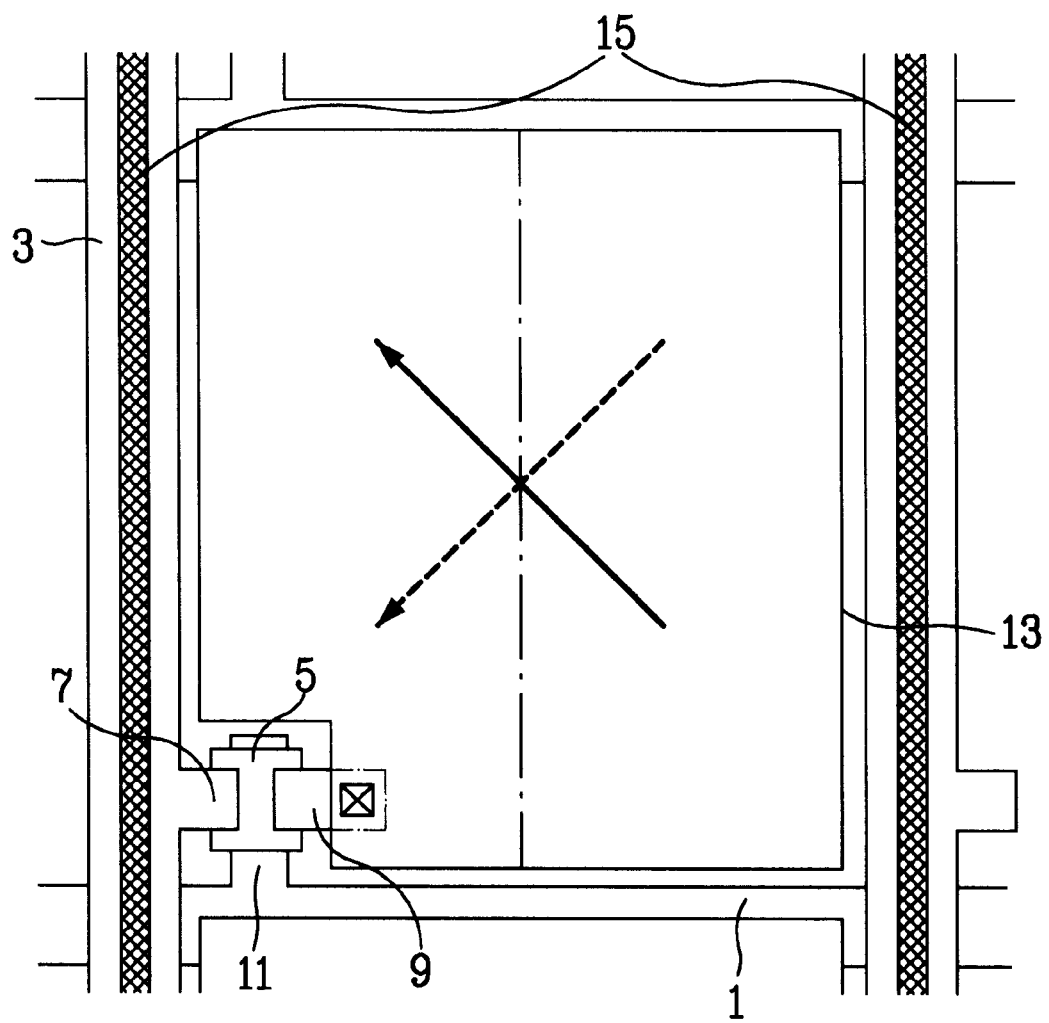

FIGS. 16A to 16C are plan views of the liquid crystal display devices according to the eleventh embodiment. The eleventh embodiment is similar to the tenth embodiment, except that the side electrode 15 is formed on any place on only the data bus line 3. Therefore, the pixel region is broader than the tenth embodiment.

The multi-domain for the eleventh embodiment is obtained by dividing each pixel into four domains such as in a "+" or "x" shape, or dividing each pixel horizontally, vertically, and/or diagonally, and differently alignment-treating or forming alignment directions on each domain and on each substrate. It is possible to have at least one domain of the divided domains unaligned. It is also possible to have all domains unaligned.

Figure 17A:
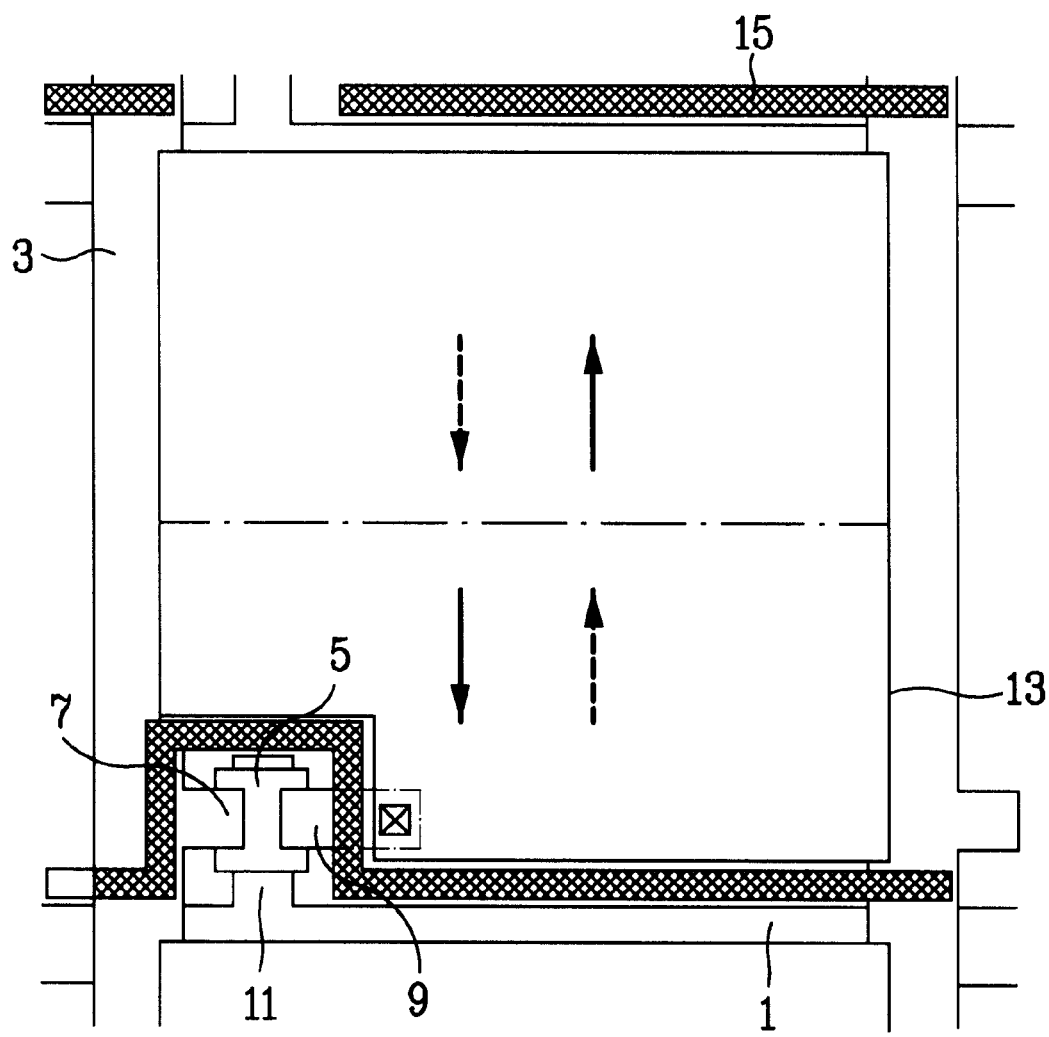
FIGS. 17A to 17C are plan views of the liquid crystal display devices according to the twelfth embodiment of the present invention.
Figure 17B:
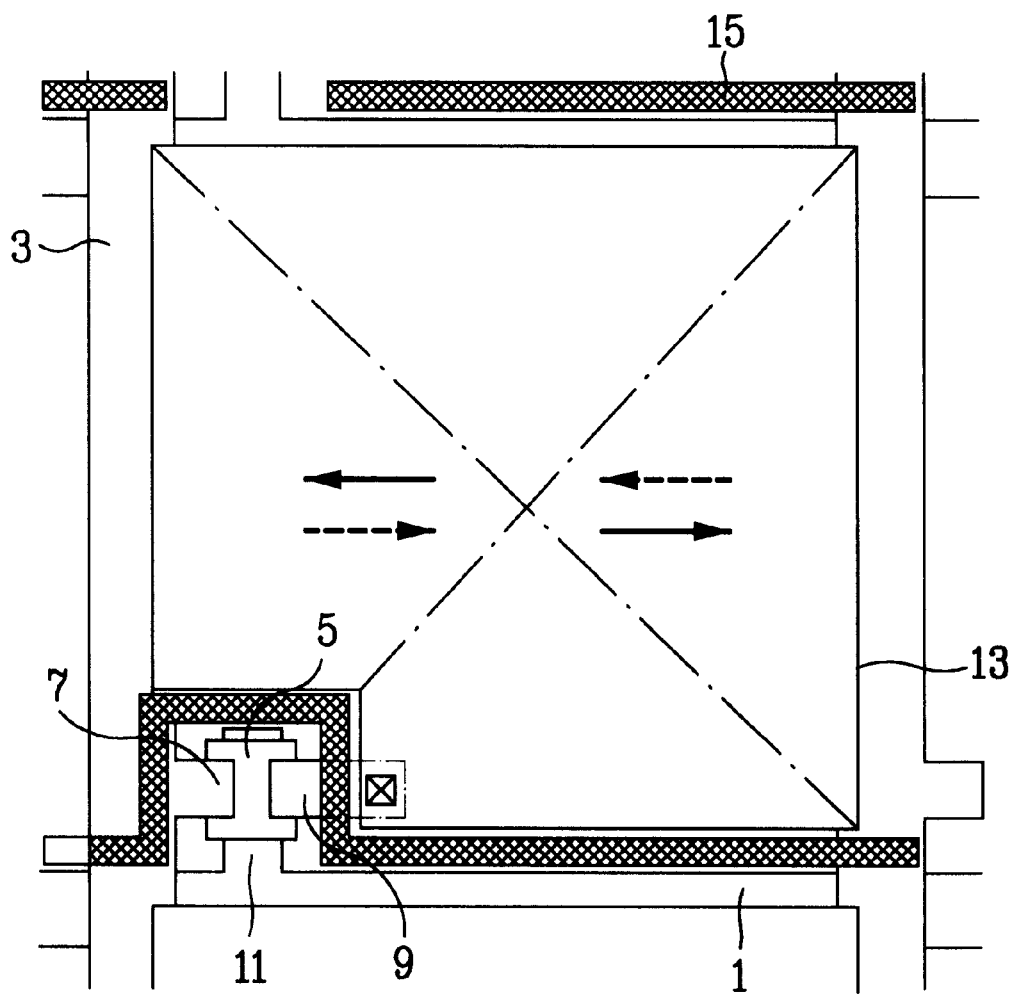
Figure 17C:
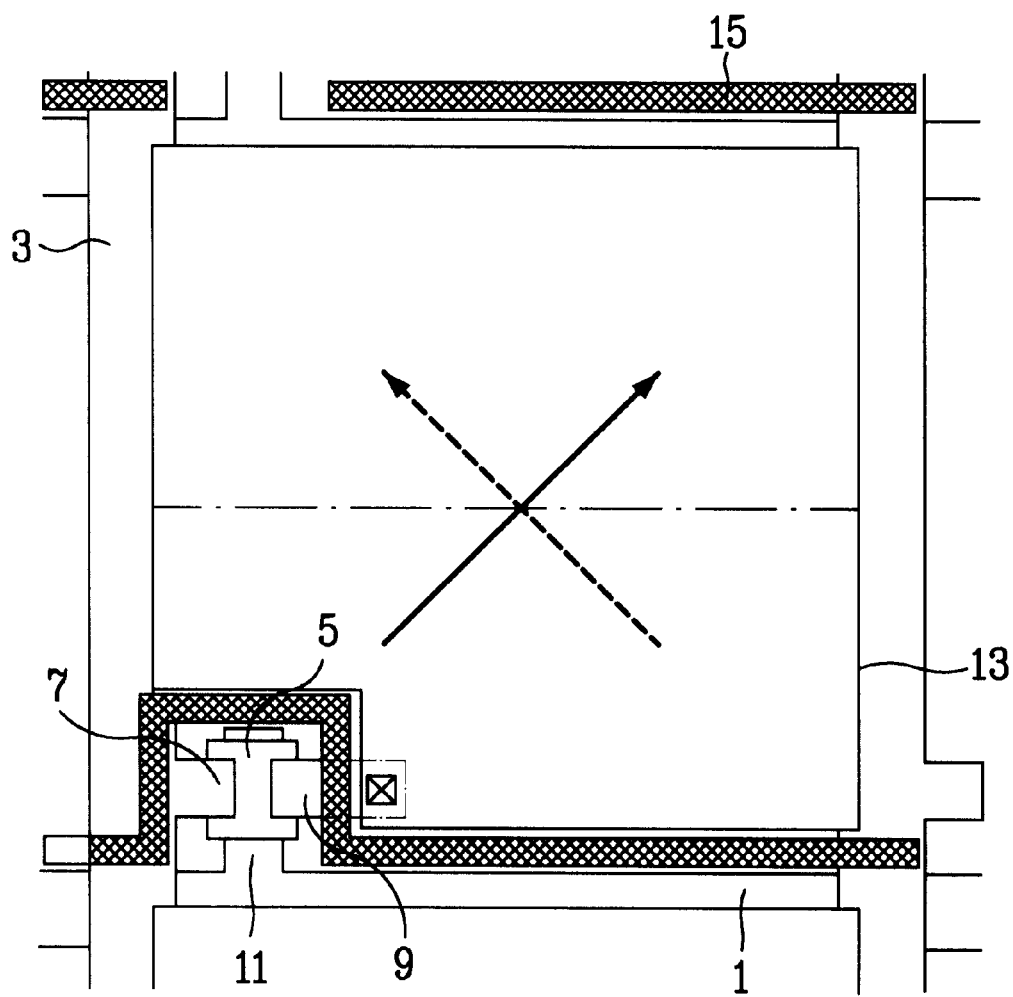

FIGS. 17A to 17C are plan views of the liquid crystal display devices according to the twelfth embodiment. The twelfth embodiment is also similar to the tenth and eleventh embodiments, except that the side electrode 15 is formed any place on only the gate bus line 1 on the side where the TFT is formed on. Therefore, the aperture ratio is improved due to pixel electrode 13 overlapping data bus line 3 as compared to the tenth and eleventh embodiments.

The multi-domain for the twelfth embodiment is obtained by dividing each pixel into four domains such as in a "+" or "x" shape, or dividing each pixel horizontally, vertically, and/or diagonally, and differently alignment-treating or forming alignment directions on each domain and on each substrate. It is possible to have at least one domain of the divided domains unaligned. It is also possible to have all domains unaligned.

The embodiment shown in FIGS. 17A–17C is also similar to the embodiment shown in FIGS. 13A–13C except that the side electrodes in FIGS. 13A–13C are connected at the pixel region whereas the side electrodes in FIGS. 17A–17C, although not shown, are connected at the periphery.

It is possible to apply the LCD of the present invention to any alignment and mode including, for example, (1) a homogeneous alignment where liquid crystal molecules in the liquid crystal layer are aligned homogeneously to surfaces of the first and second substrates, (2) a homeotropic alignment where liquid crystal molecules in the liquid crystal layer are aligned homeotropically to surfaces of the first and second substrates, (3) a tilted alignment where liquid crystal molecules in the liquid crystal layer are aligned tiltedly to surfaces of the first and second substrates, (4) a twisted alignment where liquid crystal molecules in the liquid crystal layer are aligned twistedly to surfaces of the first and second substrates, and (5) a hybrid alignment where liquid crystal molecules in the liquid crystal layer are aligned homogeneously to surface of one substrate between the first and second substrates and are aligned homeotropically to surface of the other substrate.

Consequently, since the multi-domain LCD of the present invention forms the pixel electrode and the side electrode on the same layer, a high voltage is not needed to raise the intensity of the electric field applied between the two electrodes. Also, in the case of conducting an alignment-treatment, a rapid response time and a stable LC structure can be obtained by the formed pretilt and anchoring energy. Moreover, the disclination is thus removed to thereby improve the brightness.

It will be apparent to those skilled in the art that various modifications can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. A multi-domain liquid crystal display device comprising:

first and second substrates facing each other;

a liquid crystal layer between said first and second substrates;

a plurality of gate bus lines arranged in a first direction on said first substrate and a plurality of data bus lines arranged in a second direction on said first substrate to define a pixel region, the pixel region being divided into at least two portions and the liquid crystal layer in each portion being driven differently from each other;

a common electrode on said second substrate;

a pixel electrode electrically charged through said data bus line to drive said liquid crystal layer with said common electrode;

an auxiliary electrode on a same layer whereon said pixel electrode is formed, a potential difference between the auxiliary electrode and the pixel electrode controlling the alignment direction of liquid crystal layer;

a passivation insulating said pixel and auxiliary electrodes from electrodes and bus lines other than the pixel and auxiliary electrodes; and an alignment layer on at least one substrate between said first and second substrates.

2. The multi-domain liquid crystal display device according to claim 1, wherein said auxiliary electrode is in a region other than a region where said pixel electrode is formed.

3. The multi-domain liquid crystal display device according to claim 1, wherein said auxiliary electrode is electrically connected to said common electrode.

4. The multi-domain liquid crystal display device according to claim 1, wherein said pixel electrode includes a material selected from the group consisting of ITO (indium tin oxide), aluminum, and chromium.

5. The multi-domain liquid crystal display device according to claim 1, wherein said auxiliary electrode includes a material selected from the group consisting of ITO (indium tin oxide), aluminum, molybdenum, chromium, tantalum, titanium, and an alloy thereof.

6. The multi-domain liquid crystal display device according to claim 1, wherein said common electrode includes ITO (indium tin oxide).

7. The multi-domain liquid crystal display device according to claim 1, wherein said passivation includes a material selected from the group consisting of BCB (benzocyclobutene), acrylic resin, and polyimide compound.

8. The multi-domain liquid crystal display device according to claim 7, wherein said auxiliary electrode overlaps said data bus line.

9. The multi-domain liquid crystal display device according to claim 1, wherein said passivation includes a material selected from the group consisting of silicon nitride and silicon oxide.

10. The multi-domain liquid crystal display device according to claim 9, wherein said passivation insulates said auxiliary electrode from said pixel electrode.

11. The multi-domain liquid crystal display device according to claim 1, wherein said alignment layer is divided into at least two portions, liquid crystal molecules in said liquid crystal layer in each portion being aligned differently from each other.

12. The multi-domain liquid crystal display device according to claim 11, wherein at least one portion of said at least two portions of the alignment layer is alignment-treated.

13. The multi-domain liquid crystal display device according to claim 11, wherein all portions of said at least two portions of the alignment layer are non-alignment-treated.

14. The multi-domain liquid crystal display device according to claim 11, wherein at least one portion of said at least two portions of the alignment layer is rubbing-treated.

15. The multi-domain liquid crystal display device according to claim 14, wherein said alignment layer includes a material selected from the group consisting of polyimide and polyamide based materials, PVA (polyvinylalcohol), polyamic acid, and silicon dioxide.

16. The multi-domain liquid crystal display device according to claim 11, wherein at least one portion of said at least two portions of the alignment layer is photo-alignment-treated.

17. The multi-domain liquid crystal display device according to claim 16, wherein said alignment layer includes a material selected from the group consisting of PVCN (polyvinylcinnamate), PSCN (polysiloxanecinnamate), and CelCN (cellulosecinnamate) based materials.

18. The multi-domain liquid crystal display device according to claim 16, wherein said alignment layer is photo-aligned by ultraviolet light.

19. The multi-domain liquid crystal display device according to claim 16, wherein said alignment layer is photo-aligned by irradiating light at least one time.

20. The multi-domain liquid crystal display device according to claim 1, wherein said liquid crystal layer includes liquid crystal molecules having positive dielectric anisotropy.

21. The multi-domain liquid crystal display device according to claim 1, wherein said liquid crystal layer includes liquid crystal molecules having negative dielectric anisotropy.

22. The multi-domain liquid crystal display device according to claim 1, wherein liquid crystal molecules in said liquid crystal layer are aligned homogeneously to surfaces of said first and second substrates.

23. The multi-domain liquid crystal display device according to claim 1, wherein liquid crystal molecules in said liquid crystal layer are aligned homeotropically to surfaces of said first and second substrates.

24. The multi-domain liquid crystal display device according to claim 1, wherein liquid crystal molecules in said liquid crystal layer are aligned tiltedly to surfaces of said first and second substrates.

25. The multi-domain liquid crystal display device according to claim 1, wherein liquid crystal molecules in said liquid crystal layer are aligned twistedly to surfaces of said first and second substrates.

26. The multi-domain liquid crystal display device according to claim 1, wherein liquid crystal molecules in said liquid crystal layer are aligned homogeneously to a surface of one substrate between said first and second substrates and are aligned homeotropically to a surface of the other substrate.

27. The multi-domain liquid crystal display device according to claim 1, wherein the passivation is below said pixel and auxiliary electrodes.

28. The multi-domain liquid crystal display device according to claim 1, wherein the auxiliary electrode is formed only on the data bus line side.

29. The multi-domain liquid crystal display device according to claim 1, wherein the auxiliary electrode is formed only on the gate bus line side.

30. The multi-domain liquid crystal display device according to claim 1, wherein the auxiliary electrode is formed on the data bus line side and the gate bus line side.

31. A multi-domain liquid crystal display device comprising:
    first and second substrates facing each other;
    a liquid crystal layer between said first and second substrates;
    a plurality of gate bus lines arranged in a first direction on said first substrate and a plurality of data bus lines arranged in a second direction on said first substrate to define a pixel region, the pixel region being divided into at least two portions and the liquid crystal layer in each portion being driven differently from each other;
    a common electrode on said second substrate;
    a pixel electrode coupled to the data bus line;
    an auxiliary electrode on a same layer as said pixel electrode, a potential difference between the auxiliary electrode and the pixel electrode controlling the alignment direction of liquid crystal layer;
    a passivation insulating said pixel and auxiliary electrodes.

32. The multi-domain liquid crystal display device according to claim 31, wherein the auxiliary electrode has a substantially the same potential as the common electrode.

33. A method of making a multi-domain liquid crystal display device having first and second substrates, the method comprising the steps of:
    forming a plurality of gate bus lines arranged in a first direction on said first substrate and a plurality of data bus lines arranged in a second direction on said first substrate to define a pixel region, the pixel region being divided into at least two portions and the liquid crystal layer in each portion being driven differently from each other;
    forming a common electrode on said second substrate;
    forming a pixel electrode electrically charged through said data bus line to drive said liquid crystal layer with said common electrode;

forming an auxiliary electrode on a same layer whereon said pixel electrode is formed, a potential difference between the auxiliary electrode and the pixel electrode controlling the alignment direction of liquid crystal layer;

forming a passivation insulating said pixel and auxiliary electrodes from electrodes and bus lines other than the pixel and auxiliary electrodes;

forming an alignment layer on at least one substrate between said first and second substrates; and forming a liquid crystal layer between the first and second substrates.

34. The method according to claim 33, wherein the auxiliary electrode is formed only on the data bus line side.

35. The method according to claim 33, wherein the auxiliary electrode is formed only on the gate bus line side.

36. The method according to claim 33, wherein the auxiliary electrode is formed on the data bus line side and the gate bus line side.

37. The method according to claim 33, wherein the auxiliary electrode has a substantially the same potential as the common electrode.

38. A method of making a multi-domain liquid crystal display device having first and second substrates, the method comprising the steps of:

forming a plurality of gate bus lines arranged in a first direction on said first substrate and a plurality of data bus lines arranged in a second direction on said first substrate to define a pixel region, the pixel region being divided into at least two portions and the liquid crystal layer in each portion being driven differently from each other;

forming a common electrode on said second substrate;

forming a pixel electrode coupled to the data bus line;

forming an auxiliary electrode on a same layer as said pixel electrode, a potential difference between the auxiliary electrode and the pixel electrode controlling the alignment direction of liquid crystal layer; and forming a passivation insulating said pixel and auxiliary electrodes;

forming a liquid crystal layer between said first and second substrates.

39. The method according to claim 38, further comprising the step of forming an alignment layer on at least one substrate between said first and second substrates.

40. The method according to claim 38, wherein the auxiliary electrode is formed only on the data bus line side.

41. The method according to claim 38, wherein the auxiliary electrode is formed only on the gate bus line side.

42. The method according to claim 38, wherein the auxiliary electrode is formed on the data bus line side and the gate bus line side.

43. The method according to claim 38, wherein the auxiliary electrode has a substantially the same potential as the common electrode.

44. A multi-domain liquid crystal display device comprising:

first and second substrates facing each other;

a liquid crystal layer between said first and second substrates;

a plurality of gate bus lines arranged in a first direction on said first substrate and a plurality of data bus lines arranged in a second direction on said first substrate to define a pixel region, the pixel region being divided into at least two portions and the liquid crystal layer in each portion being driven differently from each other;

a common electrode on said second substrate;

a pixel electrode electrically charged through said data bus line to drive said liquid crystal layer with said common electrode;

an auxiliary electrode on a same layer whereon said pixel electrode is formed, a potential difference between the auxiliary electrode and the pixel electrode controlling the alignment direction of liquid crystal layer;

a passivation insulating said pixel and auxiliary electrodes from electrodes and bus lines other than the pixel and auxiliary electrodes; and an alignment layer on at least one substrate between said first and second substrates, wherein the auxiliary electrode has a substantially the same potential as the common electrode.

45. The multi-domain liquid crystal display device according to claim 44, wherein the auxiliary electrode is electrically connected to the common electrode.

46. A multi-domain liquid crystal display device comprising:

first and second substrates facing each other;

a liquid crystal layer between said first and second substrates;

a plurality of gate bus lines arranged in a first direction on said first substrate and a plurality of data bus lines arranged in a second direction on said first substrate to define a pixel region, the pixel region being divided into at least two portions and the liquid crystal layer in each portion being driven differently from each other;

a common electrode on said second substrate;

a pixel electrode electrically charged through said data bus line to drive said liquid crystal layer with said common electrode;

an auxiliary electrode including the same material as said pixel electrode, on a same layer whereon said pixel electrode is formed, a potential difference between the auxiliary electrode and the pixel electrode controlling the alignment direction of liquid crystal layer;

a passivation insulating said pixel and auxiliary electrodes from electrodes and bus lines other than the pixel and auxiliary electrodes; and an alignment layer on at least one substrate between said first and second substrates.

47. A multi-domain liquid crystal display device comprising:

first and second substrates facing each other;

a liquid crystal layer between said first and second substrates;

a plurality of gate bus lines arranged in a first direction on said first substrate and a plurality of data bus lines arranged in a second direction on said first substrate to define a pixel region, the pixel region being divided into at least two portions and the liquid crystal layer in each portion being driven differently from each other;

a common electrode on said second substrate;

a pixel electrode electrically charged through said data bus line to drive said liquid crystal layer with said common electrode;

an auxiliary electrode including a different material than said pixel electrode, on a same layer whereon said pixel electrode is formed, a potential difference between the auxiliary electrode and the pixel electrode controlling the alignment direction of liquid crystal layer;

a passivation insulating said pixel and auxiliary electrodes from electrodes and bus lines other than the pixel and auxiliary electrodes; and an alignment layer on at least one substrate between said first and second substrates.

48. A multi-domain liquid crystal display device comprising:
   first and second substrates facing each other;
   a liquid crystal layer between said first and second substrates;
   a plurality of gate bus lines arranged in a first direction on said first substrate and a plurality of data bus lines arranged in a second direction on said first substrate to define a pixel region, the pixel region being divided into at least two portions and the liquid crystal layer in each portion being driven differently from each other;
   a common electrode on said second substrate;
   a pixel electrode electrically charged through said data bus line to drive said liquid crystal layer with said common electrode;
   an auxiliary electrode on a same layer whereon said pixel electrode is formed, a potential difference between the auxiliary electrode and the pixel electrode controlling the alignment direction of liquid crystal layer;
   a passivation insulating a material selected from the group consisting of BCB (BenzoCycloButene), acrylic resin, and polyimide compound, and insulating said pixel and auxiliary electrodes from electrodes and bus lines other than the pixel and auxiliary electrodes; and
   an alignment layer on at least one substrate between said first and second substrates.

49. A multi-domain liquid crystal display device comprising:
   first and second substrates facing each other;
   a liquid crystal layer between said first and second substrates;
   a plurality of gate bus lines arranged in a first direction on said first substrate and a plurality of data bus lines arranged in a second direction on said first substrate to define a pixel region, the pixel region being divided into at least two portions and the liquid crystal layer in each portion being driven differently from each other;
   a common electrode on said second substrate;
   a pixel electrode electrically charged through said data bus line to drive said liquid crystal layer with said common electrode;
   an auxiliary electrode including a different material than said pixel electrode, on a same layer whereon said pixel electrode is formed, a potential difference between the auxiliary electrode and the pixel electrode controlling the alignment direction of liquid crystal layer;
   a passivation insulating said pixel and auxiliary electrodes from electrodes and bus lines other than the pixel and auxiliary electrodes; and
   a compensation film on at least one substrate.

50. The multi-domain liquid crystal display device according to claim 49, wherein the compensation film includes a negative uniaxial film on an outer surface of the at least one substrate.

51. The multi-domain liquid crystal display device according to claim 49, further comprising an alignment layer on at least one substrate between said first and second substrates.

52. The multi-domain liquid crystal display device according to claim 49, further comprising a polarizer on at least one substrate between said first and second substrates.

53. The multi-domain liquid crystal display device according to claim 49, wherein the compensation film includes a negative biaxial film on an outer surface of the at least one substrate.

54. A multi-domain liquid crystal display device comprising:
   first and second substrates facing each other;
   a liquid crystal layer between said first and second substrates;
   a plurality of gate bus lines arranged in a first direction on said first substrate and a plurality of data bus lines arranged in a second direction on said first substrate to define a pixel region, the pixel region being divided into at least two portions and the liquid crystal layer in each portion being driven differently from each other;
   a thin film transistor comprising a gate electrode, a semiconductor layer, and source/drain electrodes, at a crossing area of said gate and data bus lines;
   a common electrode on said second substrate;
   a pixel electrode electrically charged through said data bus line to drive said liquid crystal layer with said common electrode;
   an auxiliary electrode on a same layer whereon said pixel electrode is formed except the area where said thin film transistor is formed, a potential difference between the auxiliary electrode and the pixel electrode controlling the alignment direction of liquid crystal layer;
   a passivation insulating said pixel and auxiliary electrodes from electrodes and bus lines other than the pixel and auxiliary electrodes; and
   an alignment layer on at least one substrate between said first and second substrates.

55. A multi-domain liquid crystal display device comprising:
   first and second substrates facing each other;
   a liquid crystal layer between said first and second substrates;
   a plurality of gate bus lines arranged in a first direction on said first substrate and a plurality of data bus lines arranged in a second direction on said first substrate to define a pixel region;
   a transistor having gate, source, and drain, the source being coupled to the data bus line, and the gate being coupled to the gate bus line;
   a common electrode on said second substrate;
   a pixel electrode electrically charged through said data bus line to drive said liquid crystal layer with said common electrode, the pixel electrode and the common electrode producing an electric field;
   an auxiliary electrode on a same layer whereon said pixel electrode is formed to affect the electric field between the pixel electrode and the common electrode; and
   a layer insulating said pixel and auxiliary electrodes from electrodes and bus lines other than the pixel and auxiliary electrodes,
   wherein said pixel region is divided into at least two portions and liquid crystal molecules in said liquid crystal layer in each of the at least two portions being electrically driven differently from each other.

56. A method of making a liquid crystal display device first and second substrates, the method comprising the steps of:
   forming a plurality of gate bus lines arranged in a first direction on said first substrate and a plurality of data bus lines arranged in a second direction on said first substrate to define a pixel region;

forming a transistor corresponding to the pixel region having gate, source, and drain electrodes;

forming a pixel electrode electrically charged through said data bus line to drive said liquid crystal layer with a common electrode;

forming an auxiliary electrode on a same layer whereon said pixel electrode is formed, the auxiliary electrode and the pixel electrode being electrically insulated from each other;

forming the common electrode on said second substrate; and forming a liquid crystal layer between said first and second substrates, wherein said pixel region is divided into at least two portions and liquid crystal molecules in said liquid crystal layer in each of the at least two portions capable of being electrically driven differently from each other.

* * * * *